US012706978B2

(12) United States Patent
Li et al.

(10) Patent No.: US 12,706,978 B2
(45) Date of Patent: Aug. 11, 2026

(54) METHODS, ARCHITECTURES, APPARATUSES AND SYSTEMS DIRECTED TO BLOCKCHAIN-ENABLED COLLABORATIVE APPLICATION DEPLOYMENT AND OPERATION

(71) Applicant: InterDigital Patent Holdings, Inc., Wilmington, DE (US)

(72) Inventors: Xu Li, Plainsboro, NJ (US); Chonggang Wang, Princeton, NJ (US); Robert Gazda, Spring City, PA (US); Ulises Olvera-Hernandez, Saint-Lazare (CA); Samir Ferdi, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 93 days.

(21) Appl. No.: 18/630,342

(22) Filed: Apr. 9, 2024

(65) Prior Publication Data

US 2025/0317496 A1 Oct. 9, 2025

(51) Int. Cl.
*G06F 15/16* (2006.01)
*G06F 16/23* (2019.01)
*H04L 67/00* (2022.01)

(52) U.S. Cl.
CPC .......... *H04L 67/34* (2013.01); *G06F 16/2379* (2019.01)

(58) Field of Classification Search
CPC ............................ H04L 67/34; G06F 16/2379
See application file for complete search history.

(56) References Cited

U.S. PATENT DOCUMENTS 10,715,637 B2 * 7/2020 Erdelyi .................. H04L 67/06
11,088,854 B2 * 8/2021 El Abed .............. G06Q 20/065

(Continued)

FOREIGN PATENT DOCUMENTS

CN 112862648 A 5/2021
EP 3896633 B1 9/2023

OTHER PUBLICATIONS

Third Generation Partnership Project, “Technical Specification Group Services and System Aspects; Proximity based Services (ProSe) in the 5G System (5GS) (Release 18),” 3GPP TS 23.304 V18.2.0 (Jun. 2023), 142 pages.

(Continued)

*Primary Examiner* — Razu A Miah
(74) *Attorney, Agent, or Firm* — Volpe Koenig

(57) ABSTRACT

In some implementations, a WTRU may include transmitting, to a network element, a request to join a collaboration infrastructure associated with one or more activities. In addition, the WTRU may include receiving, from the network element, a request response including information indicating a proposal of a smart contract that may include responsibilities and policies associated with joining the collaboration infrastructure, and information indicating conducted tasks to be assigned by the network element. The WTRU may include transmitting, to the network element, feedback on the smart contract. Moreover, the WTRU may include receiving, from the network element, a WTRU collaboration guide indicating one or more tasks assigned to the WTRU. Also, the WTRU may include evaluating the one or more tasks assigned to the WTRU. Further, the WTRU may include transmitting, to the network element, an acknowledgement of the one or more tasks assigned to the WTRU.

18 Claims, 29 Drawing Sheets

(56) References Cited

U.S. PATENT DOCUMENTS

| | | | | |
|---|---|---|---|---|
| 2012/0207088 | A1* | 8/2012 | Liu | H04L 67/561 370/328 |
| 2013/0151598 | A1* | 6/2013 | Fu | G06F 9/54 709/203 |
| 2014/0089379 | A1* | 3/2014 | Davis | G06F 8/31 709/203 |
| 2018/0278724 | A1* | 9/2018 | Erdelyi | H04L 67/06 |
| 2018/0326291 | A1 | 11/2018 | Tran et al. | |
| 2019/0066063 | A1* | 2/2019 | Jessamine | G06Q 20/4014 |
| 2019/0129895 | A1* | 5/2019 | Middleton | H04L 9/0637 |
| 2020/0014720 | A1* | 1/2020 | Giura | G06F 8/65 |
| 2020/0218528 | A1* | 7/2020 | Bao | G06F 9/5055 |
| 2020/0287788 | A1* | 9/2020 | Triplet | H04L 9/3297 |
| 2021/0124760 | A1* | 4/2021 | Klein | G06F 8/61 |
| 2021/0151884 | A1* | 5/2021 | Tran | H01Q 3/20 |
| 2021/0256012 | A1* | 8/2021 | Yu | G06F 16/3332 |
| 2021/0263719 | A1* | 8/2021 | Pai | H04L 9/0637 |
| 2021/0373875 | A1* | 12/2021 | Solomon | H04L 9/0618 |
| 2022/0374228 | A1* | 11/2022 | Brugman | G06F 8/65 |
| 2023/0015925 | A1* | 1/2023 | Solomon | G06F 21/572 |
| 2023/0262113 | A1* | 8/2023 | Li | H04L 67/34 709/226 |

OTHER PUBLICATIONS

"3rd Generation Partnership Project; Technical Specification Group Services and System Aspects; Service requirements for the 5G system; Stage 1 (Release 19)", 3GPP TS 22.261 V19.3.0, Jun. 2023.

3rd Generation Partnership Project; Technical Specification Group Services and System Aspects; Study on AI/ML Model Transfer Phase 2 (Release 19), 3GPP TR 22.876 V19.1.0 (Sep. 2023), Sep. 2023, 40 pages.

ETSI, Permissioned Distributed Ledgers (PDL); architecture enhancements for PDL service provisioning in telecom networks, ETSI GS PDL 024 V0.0.4 (Jul. 2023), Jul. 13, 2023, 14 pages.

"Digital World Experiences", Next G Alliance, https://www.nextgalliance.org/white_papers/digital-world-experiences/, Dec. 2022, 18 pages.

Mace, Andie, "Poly DirectorAl's Newest Feature: People Framing", https://blogs.poly.com/poly-directorais-newest-feature-people-framing/, Hybrid Working, Innovations, Jun. 2, 2022, 6 pages.

Dean, Jeff, "Introducing Pathways; A next-generation AI architecture", https://blog.google/technology/ai/introducing-pathways-next-generation-ai-architecture/, Oct. 28, 2021, 5 pages.

3rd Generation Partnership Project, "Technical Specification Group Services and System Aspects; Study on 5G System Support for AI/ML-based Services (Release 18)", 3GPP TR 23.700-80 V18.0.0, Dec. 2022, 220 pages.

* cited by examiner

| Key Techniques in Each Step: | 1. Initiating Transactions | 2. Broadcasting and Verifying Transactions | 3. Building New Blocks | 4. Validating New Blocks based on a Consensus Protocol | 5. Updating Blockchain |
|---|---|---|---|---|---|
| Cryptography | Yes | Yes | | | |
| Hashing | Yes | | Yes | | |
| Merkle Tree | | | Yes | | |
| Distributed Ledgers | | | | | Yes |
| P2P Networking | | Yes | Yes | Yes | Yes |
| Consensus Protocol | | | | Yes | |

UEs (Attending the Same Activity)
UE-1
UE-2
UE-3
ADPC-1
Blockchain Node-1 (BCN-1)
UEAF Repository (UEAF-R)

0. There is a ADPC-1 in the System.

1. UE-1 Sends ADPC Discovery Request to UEAF-R and Indicates its Willingness for Joining UE Collaboration Infrastructure.

2. UEAF-R Identifies there is an Available ADPC-1 in the Field.

3. UEAF-R Indicates UE-1 to Contact ADPC.

4. UE-1 Sends a Request to ADPC-1 for Joining UEAF Deployment and Processing Collaboration Infrastructure.

5. ADPC-1 Creates a Smart Contract (SC-1) for UE-1.

6. ADPC-1 Sends an Ack to UE-1, Along with the Proposed SC-1.

7. More Negotiation may be Needed for Finalizing the Smart Content in SC-1.

8. ADPC-1 Submits SC-1 to the Blockchain System Via BCN-1.

9. BCN-1 Deploys SC-1 in the Blockchain System.

METHODS, ARCHITECTURES, APPARATUSES AND SYSTEMS DIRECTED TO BLOCKCHAIN-ENABLED COLLABORATIVE APPLICATION DEPLOYMENT AND OPERATION

FIELD

This disclosure pertains to procedures, methods, architectures, apparatuses, systems, devices, and computer program products for, and/or directed to collaborative application deployment and operation (e.g., in a blockchain system) for wired and/or wireless communications.

SUMMARY

Embodiments disclosed herein are related to methods, apparatuses, and procedures for blockchain-enabled collaborative application deployment and operation for wired and/or wireless communications.

In one embodiment, a method implemented in a wireless transmit and/or receive unit (WTRU) (or a user equipment (UE)) for wireless communications includes transmitting a request to join a collaboration group associated with a set of collaborative applications, and receiving, based on the request, a response including information indicating a proposal of a smart contract. The method also includes transmitting feedback based on the proposal of the smart contract, and receiving an acknowledgement notification indicating 1) status information of the smart contract and 2) that the WTRU has joined the collaboration group.

In one embodiment, a WTRU (or UE) for wireless communications comprises circuitry, including a processor, a transmitter, a receiver, and/or memory is provided. The WTRU is configured to transmit a request to join a collaboration group associated with a set of collaborative applications, and to receive, based on the request, a response including information indicating a proposal of a smart contract. The WTRU is further configured to transmit feedback based on the proposal of the smart contract, and to receive an acknowledgement notification indicating 1) status information of the smart contract and 2) that the WTRU has joined the collaboration group.

In one embodiment, a method implemented in a wireless transmit and/or receive unit (WTRU) (or an application deployment and processing coordinator (ADPC)) for wireless communications includes receiving a set of location presence reports from a set of WTRUs, and determining, based on the set of location presence reports, enabling a set of collaborative applications for deployment and operation. The method also includes generating a set of collaboration guides, and each collaboration guide of the set of collaboration guides is for a respective task assignment for a respective WTRU of the set of WTRUs. The method includes transmitting the set of collaboration guides to set of WTRUs for task assignments, and receiving, from at least one WTRU of the set of WTRUs, information indicating an acceptance for the respective task assignment associated with the at least one WTRU. The method also includes transmitting one or more collaboration guides of the set of collaboration guides to a blockchain node for recording, and receiving, from the blockchain node, an acknowledgement indicating a successful recording of the one or more collaboration guides.

The method may also include transmitting a download request for at least a subset of the set of collaborative applications; receiving the subset of the set of collaborative applications; transmitting, based on a respective collaboration guide, one or more applications to the at least one WTRU for deployment; and receiving, from the at least one WTRU, confirmation information indicating a successful installation and operation of the one or more applications.

In one embodiment, a WTRU (or a UE, or an ADPC) is configured to receive a set of location presence reports from a set of wireless transmit/receive units (WTRUs); to determine, based on the set of location presence reports, enabling a set of collaborative applications for deployment and operation; to generate a set of collaboration guides, and each collaboration guide of the set of collaboration guides is for a respective task assignment for a respective WTRU of the set of WTRUs; to transmit the set of collaboration guides to set of WTRUs for task assignments; to receive, from at least one WTRU of the set of WTRUs, information indicating an acceptance for the respective task assignment associated with the at least one WTRU; to transmit one or more collaboration guides of the set of collaboration guides to a blockchain node for recording; and to receive, from the blockchain node, an acknowledgement indicating a successful recording of the one or more collaboration guides.

In an example, the WTRU (or the ADPC) is further configured to transmit a download request for at least a subset of the set of collaborative applications; to receive the subset of the set of collaborative applications; to transmit, based on a respective collaboration guide, one or more applications to the at least one WTRU for deployment; and to receive, from the at least one WTRU, confirmation information indicating a successful installation and operation of the one or more applications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

Figure 1A:
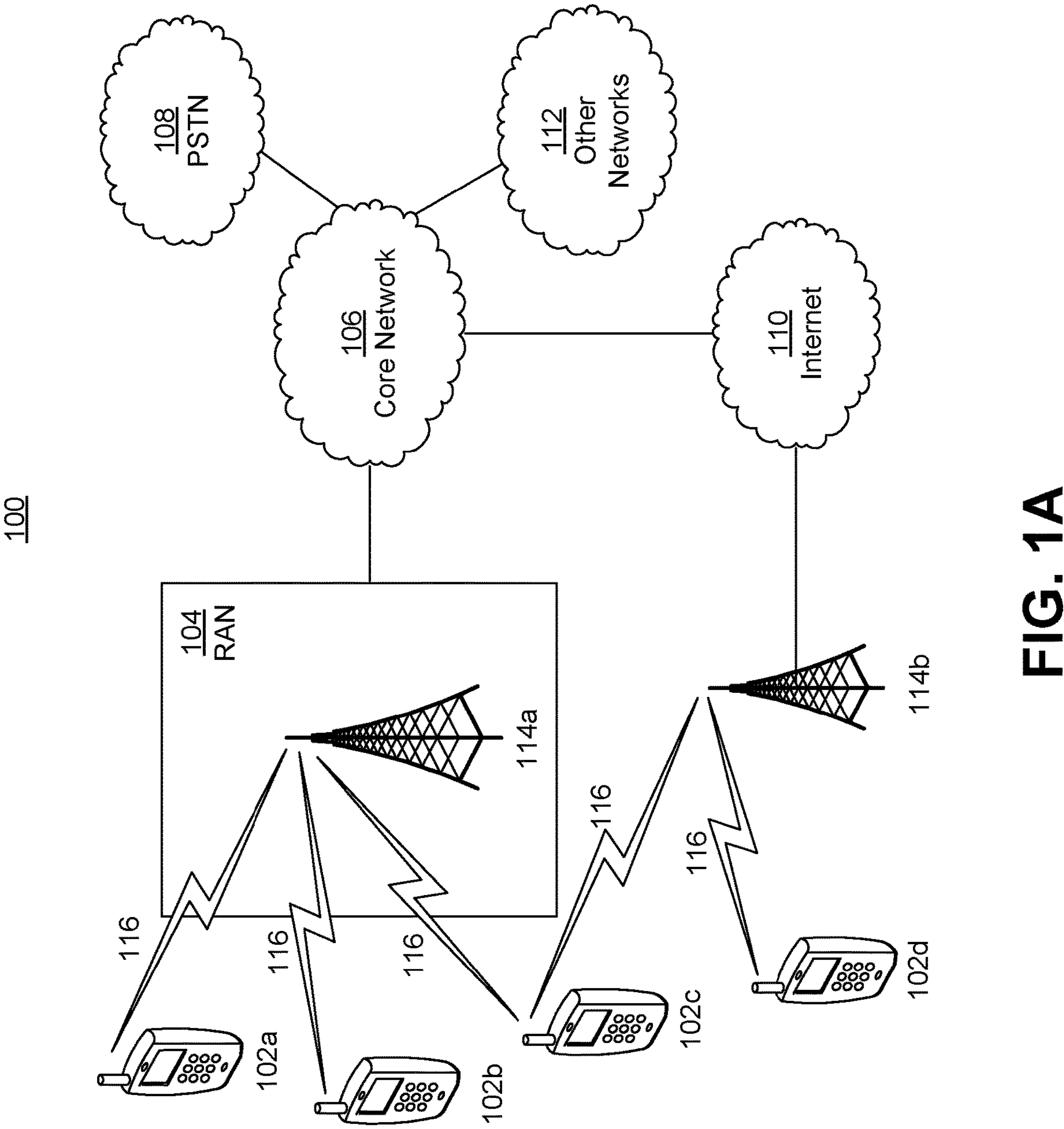
FIG. 1A is a system diagram illustrating an example communications system.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

One or more of the following abbreviations and/or corresponding terms may be used herein.

| | |
|---|---|
| 3D | Three Dimensional |
| 3GPP | The 3rd Generation Partnership Project |
| 5G | The 5th Generation |
| 5GC | 5G Core Network |
| 5GS | 5G System |
| 6G | The 6th Generation |
| 6GC | 6G Core Network |
| 6GS | 6G System |
| ADPC | Application Deployment and Processing Coordinator |
| AF | Application Function |
| AMF | Access and Mobility Management Function |
| App | Application |
| AoI | Area-of-Interest |
| AR | Augmented Reality |
| AT | Activity Triple |
| BCN | Blockchain Node |
| BFC | Blockchain Function Client |

-continued

| | |
|---|---|
| BFS | Blockchain Function Server |
| CPE | Customer Premise Equipment |
| CPN | Customer Promise Network |
| DDNMF | Direct Discovery Name Management Function |
| DN | Data Network |
| E2E | End-to-End |
| ETSI | European Telecommunications Standards Institute |
| FL | Federated Learning |
| FQDN | Fully Qualified Domain Name |
| GA | Group Activity |
| GE | Group Event |
| IMEI | International Mobile Equipment Identity |
| IMSI | International Mobile Subscriber Identity |
| IP | Internet Protocol |
| ISG | Industry Specification Group |
| MEC | Multi-access Edge Computing |
| MNO | Mobile Network Operator |
| MoE | Mix-of-Expert |
| MR | Mixed Reality |
| MPEG | Moving Picture Experts Group |
| NEF | Network Exposure Function |
| NF | Network Function |
| NFV | Network Function Virtualization |
| NG-RAN | Next-Generation RAN |
| NRF | Network Repository Function |
| P2P | Peer-to-Peer |
| PCF | Policy Control Function |
| PDU | Protocol Data Unit |
| RAN | Radio Access Network |
| RG | Residential Gateway |
| SA | Service Architecture |
| SMF | Session Management Function |
| UDM | Unified Data Management |
| UDR | Unified Data Repository |
| UDSF | Unstructured Data Storage Function |
| UE | User Equipment |
| UEA | UE Application |
| UEAF | UE Application Family |
| UECG | UE Collaboration Guide |
| UECI | UE Collaboration Infrastructure |
| UPF | User Plane Function |
| VAL | Vertical Application Layer |
| VR | Virtual Reality |
| XR | Extended Reality |

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station **114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115**.

The RAN 104/113 may be in communication with the CN 106/115, which may be any type of network configured to provide voice, data, applications, and/or voice over internet protocol (VOIP) services to one or more of the WTRUs **102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115** may also be in communication with another RAN (not shown) employing any of a GSM, UMTS, CDMA 2000, WiMAX, E-UTRA, or Wi-Fi radio technology.

The CN 106/115 may also serve as a gateway for the WTRUs **102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114** or a different RAT.

Some or all of the WTRUs **102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b***, which may employ an IEEE 802 radio technology.

Figure 1B:
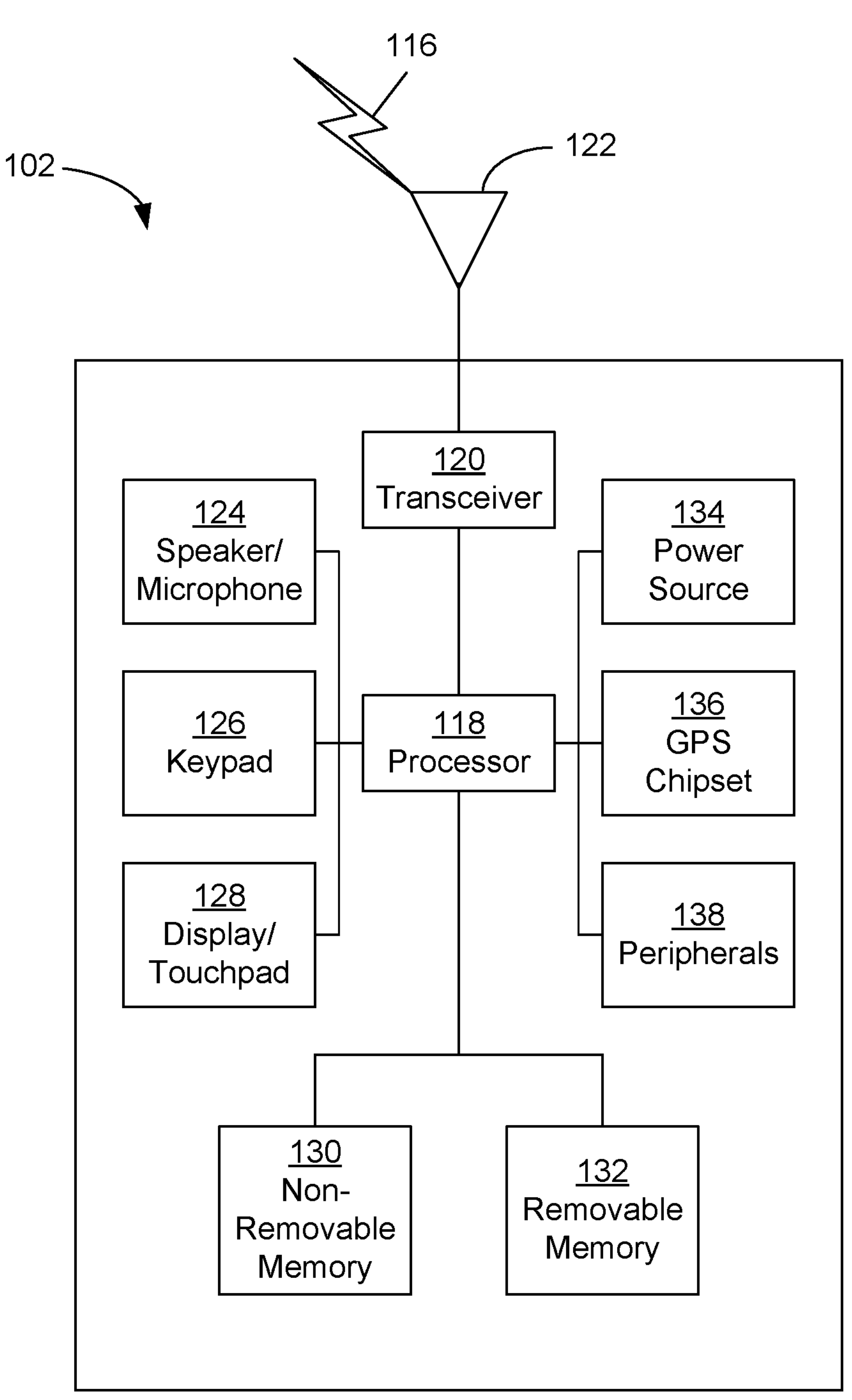
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station **114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122** may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
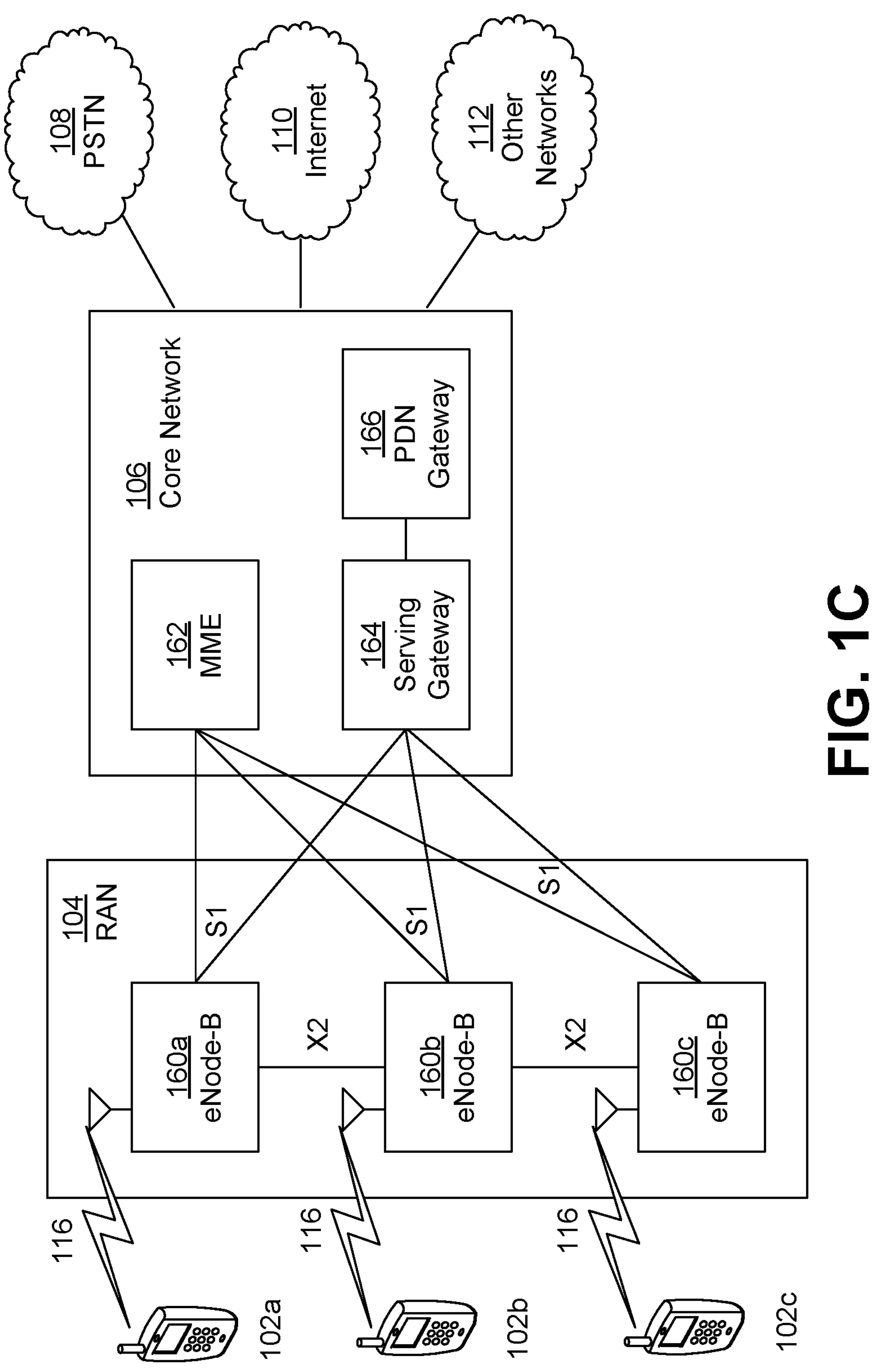
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The SGW 164 may be connected to each of the eNode-Bs 160*a*, 160*b*, 160*c* in the RAN 104 via the SI interface. The SGW 164 may generally route and forward user data packets to/from the WTRUs 102*a*, 102*b*, 102*c*. The SGW 164 may also perform other functions, such as anchoring user planes during inter-eNode-B handovers, triggering paging and/or mobile termination when DL data is available for the WTRUs 102*a*, 102*b*, 102*c*, managing and storing contexts of the WTRUs 102*a*, 102*b*, 102*c*, and the like.

The SGW 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
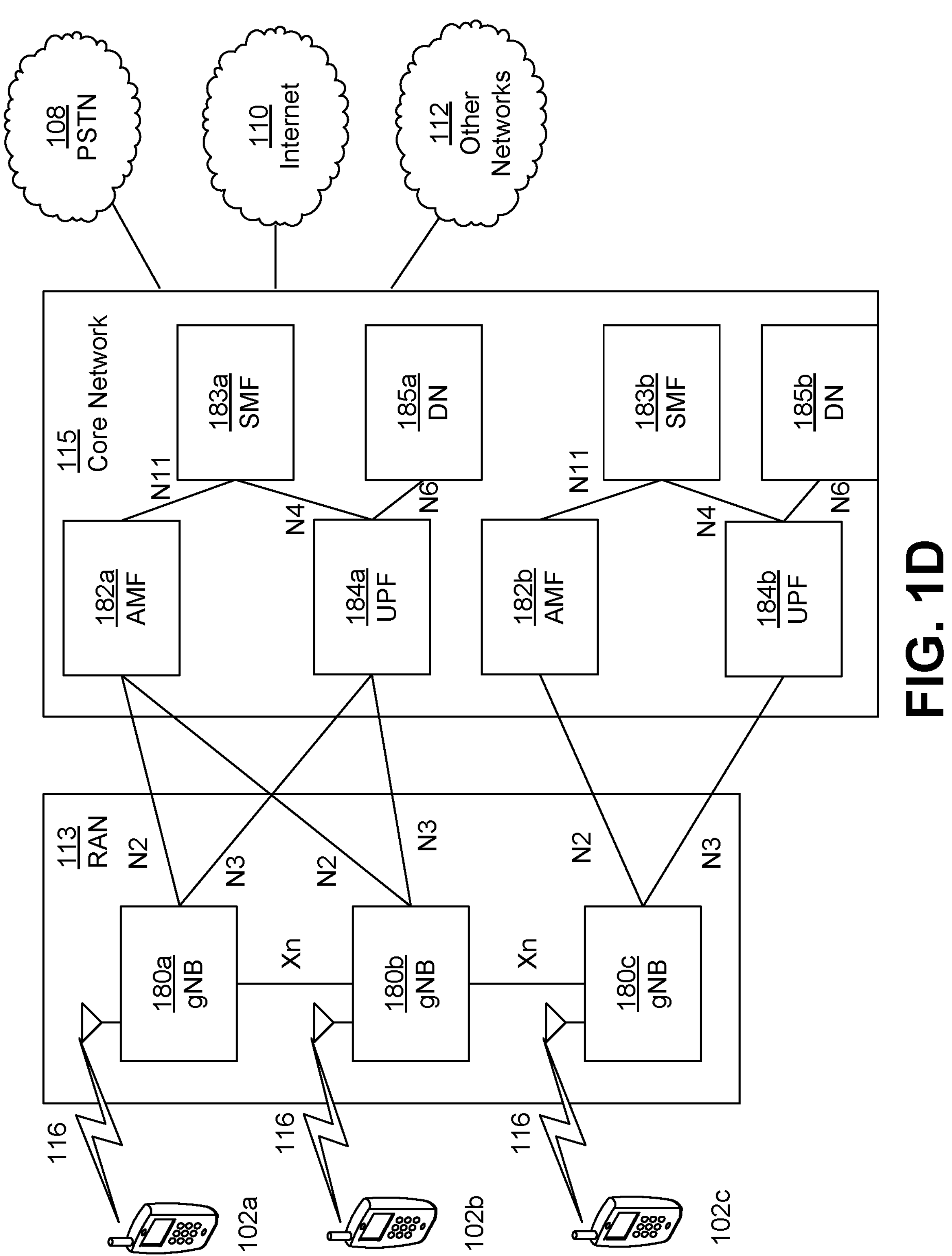
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different packet data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

UE Application Family (UEAF). A UEAF is defined as a UE software package to be used by devices when engaging in a given GA. Other alternative terms of UEAF could be, for example, a UE application group, a UE application composition, etc.

UE Applications (UEAs): A UEAF may include one or more UEAs. In Use Case-1 and Use Case-2 discussed herein, each UEA could be an individual software component and operations of UEAs are independent of each other. For example, an UEA may be realized as a phone application (such as from an app store), a service, a function (e.g., when realizing function-as-a-service), or a software component. An individual UEA may be implemented by one vendor/entity for a particular purpose, while another UEA may be implemented by another vendor/entity. UEAs may be in a common trust domain, or they may not have a trust relationship. As another example, all UEAs in a UEAF may be implemented by a single vendor/entity. In an example, an UEA may require a certain type of input, and produce a certain type of output. For example, in the golf match use case discussed herein, an audience Lisa is watching the golf match at hole #19 and her UE may download a corresponding UEAF-1 for hole #19, which includes two UEAs, e.g., XR application #19-A and XR application #19-B. Each of these UEAs is to be used for different purposes and their operations are purely independent of each other. Similarly, in the natural history park use case discussed herein, a person, Mike, is sitting in a tourist bus and visiting showcase field #8. His UE may download and install another UEAF-2, which includes two AI/ML models (as two UEAs) for rare-species animal and plant detection respectively, e.g., AI/ML model #8-A and AI/ML model #8-B. In the MoE shown in FIG. 3 as discussed in Use Case-3 discussed herein, each module can be regarded as a UEA.

AI-Related Standards

An artificial intelligence (AI) system can learn and exploit the physical world (such as existing data sets, entity behavior, sensory information, etc.) to train AI models based on various learning schemes such as deep learning, federated learning, reinforcement learning, and/or a combination of them. The trained model can automatically discover useful knowledge, make decisions, or have application-specific skills (such as driving a car). For example, a general AI pipeline for supervised learning may comprise multiple stages: 1) the data preparation stage that includes data collection and optional feature engineering/extraction used for training; 2) the training stage for learning an AI model; 3) the validation stage for testing and validating the learned AI model; 4) the model deployment stage for deploying the validated AI model to a place where the model is to be used; and/or 6) the model application stage for using the deployed AI model for various application purposes.

3GPP TS 22.261 specifies AI model transfer requirements for three types of AI operations: 1) AI operation splitting between AI endpoints; 2) AI model/data distribution and sharing over 5G system (5GS); and 3) distributed/federated learning (FL) over 5GS. 3GPP TR23.700-80 aims to define intelligent transmission support for AI-based services in 5GS. It will focus on 5GS architectural and functional extensions so that service providers can leverage 5GS as the intelligent transmission platform to support AI-based services. 3GPP TR 23.700-80 has several main objectives: study the possible architectural and functional extensions to support the application-layer AI operations defined in TS 22.261; study possible QoS, policy enhancements to support Application AI operational traffic while supporting regular 5GS user traffic; and study whether and how 5GS provides assistance to an AF and the UE for the AF and UE to manage the FL operations and model distribution/redistribution (e.g., FL members selection) to facilitate collaborative application AI based on Federated Learning operations between the application clients running on the UEs (i.e., FLCs) and the Application Servers (i.e., the FLS).

The result of 3GPP TR 23.700-80 is a set of general architecture principles, which may further affect the related procedures/architectures defined in 3GPP TS 23.501, TS 23.502, and/or TS 23.503.

In addition, 3GPP TR 22.876 studied the use cases and potential service and performance requirements for distributed AI training/inference involving direct device connection, which has the following two objectives: distributed AI training/inference based on device-to-device connection; and charging and security aspects.

The result of 3GPP TR 23.700-80 is a set of new functional and/or performance requirements, which may be addressed as the next step.

Representative Blockchain Technology

Blockchain technology jointly uses and builds on top of various existing techniques, such as cryptography, hashing, Merkle tree, distributed ledgers, peer-to-peer (P2P) networking and consensus protocols. Blockchain technology innovatively combines such existing technologies to enable a system that can provide advanced features such as decentralization, immutability, transparency, and security.

A blockchain system is one in which blockchain technology is used. For example, a blockchain system is referred to as the system using blockchain technology. Applications using and/or supported by a blockchain system are referred to as blockchain applications. A blockchain system is underpinned by one or more underlying blockchain networks. Each blockchain network may include a plurality of (e.g., many) participating blockchain nodes (BCNs).

Blockchain Nodes (BCN) are connected via P2P links and form a mesh P2P network, over which transactions and blocks are broadcast among all blockchain nodes. A blockchain node may connect to multiple other blockchain nodes as its neighbors or neighboring blockchain nodes. Applications using and/or supported by a blockchain system are referred to as blockchain applications. A blockchain system is underpinned by underlying blockchain networks which comprise participating blockchain nodes. Each blockchain node hosts one or more distributed blockchains (a form of distributed ledgers) and participates in the blockchain system. For example, blockchain nodes broadcast blockchain transactions and blocks among each other using peer-to-peer networking. Blockchain nodes also perform consensus protocols with each other to reach distributed trust without relying on a centralized party. A blockchain transaction could be a digital representation of a real-world transaction, a digital record of physical assets, a digital record of a physical event, a digital record of any action in an information system, a digital payment, and/or a digital smart contract. A block groups multiple blockchain transactions together. A blockchain is a data structure to chain a growing number of blocks.

Figure 2:
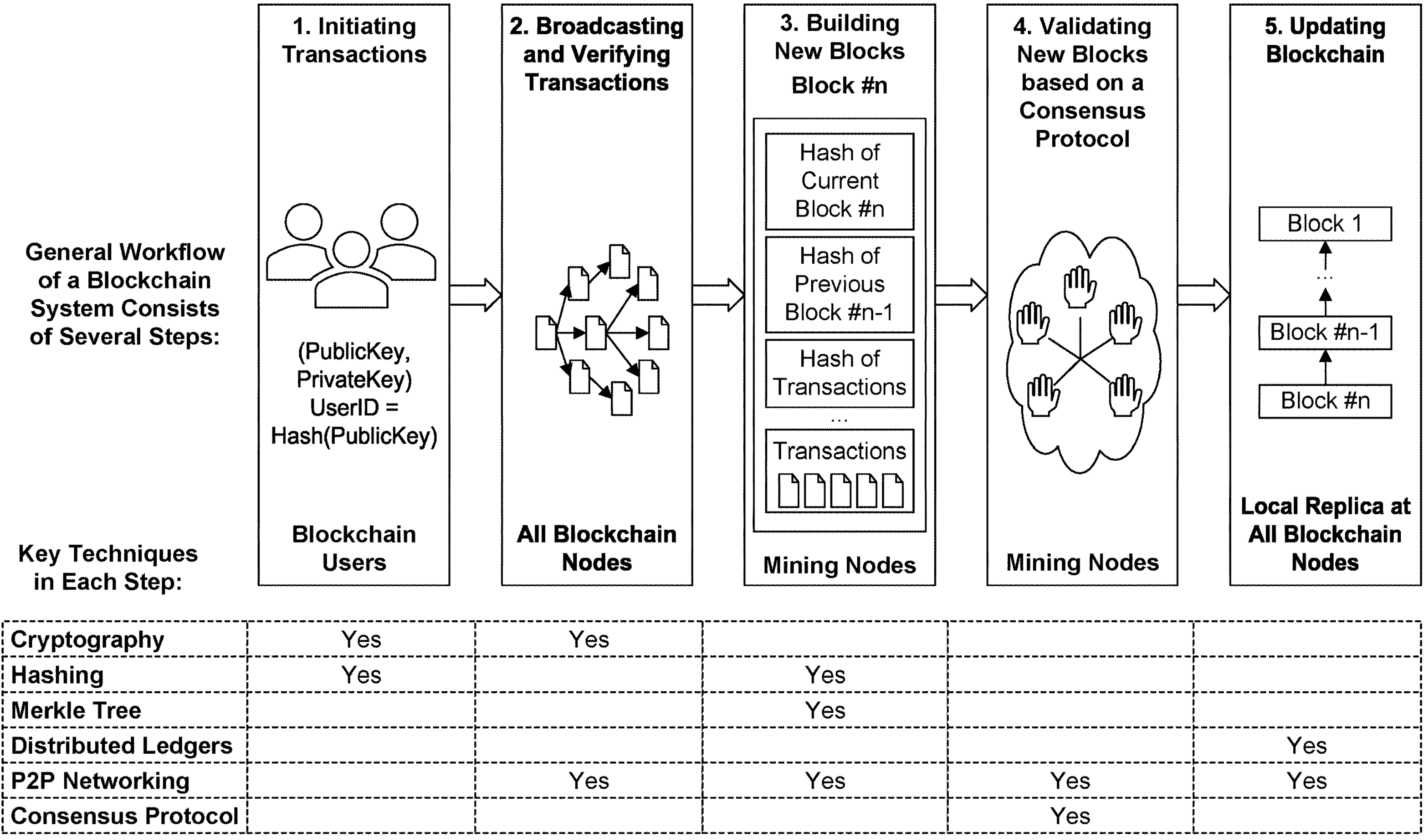
FIG. 2 is a diagram illustrating an example workflow of a blockchain system, according to one or more embodiments.

FIG. 2 illustrates an example workflow of a blockchain system. In this example, the workflow of the blockchain system comprises five steps. In this example, one or more existing techniques are involved in each respective step as shown in FIG. 2.

Step 1: Initiating Transactions. In this step, each participating user generates new transactions independently. Each user has a user or account identifier, which is in general a hash of the user's public key. Each new transaction will be signed using the user's private key. After a new transaction is generated, the user sends it to the blockchain network.

Step 2: Broadcasting and Verifying Transactions. A new transaction will be first received by some blockchain nodes, which will verify its integrity using the user's public key, which is included in the transaction. After the verification and if the new transaction is valid, it will be relayed and broadcasted within the blockchain network. Eventually, all blockchain nodes will receive and have a copy of any newly generated and valid transactions.

Step 3: Building New Blocks. In this step, some blockchain nodes (referred to as Mining Nodes or Full Nodes) start to group many newly generated and pending transactions together to generate a new block. The new block will consist of a block header and a block body. The block header generally includes a hash of the current block, a hash of the previously-confirmed block, and a hash of all included transactions (e.g. Merkle tree). Depending on the consensus protocol, the block header may contain additional information. The block body contains the content of all included transactions. Each mining node independently attempts to create a new block.

Step 4: Validating New Blocks based on a Consensus Protocol. In Step 3, mining nodes independently attempt to create a new block. They run the same consensus protocol (e.g., Proof-of-Work in the Bitcoin system) and reach an agreement on who (i.e., a winner) is allowed to insert a block to the existing blockchain. The winner of the consensus protocol will send its newly generated block into the blockchain network. This new block will be broadcasted and let all mining nodes receive it and verify it.

Step 5: Updating Blockchain. After the newly generated block is verified, it is successfully appended to the existing blockchain, since it contains a hash of the previous block (e.g., the last block of the previous blockchain).

Representative AI Architecture: Mix-of-Expert (MoE)

Recently, a next generation of AI/ML application architecture was proposed by Google, which is called "Pathways". Pathways addresses weaknesses in current AI/ML where models are trained to do a single thing with a single type of input data (e.g., people recognition using video input). New models must be created for each new single-purpose application, which causes redundancy and overuse of resources (where many similar AI models are deployed and running in parallel). The Pathways approach interconnects individual AI models (or modules), operating on different data sources and types to enable higher levels of inference or improved efficiency than traditional AI/ML methods. Specifically, Pathways adopts the architecture called Mixture-of-Expert or Mix-of-Expert (MoE), meaning that 1) it is multi-mode, i.e. it has capabilities to receive multiple types of inputs (text/image/audio/etc.) and 2) it is able to conduct multiple/different types of inference (or training), such as text recognition, image analysis, voice detection, face recognition, crash detection, etc. by combining and interacting various individual AI models (e.g., experts) together. In comparison, a traditional AI model can only accept one type of input and can only be used for a single purpose. In Pathways, for a particular job (e.g., higher-order, multimodal inference) has a corresponding processing pipeline through the MoE, which is constituted by one or more individual modules or models operating with a specific combination (e.g., a pathway). For executing a particular job, only a partial or subset of the MoE will be activated.

Representative Use Cases

Representative Use Case 1—Enhancing Golf Match Watching Experience Using Augmented Reality (AR) Glasses In the 6G era, Extended Reality (XR) is a use case driving the need for new devices and device applications. XR may include Virtual Reality (VR), Augmented Reality (AR), or Mixed Reality (MR). For example, an XR UE (e.g., XR glasses) will become a daily necessity, and people may like to have an XR experience while participating in various social events. Social events are Group Events (GEs) in nature, e.g., multiple people may attend the same event at the same time. When engaging in a given GE, people may be involved in one or more Group Activities (GAs), which are specialized experiences within a GE.

An example use case is professional golf match with thousands of people (as a GE) in a golf park. The golf park has multiple holes and watching the golf match at a particular hole can be regarded as a GA. For each hole, the audience may stand in the watching area to see the match. The golf park has implemented several XR experiences designed for each hole so that audiences may install corresponding XR applications on their XR UEs for a better interactive experience. For example, XR application #19-A is designed for hole #19 to superimpose useful logo/sign/animation onto the golf terrain of hole #19 or to superimpose informational XR effect onto the terrain (such as the contour map of the terrain of hole #19), or onto the golf ball (the predicated ball moving trajectory). Another XR application #19.B is to detect/measure the current wind, sunlight and other environment factors that may affect the movement of the golf ball and to present those advisory information to the audiences via their XR devices.

Representative Use Case 2—Enhancing Tourist Experience in a Natural History Park Using AI/ML-Based Animal/Plant Detection/Recognition In an example, a tourist guide is leading a tourist group in a natural history park, which can be regarded as a GE. The park is very big (having multiple showcase fields/rooms) and at each time, the tourist group may be visiting a particular showcase field (which can be defined as a GA). When visiting showcase field #8, tourist group members are sitting on a tourist bus, listening to the tour guide's introduction, and following the tour guide's instructions (e.g., where to move, what to look, etc.). Taking showcase field #8 as an example, the park has trained two of AI/ML models specifically designed for it. For example, the showcase field #8 has many rare-species animals and plants. AI/ML model #8-A detects rare-species animals in showcase field #8 while AI/ML model #8-B detects the rare-species plants in showcase field #8. The group members would like to download and install AI/ML model #8-A and AI/ML model #8-B on their UEs so that once rare-species animals and plants are detected in their viewports, certain notifications/information/hints/highlights may be presented to those tourist members to enhance their tour experience.

Representative Use Case 3—Deploying an MoE for a Smart City

Figure 3:
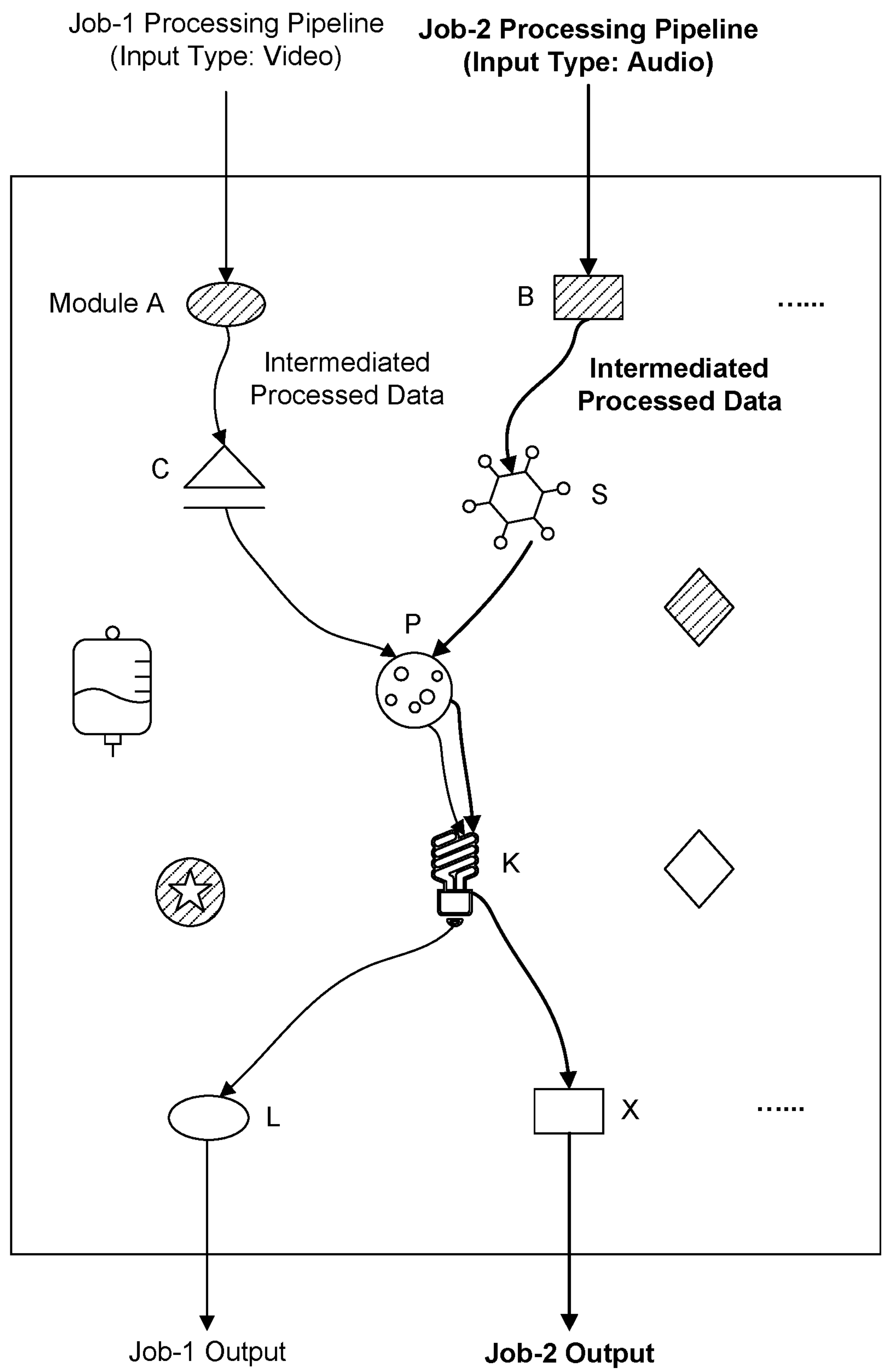
FIG. 3 is a diagram illustrating an example of a Mix-of-Expert (MoE) application having two pipelines for different jobs, according to one or more embodiments.

In an example, a city transportation authority has trained a MoE for one or more smart city applications in the sense that the MoE may be used for different types of smart city-related jobs. Each job aims to conduct a certain task (e.g., image recognition, voice/noise recognition, etc.) and the processing pipelines of a job may include one or more modules and the pipelines of different jobs may share the same modules. For example, in FIG. 3, Job-1 is to detect traffic flow volume and its processing pipeline may be construed by some modules included in the model, including Module-A (as an image-based input reception module and it can receive traffic flow images), Module-C (receives the processed/intermediate data from Module-A and sends its processed data to another Module-P), Module-P, Module-K, and Module-L (as an output delivery module, which can yield the estimated traffic flow volume). Another example, Job-2 is to detect city noise level and its processing pipeline may be constructed by Module-B (an audio-based input reception module), Module-S, Module-P, Module-K, Module-X, and Module-Y (an output delivery module for the estimated noise level). Two example jobs are illustrated in FIG. 3. It can be seen that both pipelines may share the same modules, e.g., Module-P and Module-K.

Observations

Various embodiments are motivated by observations discussed herein. In an example, Observations 1-3 discussed below are related to Use Case-1 and Use Case-2, and Observation-4 is related to Use Case-3.

Observation 1: The Use Case-1 and Use Case-2 illustrate that in the future, people may install diverse UEAFs on their UEs, which can bring a rich user experience when attending various GEs. A UE may not pre-download and pre-install the needed UEAFs for a GA due to several reasons, e.g., limited storage capacities on the UE (e.g., an AR glass may only install and operate a given UEAF designed for the GA for a short time period. After the GA, the App may get uninstalled to recycle the storage resources), lack of time to do so, inconvenience to a human user, etc. In some cases, users may opportunistically decide to participate in a GA on the spur of the moment, meaning that pre-downloading and pre-installation of the needed UEAFs is not possible. Therefore, UEs need to download and install an UEAF at opportunistically at runtime, i.e., when they need to use them. Another reason could be UEs may not be able to access and download the UEAF until the users of the UEs officially get involved in the GA, e.g., after users complete the on-site event registration and obtain UEAF download and access details.

Observation 2: In a GA, multiple GA participant UEs may require the same UEAF. For example, in the golf match use case, when people are gathering in the watch area of hole #19, their UEs may need to download the same UEAF-1 around the same time (i.e., XR application #19-A and XR application #19-B). Similarly, in the natural history park use case, when the tourist group enters showcase field #8, the tourist guide may advise group members to download the same UEAF-2 (e.g., AI/ML model #8-A and AI/ML model #8-B).

Observation 3: In a GA, the UEs of participants use the same UEAF. The inputs of the corresponding UEA instances hosted on different UEs may be the same or different, which may bring uniform user experience and differentiated user experiences, respectively.

Uniform User Experience: In the natural history park use case, the tourist group members may be sitting in the same bus, listening to the tour guide's introduction, and following the tour guide's instructions. Accordingly, those group members may have the similar characteristics and behaviors, such as similar location, orientation, watching focus/target, line of sight, movement, etc. Therefore, the UEAF instances installed on different UEs may capture the similar inputs (e.g., viewports) at the same time. For example, at a given time point, the cameras installed on different UEs may capture the similar viewports, which are the inputs of the UEA instances installed on those UEs. Consequently, those UEA instances may produce similar outputs. For example, the outputs could be the detected target physical objects which appear in of viewports of multiple UEs. In other words, when the same/similar outputs (e.g., the same set of detected target physical objects) are presented to the group members, it will bring a uniform user experience to different users.

Differentiated User Experience: In the golf match use case, even though audiences are gathering in the watch area of hole #19, they often have the freedom to decide where to look. For example, at a given time point, some people are looking at the terrain of hole #19 while others are looking at the players who are currently in preparation. This implies that UEA instances on different UEs may capture different inputs since those audience members have different viewports. Another reason could be that some people may have high-end XR UEs such that they may download and install all of UEAs in the desired UEAF to achieve the best XR experience. In comparison, some other audience may only have medium/low-end UEs such that they may choose to only download and install a subset of UEAs in the desired UEAF for a basic XR experience.

Observation 4: In Use Case-3, a MoE can be regarded as an UEAF. Due to its complexity, the MoE trained for smart city may be huge size. In the meantime, some of the modules in the model may need to conduct computing-intensive processing. When the model is to be deployed to the network edge (e.g., city downtown area), the model may have to be deployed across multiple edge nodes/entities (customer premise equipment, small-cells, base stations, road-side units, gateway, connected automobiles, phones, UEs, etc.) since usually no single node/entity at the edge has the capacity to operate the full MoE. This means that multiple entities need to collaborate together to guarantee the smooth operations of the MoE.

Overview

A software package (defined as a UE Application Family, or UEAF) may include one or more UE Applications (UEAs). Each UEA could be an individual software or a software module. Typically, an UEA may require a certain type of input, and produce a certain type of output. A UE may need to download one or more UEAs (e.g., from a UEAF repository) in the desired UEAF and operate UEAs for supporting various 6G use cases.

In an example, two key issues (KIs) are identified as follow.

The first key issue is how to enable efficient collaboration between Group Activity (GA) participants to reduce overhead/redundancies on UEAF downloading (e.g., on UEAF operation). The first key issue focuses on communication and computing redundancy aspect, which may exist when realizing future 6G applications. Currently, there is no collaboration between participant UEs attending in the same GA. For example, each participant UE may need to download the same UEAF(s), which adds a significant workload to the nearby base stations serving those participant UEs (leading to communication redundancy). More importantly, each participant UE may need to operate UEAF individually without coordination/collaboration, this may also lead to computing redundancies since the processing to be conducted by UEAs on different UEs may also be repetitive (especially when the UEAF intends to bring uniform user experience to different participants).

For example, multiple persons may attend the same activity at the same time, which is defined as a GA. To improve user experience when attending the GA, UEs of GA participants may download and run the same UEAF designed for the GA. For example, a UEAF could be a software package containing several AI/ML models, which could be disseminated and installed on the UEs (such as AR glasses) of GA participants for e.g., detecting interesting physical objects or providing vivid AR effects, etc. In reality, UEs may not pre-download and pre-install the needed UEAFs for a GA due to several reasons, e.g., limited storage capacities on the UE, lack of time to do so, inconvenience to a human user, no UEAF pre-access/downloading right, etc. Instead, UEs may need to download the same UEAF from a centralized repository and install it at runtime. However, this may lead to communication redundancy since each UE may download the same UEAF independently. Such redundant/repetitive downloading may add a significant workload to the serving wireless system. More importantly, each participant UE may need to operate UEAF individually without coordination/collaboration, this may also lead to computing redundancies since the processing to be conducted by UEAs on different UEs may also be repetitive.

The second key issue is how to efficiently deploy and operate a large-size UEAF over multiple entities. In an example, the second key issue focuses more on large-size UEAF deployment aspect. A large-size UEAF is composed of many UEAs that may also require large allocations of resources (compute, storage, GPU, etc.) Accordingly, no single entity (UE, CPE, edge host, etc.) can operate the entire UEAF. To efficiently utilize of available resources, resources on several UEs may be leveraged in coordination with addition to resources within the network (e.g., on-premise local edge, or network edge). Currently, there is no solution to how to enable collaboration among different entities so that they could jointly download and operate a huge-size UEAF.

In an example, a UEAF could also refer to next-generation Mix-of-Expert (MoE), which is a combination of multiple AI/ML models in large size. There is a need to deploy a huge-size UEAF to the network edge. To maximize utilization of any available computing resources, resources on UEs may be leveraged in addition to resources within the network edge. However, no single entity can hold the whole AI/ML model, meaning that the huge-size UEAF has to be deployed over multiple entities. It may be desired to enable collaboration among different entities so that they could jointly download and operate a huge-size MoE-like UEAF.

In various embodiments, a new Application Deployment and Processing Coordinator (ADPC) is provided to enable collaborative UEAF deployment and processing.

In some examples, ADPC is different from existing orchestrator for managing the deployment of applications on computing/worker nodes (e.g., in a server farm owned by an organization), which are often in the same trust domain and/or those computing nodes always follow the commands/instructions issued by the orchestrator. Instead, ADPC aims to build a “collaboration infrastructure” across different UEs, which are not in the single trust domain and usually operate individually (e.g., download and install certain UEAs) based on business logic. As such, this disclosure proposes that ADPC leverages blockchain-related technology (e.g., smart contract) to establish trust relationships with multiple UEs and to establish and maintain a trustworthy collaboration infrastructure. A collaboration infrastructure is defined as a UE collaboration workgroup. If a UE is a member of the collaboration infrastructure, its UEAF deployment/processing needs may be collaboratively achieved by other members, which is mainly coordinated by ADPC.

A procedure of enabling UE collaboration infrastructure for UEAF deployment and processing is proposed. Based on the established UE collaboration infrastructure, a general procedure is proposed for realizing collaborative UEAF deployment and processing. The general procedure proposed can be modified/customized and are applicable to a wide range of application use cases and scenarios. For example, the general procedure may be customized for supporting human-involved 6G applications with uniform user experience, and/or 6G industrial robot crew control. In another example, the general procedure proposed may be customized for supporting human-involved 6G applications with differentiated user experience. In an example, the general procedure may be customized for supporting efficient deployment and operation of MoE-like UEAF.

A list of terms are used in one or more embodiments discussed herein.

Application Deployment and Processing Coordinator (ADPC): A logical entity that can enable collaboration among different UEs for efficient UEAF deployment and processing/operation.

Group Event (GE): A social event that multiple people may participant in. A given GE may include one or more GAs.

Group Activity (GA): A specific social activity that multiple people may participant in. For example, visiting a park can be regarded as a GE while playing a specific game in the park can be regarded as a GE.

Mix-of-Expert (MoE): A mix of multiple AI/ML models. A MoE may receive different types of inputs and conduct multiple different types of AI/ML jobs.

Task: To realize collaborative UEAF deployment and operation, ADPC may assign a task to a UE participant. In this disclosure, downloading/running one particular UEA is deemed as one task (how to run/operate task may refer to where/how to collect inputs for a UEA, what software shall be installed for process the collected inputs and where the output shall be delivered). For example, ADPC-1 may assign a Task-1 to UE-1 and Task-1 asks UE-1 to download, install and operate UEA-1. ADPC-1 may assign one or more tasks to UE-1.

UE Application (UEA): An individual software component deployed on a UE. Examples include: a phone application (such as from an app store), a service, a function (e.g., when realizing function-as-a-service), or any piece of software component/module.

UE Application Family (UEAF): UE software package used for particular given GA. A UEAF is composed of one or more UEAs.

UEAF Repository (UEAF-R): A repository that stores the software packages of one or more UEAFs. UEs may download desired UEAF(s) from UEAF-R.

UE Collaboration Guide (UECG): To enable collaborative UEAF deployment and operation, ADPC creates a UECG for each UE participant (as a member of the UE collaboration infrastructure). The UECG specifies the UEAF downloading/processing task(s) to be assigned to a particular UE participant and the detailed instructions regarding how this UE shall complete the assigned task(s). A task may instruct the UE what kinds of UEAs should be downloaded and operated, where and how to collect inputs for the installed UEAs and how to share the outputs with others.

UE Collaboration Infrastructure: A collaboration infrastructure is a group of UEs (i.e., a work group), who are willing to collaborate for UEAF deployment and operation. If a UE is a member of the collaboration infrastructure, its UEAF deployment/processing needs may be collaboratively achieved by other members, which is coordinated by ADPC.

Overview of Application Deployment and Processing Coordinator (ADPC)

To address the issues identified in key issues discussed above, this disclosure proposes a new method and procedure to enabling collaboration among different UEs for efficient UEAF deployment and processing/operation. A new Application Deployment and Processing Coordinator (ADPC) coordinates a UEAF's deployment/operation among several UEs. ADPC could be deployed in the field, e.g. hosted by a UE, a CPN Residential Gateway (RG) or enhanced RG (eRG), a road-side unit, as an edge application server, or deployed on a serving base station, implemented as a NF in the 3GPP core network, implemented as an AF in a data network, or within a cloud or edge orchestration solution (e.g., Kubernetes, MEC orchestrator, NFV orchestrator, etc.), etc.

Work principles of ADPC may include one or more of the follow.

The general scenario is that multiple devices may intend to download and install the same UEAF when participating in the same GA-1. To enable UE collaboration, ADPC first needs to build a "UE Collaboration Infrastructure (UECI)" across different UEs (that may not be in the same trust domain). A collaboration infrastructure is a group of UEs (i.e., a work group), who are willing to collaborate for UEAF deployment and operation. If a UE is a member of the collaboration infrastructure, its UEAF deployment/processing needs may be collaboratively achieved by other member UEs, which is coordinated by an ADPC. In particular, ADPC is different from existing orchestrators for managing the deployment of applications on computing/worker nodes (e.g., in a server farm or in a cluster owned by a company/organization), which are in the same trust domain and/or those computing nodes may always follow the commands/instructions issued by the orchestrator. Here, UEs are not in the single trust domain and they can individually operate (e.g., download and install certain UEAs) based on business logic. The member UEs are not just a worker node managed/controlled by the existing orchestrator. As such, ADPC leverages blockchain-related technology to establish a trustful collaboration relationship among UEs of different GA participants. To enable trust, ADPC may sign smart contracts with different UEs respectively, which may specify the detailed reward/penalty policies for regulating UE behavior during collaboration. The smart contracts are deployed in the blockchain system and can be automatically executed with certain triggers for certain penalty/rewards enforcement. The detailed procedure of establishing a UE collaboration infrastructure is illustrated in "Enabling UE Collaboration Infrastructure for UEAF Deployment and Operation".

Based on the established UE collaboration infrastructure, a "general" procedure is proposed for realizing collaborative UEAF deployment and processing. This general procedure proposed can be customized and applied to a wide range of application use cases and scenarios.

For example, the general procedure may be customized for supporting human-involved 6G applications with uniform user experience and/or 6G industrial robot crew control.

For example, the general procedure may be customized for supporting human-involved 6G applications with differentiated user experience.

For example, the general procedure may be customized for supporting efficient deployment and operation of MoE-like UEAF.

The benefit of ADPC is illustrated by the following examples.

Multiple UEs participating in GA-1 may need to download/install/run the same UEAF-1. By establishing UE collaboration infrastructure, ADPC will act as a coordinator and propose a solution regarding how those participant UEs in GA-1 shall collaborate. ADPC creates a particular UECG for each UE participant (as a member of the UE collaboration infrastructure). The UECG specifies the UEAF downloading/processing task(s) to be assigned to a particular UE participant and the detailed work instructions regarding how this UE shall complete the assigned task(s). As a result, each participant UE may download and run a subset of UEAs in UEAF-1. In the meantime, once participant UEs (e.g., UE-1) run their assigned UEAs (e.g. UEA-1) and obtain useful outputs, they (e.g. UE-1) may share the outputs with other UEs such as UE-2 (e.g. UE-2 may use the output as inputs for another UEA hosted by UE-2). Through such a UE collaboration, UEAF-1's downloading/deployment/processing redundancy is minimized (addressing the first key issue discussed herein). Once a UE collaboration infrastructure is established, it may be used for collaborative operation in multiple GAs (e.g., utilized for several UEAFs' deployment and operations).

In another example, a large-size UEAF (many UEAs with large download size and/or resources requirements) need to be deployed over multiple entities (UEs, CPEs, edge hosts, etc.) having limited storage, computing, and capacities (e.g., GPUs, etc.). For example, the UEAF could be a MoE. ADPC may collects the capabilities or capabilities information from the multiple potential nodes/entities and creates a UECG for each network entity/node/UE so that different network entities/nodes/UEs may work together to guarantee the smooth operations of the MoE (addressing the second key issue discussed herein).

The following notes are applicable to embodiments discussed herein.

Blockchain technology is used as a general term to represent much broader distributed ledger technology. In other words, blockchain technology and distributed ledger technology are used synonymously or interchangeably in this invention. As such, the embodiments discussed herein are also applicable to any specific blockchain technology and/or distributed ledger technology.

Various embodiments discussed herein take the 3GPP 5G system as a typical example of a wireless system. However, the embodiments discussed herein can also be used for the future generation of the 3GPP system (such as 6G and beyond), as well as any other types of wireless and fixed access systems (such as WiFi).

When explaining the details of the embodiments discussed herein, UEs (interchangeable with WTRUs), base stations (e.g., gNB), and network functions as an example of entities in the wireless system. However, the embodiments discussed herein can be applied to any terminals or entities, such as but not limited to laptops, Internet-of-Things devices, equipment, future cellphones, drones, roadside units, TV set-top boxes, gateways, access points, satellites, sensor nodes, robots, machines, routers, base stations, radio access network central units, radio access network distribution units, radio access network radio units, network functions in 5GS and/or 6GS, etc.

The term UEAF defined in this disclosure can refer to any software package, software library, software framework, software bundles, software suite, app bundles, app suite, etc.

The term UEA defined in this disclosure can refer to any software installed on a terminal or entity, such as but not limited to device function, network function, edge application server, vertical application software, application client, etc. A UEA downloaded/deployed on UE-1 may refer to 1) a new UEA instance is created on UE-1 or 2) an existing UEA instance that is migrated (e.g., from an edge or cloud server or other UE) to UE-1.

Representative Procedure for Enabling UE Collaboration Infrastructure for UEAF Deployment and Operation To enable UE collaboration for UEAF deployment and processing, ADPC first needs to establish a UE collaboration infrastructure among different UEs. In particular, since UEs may belong to different organizations or may not be in the same trust domain, blockchain technology is utilized so that work agreement(s) can be formed between each participant UE (e.g., UE-1) and the ADPC. They can be implemented as smart contracts deployed on a blockchain system for automatic execution. For example, the smart contract may specify: 1) the benefit that can be obtained by UE-1 for being as a member of this collaboration infrastructure (for example, UE-1 does not have to install UEA-1 but may use the output of UEA-1 shared by other members); and 2) the obligations/responsibilities that need to be provisioned by UE-1 for being as a member of this collaboration infrastructure (for example, ADPC may assign certain UEA deployment and operation tasks to UE-1. A UEA deployment and operation task instructs UE-1 regarding what kinds of UEA(s) to download and how to run and operate the assigned UEA(s)); 3) Any other policies, incentivization mechanisms (e.g., rewards/penalty rules) regulating UEs' behaviors when participating a group activity. The smart contract established between ADPC and a participant UE-1 can be used in a series of GAs in the same GE, or even across multiple GEs. For example, in the natural history park use case, once multiple UEs (e.g., those of the tourist members sitting in the same bus) form a collaboration infrastructure, this infrastructure can be used for supporting collaborative UEAF deployment and processing when visiting a series of showcase fields (as multiple GAs) in the park.

Figure 4:
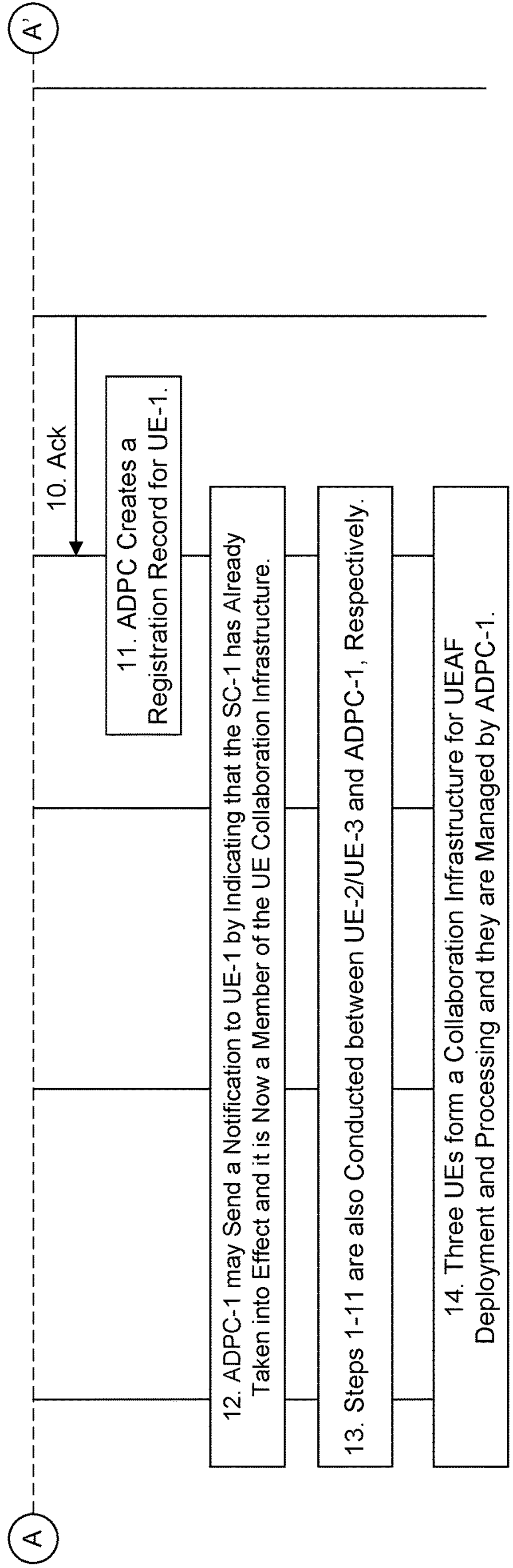
FIG. 4 is a flow diagram illustrating an example procedure of enabling UE collaboration infrastructure for UEAF deployment and processing, according to one or more embodiments.

In an embodiment, referring to FIG. 4, a detailed example procedure of enabling UE collaboration infrastructure for UEAF deployment and processing is provided.

Precondition. There is an ADPC-1 in the system, which could be hosted on various entities. For example, in the natural history park use case, ADPC-1 could be the UE of the tourist guide or could be an edge/gateway node installed on the bus. There could be multiple showcase fields in the park and the tourist guide may lead his/her tourist group to visit each of those showcase fields. Accordingly, visiting a particular showcase field can be regarded as a GA. Another example, in the golf match use case, the UE of a work staff may act as an ADPC and the audience crowd may move between different holes (watching the match at a particular hole can be regarded as a GA). When participating in a particular GA, participant UEs may intend to download and install a corresponding UEAF (e.g., UEAF-1). The required UEAF may be stored in a remote UEAF Repository (UEAF-R), such as a cross-operator shared repository, a local repository in an edge network, a network function repository, a device function repository, an application store, etc.

Step 1. UE-1 sends an ADPC discovery request to UEAF-R to identify an available ADPC. In this request, the following parameters could be indicated:

The identifier of UE-1. This is to indicate the identifier of UE-1. This could be any type of identifier, such as IP address, MAC address, IMEI number, IMSI number, etc.

The indication for joining UE collaboration infrastructure. This is to indicate whether UE-1 is willing to be as a member of UE collaboration infrastructure for UEAF deployment and processing.

The planned one or more activities to participate in and the corresponding UEAFs are to be used. This is to indicate what kinds of activities that UE-1 intends to participate in. In general, UE-1 may model each activity using a triple: Activity Triple (AT)={AT identifier, activity location information, UEAF identifier and a list of UEA identifiers (optional)}.

UE-1 may assign an identifier to an AT and such activity identifier is the first piece of information in the triple. The activity location information indicates where UE-1 intends to participate in the activity, which could be a geolocation coordinates, a geolocation zone, a location zone identity, a civic location, an indoor location, etc. The UEAF identifier indicates UE-1 intends to use which UEAF when participating in the activity. For example, in the golf match use case, Lisa's UE may indicate she is going to watch the match of all or part of the holes. In particular, one AT may describe that Lisa may plan to use a UEAF-X when watching the match at hole #1 and another AT describes Lisa will then be in the watching area of hole #2 and another UEAF-Y is needed for watching the match at hole #2, and so on. Optionally, in certain cases, UE-1 may not want to use all of the UEAs in the desired UEAF (as identified by UEAF identifier). Instead, it may just leverage a subset of preferred UEAs in the desired UEAF. If that is the case, a list of UEA identifiers may also be included. In default, if the UEA identifier list is not present in the AT, it means that UE-1 want to use all the UEAs in the desired UEAF.

For an AT-1 defined by UE-1 and AT-2 defined by UE-2, there are two approaches to decide whether AT-1 and AT-2 are referring to the same activity, i.e., such an activity is a GA attended by both UE-1 and UE-2. The first approach is that the AT identifiers included in AT-1 and AT-2 are globally unique. If that is the case and both AT-1 and AT-2 has the same AT identifier, it means that UE-1 and UE-2 is attending the same activity. The second approach is that the AT identifiers included in AT-1 and AT-2 are locally unique. In this case, it means the AT identifier can be in any form. Then, activity location information and UEAF identifier can be utilized to decide whether UE-1 and UE-2 are attending the same activity. For example, if the activity location information and the UEAF identifier included in AT-1 and AT-2 are the same, which means that UE-1 and UE-2 are attending the same activity and need to use the same UEAF.

Step 2. Since UE-1 has indicated that it is willing to join a UE collaboration infrastructure, UEAF-R may identify a location area where UE-1 plans to participate in one or more activities (i.e., based on the "activity location information" parameter of each of ATs as listed in Step 1). Then, UEAF-R may have two approaches to select an ADPC:

Just-in-time/localized approach: UEAF-R may send a local broadcast to the desired area of UE-1 to see if there is any available ADPC in the GA area. For example, the UEAF-R may need to leverage the broadcasting capabilities provided by the underlying wireless system, such as 3GPP ProSe Direct Discovery to deliver an ADPC discovery broadcast to a certain area. For example, in the natural history park use case, UEAF-R may send a local broadcast to the park and receives a positive acknowledgement from a tourist guide's UE indicating that it can be an ADPC.

ADPC pre-registration approach: an entity acting as an ADPC may previously register as an ADPC to UEAF-R. This means that UEAF-R may also act as an ADPC registry for facilitating ADPC discovery. Then, in this case, UEAF-R may just select a desired ADPC for UE-1 from its ADPC registry.

Step 3. UEAF-R indicates UE-1 that there is an available ADPC-1, which can help it for collaborative UEAF deployment and processing. Useful information such as how to contact ADPC-1 (e.g., ADPC-1's IP address and port, URI, security credentials to communicate with ADPC-1, etc.) will be indicated to UE-1.

Note that, Step 1 to Step 3 are to discover ADPC via a UEAF-R. Alternatively, a UE may proactively send a local broadcast and declare itself as an ADPC. For example, in the natural history park use case, the UE of the tourist guide may declare itself as an ADPC to all the members in a tourist group. If that this the case, those UEs do not need to contact UEAF-R for ADPC discovery. In this case, when an entity intends to declare its role as an ADPC, one or more parameters may be included in its local broadcast: the identifier of the entity, an indication of its role as an ADPC, the current location of the entity, the service area of the entity, the work schedule of the entity, and/or the service fee to be charged by the entity.

Step 4. UE-1 sends a request to ADPC-1 to join the UE collaboration infrastructure. The following information can be included in this request:

The identifier of UE-1. This is to indicate the identifier of UE-1.

The blockchain capabilities. UE-1 may indicate to ADPC-1 whether it has any blockchain capability e.g., UE-1 can operate with which type of blockchain systems.

UE capabilities/capacities. This is to describe what the of resources UE-1 has for UEA deployment. The following types of capabilities/capacities may be described: 1) The computing capacities. This is to indicate how many computing resources UE-1 would like to contribute if it becomes a member of the UE collaboration infrastructure. Computing capabilities include but are not limited to CPU/compute, storage, GPU, operating system or virtualization capabilities, etc. 2) The communication capabilities/capabilities. This is to indicate the communication resources of UE-1 that can be used for UE collaboration, such as whether UE-1 has different communication technology interfaces (such as cellular, Wi-Fi, Bluetooth, D2D, etc.) and how much communication resources UE-1 would like to contribute if it becomes a member of the UE collaboration infrastructure. 3) The sensing capabilities. This is to indicate what sensing resources UE-1 has. For example, UE-1 may have various on-board sensors, cameras, radars, sensing inference capabilities (like image detection, etc.). Note that, the sensing-related hardware may provide the needed inputs to the UEA(s).

The planned activities and the corresponding UEAFs are to be used. This parameter may include a list of ATs (as listed in Step 1).

A blockchain address of an existing smart contract. If UE-1 has established a smart contract with ADPC-1 before and such a smart contract can be re-used, then UE-1 may this parameter in this step.

Step 5. Since ADPC-1 may not have any direct control over UE-1, it is possible that UE-1 may have unexpected or undesired behavior. As a result, ADPC-1 may use smart contract to regulate the behavior of UE-1. If UE-1 has indicated a blockchain address of an existing smart contract, then ADPC-1 knows that an existing smart contract can be re-used. Here, it is assumed that UE-1 did not indicate any existing smart contract in Step 4, e.g., UE-1 and ADP-1 have never built a smart contract (or a previous smart contract has already expired).

In an example, ADPC-1 creates a new Smart Contract-1 (SC-1) proposal for UE-1 by specifying UE collaboration-related regulations/rules. Some detailed information may be included in the smart contract, including one or more of:

An ADPC identifier.

A UE identifier (i.e., UE-1's identity as a member of the UE collaboration infrastructure).

A UECI identifier. The identifier of the belonging UE collaboration infrastructure. In certain cases, ADPC-1 may create multiple UE collaboration infrastructure (i.e., a single UE may be a member of several workgroups). If that is the case, ADPC-1 may also assign an identifier to each UE collaboration infrastructure. For easy illustration, for now, it is assumed that ADPC-1 mainly maintains one UE collaboration infrastructure.

A work scope of the smart contract. This is to indicate SC-1 shall be applicable to which activities. In Step 4, UE-1 indicated to ADPC-1 about which activities that UE-1 intends to participant in (in terms of a list of ATs). Accordingly, the smart contract could include a list of AT identifiers as its work scope.

Some of the example policies/rules for regulating UE-1's behavior may include:

UE-1 may periodically report its current capabilities or capacities to ADPC-1, so that ADPC-1 may get to know the true status when conducting UEA download/processing task assignments among UEs. If UE-1 fails to do for so more than X minutes, a certain penalty shall be incurred and the ADPC-1 may also need to generate a mitigation plan, e.g., to migrate UEAs hosted on UE-1 to other UEs.

ADPC-1 may issue a task to download/deploy and operate an UEA to UE-1. UE-1 may decide whether to reject or accept the task based on its runtime capabilities/capacities. However, UE-1 needs to accept at least Y tasks (e.g., Y=1) among Z (e.g. Z=3) consecutive task assigned by ADPC-1. Otherwise, a certain penalty shall be incurred, or UE-1 may get expelled from the UE collaboration infrastructure.

Once UE-1 downloads and runs a particular UEA as assigned by ADPC-1, UE-1 shall share the output with other UEs (e.g., UE-2) based on the instructions advised by ADPC-1. ADPC-1 may decide whether UE-1 has any discrimination for delaying or not sharing its outputs, based on feedback from both UE-1 and UE-2. If any discrimination is identified, a certain penalty shall be incurred.

In turn, UE-1 may also receive the outputs of UEAs run by other UEs (which are also the members of the UE collaboration infrastructure). ADPC-1 may require UE-1 to report true feedback about the quality of the received outputs. For example, if UE-1 often gives negative feedback for the quality of the outputs shared by another UE-2 and it is not aligned with feedback reported by other UEs, a certain penalty may be incurred.

Other rules for regulating UE-1's behavior. For example, in the natural park use case, when uniform user experience is to be delivered to multiple UEs, the viewports captured by UE-1 (e.g., a view of showcase field #8) may be processed by UEAs (deployed on UE-1). The corresponding outputs of those UEAs (e.g., detected animals/plants in the showcase field #8) will be further shared with other UEs. However, if the viewports captured by UE-1 are not aligned with other UEs (e.g., if the human user of UE-1 always looks around and does not listen/follow tourist guide's instruction), it means the outputs produced by UE-1 may not be useful at to other UEs.

The smart contract may also include a general reward calculation module. Since the smart contract's work scope may involve multiple activities, it defines a general reward/penalty calculation module, which can be applicable to multiple activities that UE-1 plan to participate in. This module is to calculate how much rewards UE-1 shall earn or pay, depending on how it performs during collaborative UAE download/operation task(s) as assigned by ADPC.

For example, ADPC-1 may assign a specific Task-1 to UE-1. Task-1 asks UE-1 to download and run a particular UEA, such as UEA-1. Accordingly, UE-1 may execute the Task-1 (e.g., download/install UEA-1 and run UEA-1). During operation of UEA-1, certain inputs may be injected into UEA-1, which may process the input and then produce output(s). UE-1 may share the output of UEA-1 to another UE-2. In this disclosure, for illustration purposes, it is assumed that UE-1 will be the UE producing output while UE-2 will be the UE receiving the output shared by UE-1. However, it is worth noting that ADPC-1 may also assign a different task to UE-2, in which UE-2 produces output and the output will be shared with UE-1. During operation of UEA-1, the following information may be collected periodically (e.g., based on system configuration) from different parties, which will be sent to this general reward/penalty calculation module included in the smart contract establishment between ADPC-1 and UE-1:

Parameter Set-1: Parameters to be collected from ADPC-1, which is decided when ADPC intends to assign Task-1 to UE-1. After ADPC-1 finishes assigning Task-1 to UE-1, ADPC-1 will send Parameter Set-1 to SC-1 during the Step 15 of FIG. 5 (as the first trigger for SC-1's execution).

Expected performance/quality requirement(s) of Task-1 (posed by ADPC-1): The maximum time cost for UE-1 to capture inputs for UEA-1. The minimum number of inputs that need to be captured by UE-1 during a given time period. The minimum quality of captured inputs. For example, if the input is an image, the image needs to have a minimum resolution. The desired processing speed of UEA-1. This indicates what is the desired time cost for UEA-1 to process a given input. The minimum quality of the outputs of UEA-1. For example, in natural history park the use case, the output of AI/ML models indicates the detected rare-species animals/plants and their locations. Such detection results shall have a certain level of accuracy. The maximum tolerant delay for sharing the outputs of UEA-1 with other UEs (e.g., UE-2).

Potential reward for UE-1 if UE-1 meets all the performance or quality requirement(s) as listed above. The potential rewards may be collected from the blockchain accounts of other UEs (who would like to receive the outputs of UEA-1 shared by UE-1). ADPC-1 may decide this value based on experience or current market price. However, if UE-1 can only partially meet the performance or quality requirement(s), it may only obtain partial reward, which will be calculated by the general reward calculation module.

Service fee to be paid to ADPC-1 for its coordination effort.

Parameter Set-2: Parameters to be collected from UE-1 (for executing Task-1 and producing output), which will be collected from UE-1. For example, after UE-1 produces and shares the outputs of Task-1 with other UEs (e.g., UE-2), UE-1 will create Parameter Set-2 and send it to SC-1 during the Step 32 of FIG. 5 (as the second trigger for SC-1's execution).

Actual achieved performance for performing a task, e.g., Task-1. For example, the following performance or quality information may be collected from UE-1:

- How long for UE-1 to capture inputs for UEA-1.
- How many inputs were captured during a given period.
- The actual processing speed of UEA-1.
- A subjective evaluation of the quality of the outputs of UEA-1, e.g., good, fine, poor.
- The actual time delay for delivering the outputs of UEA-1 to other UEs (e.g., UE-2).

Parameter Set-3: Parameters to be collected from output receipt(s) (such as UE-2), which is/are UE(s) receiving the outputs of UEA-1 shared by UE-1. For example, after UE-2 receivers the outputs from UE-1, UE-2 will evaluate the output quality and output delivery performance, and then UE-2 will generate Parameter Set-3 and send it to SC-1 during the Step 35 of FIG. 5 (as the third trigger for SC-1's execution).

Actual perceived performance. For example, the following performance information may be collected from UE-2:1) when the outputs of UEA-1 were received, and/or 2) a subjective evaluation of the quality for the received output (e.g., good, fine, poor).

Based on the above inputs from different stakeholders/parties, the general reward/penalty calculation module could decide the actual rewards that UE-1 should obtain and then such rewards can be automatically allocated/deducted by the smart contract.

Step 6. ADPC-1 sends an acknowledgement to UE-1, along with the proposed SC-1. In addition, ADPC-1 may also indicate to UE-1 how many other UEs have already joined the collaboration infrastructure, which may increase the confidence of UE-1 to join the collaboration infrastructure.

Step 7. It is possible that UE-1 may not agree with the initial content of SC-1. As such, further negotiation may be needed to finalize the smart contract content between UE-1 and ADPC-1. For example, UE-1 may indicate to ADPC-1 which provisioning/rules/policies/parameter values in the SC-1 are not desired. Accordingly, ADPC-1 may make certain modification until a final consensus can be achieved. After that, UE-1 may sign the final version of SC-1 using its private key.

Step 8. Once UE-1 and ADPC-1 reach a consensus on the final contents of SC-1 as done in Step 7, ADPC-1 may also sign SC-1 using its private key and submit it to the blockchain system via a Blockchain Node-1 (e.g., BCN-1). For example, assuming BCN-1 is a near-by full blockchain node, ADPC-1 may interact with BCN-1 and BCN-1 may be responsible for recording SC-1 into the blockchain system.

Step 9. BCN-1 successfully deploys SC-1 in the blockchain system.

Step 10. BCN-1 sends an acknowledgement to ADPC-1 indicating that SC-1 has been deployed in the blockchain system, along the blockchain address of SC-1.

Step 11. ADPC-1 creates a registration record for UE-1, meaning that UE-1 now is a member of the UE collaboration infrastructure. UE-1 is available to be assigned one or more UECGs from ADCP-1 for collaborative UEAF deployments and processing.

Step 12. ADPC-1 may send a notification to UE-1 by indicating that the SC-1 has already taken into effect and it is now a member of the UE collaboration infrastructure.

Step 13. Steps 1-11 may also be conducted between UE-2/UE-3 and ADPC-1 (i.e., ADPC), respectively. Note that, if all the participants UE-1/UE-2/UE-3 are the same type of devices and/or are from the same organization, it is possible that all of those UEs may want to adopt the same contents for smart contract. If that is the case, a group smart contract can be established between ADPC-1 and UE-1/UE-2/UE-3, i.e., no individual smart contract between ADPC-1 and each participant UE needs to be established. In the group smart contract, it can include all the parameters listed in Step 5 and the following new parameters: the identifier of a group and/or the member list of the group.

Step 14. After Step 13, three UEs have signed smart contracts with ADPC-1 and now three UEs (UE-1/UE-2/UE-3) form a UE collaboration infrastructure for UEAF deployment and processing and they are managed by ADPC-1, for example using the example procedure discussed in "General Procedure for Collaborative UEAF Deployment and Operation".

Representative Procedure for Collaborative UEAF Deployment and Operation

Figure 5:
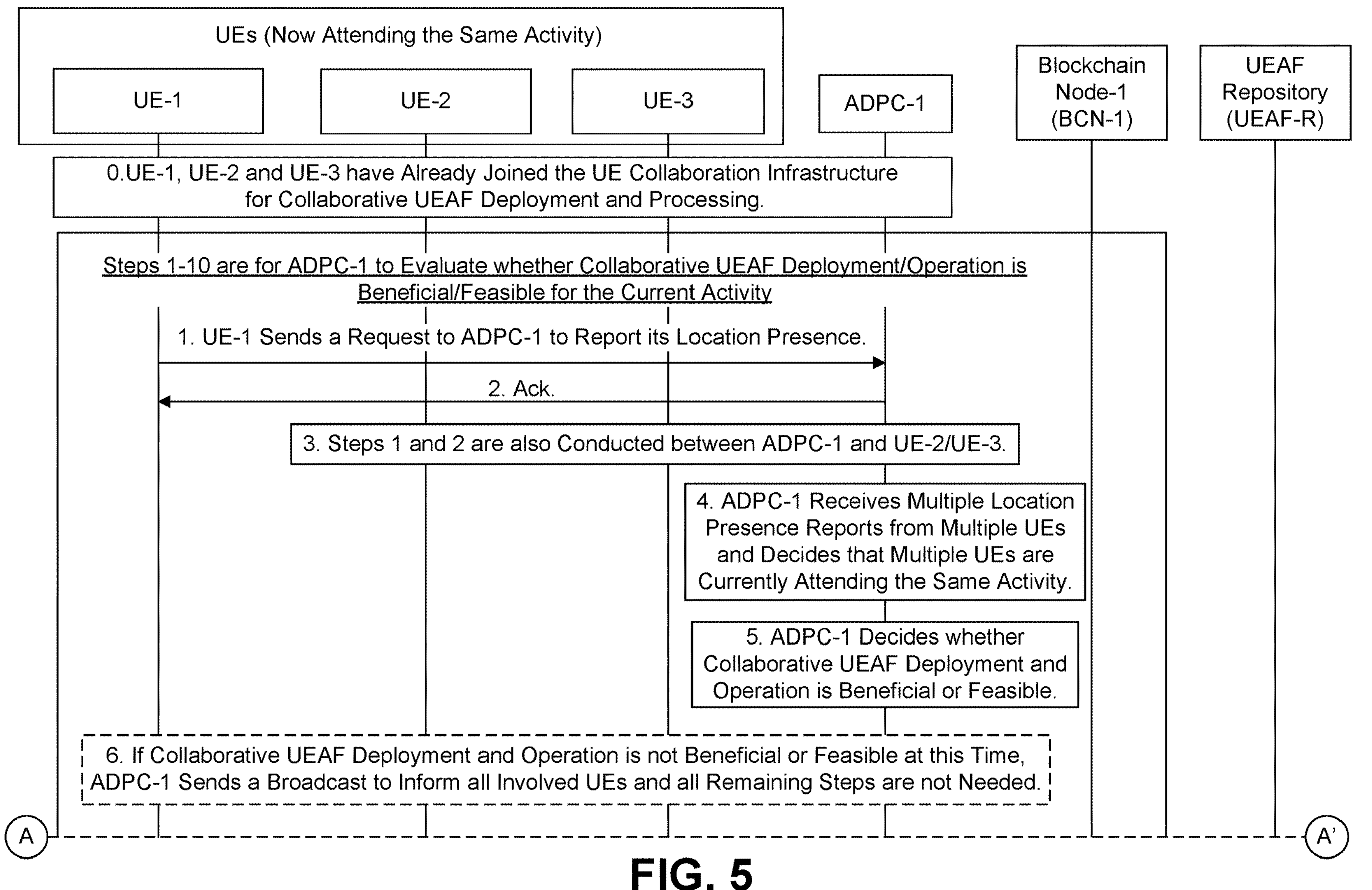
FIG. 5 is a flow diagram illustrating an example procedure of collaborative UEAF deployment and operation, according to one or more embodiments.
Figure 5:
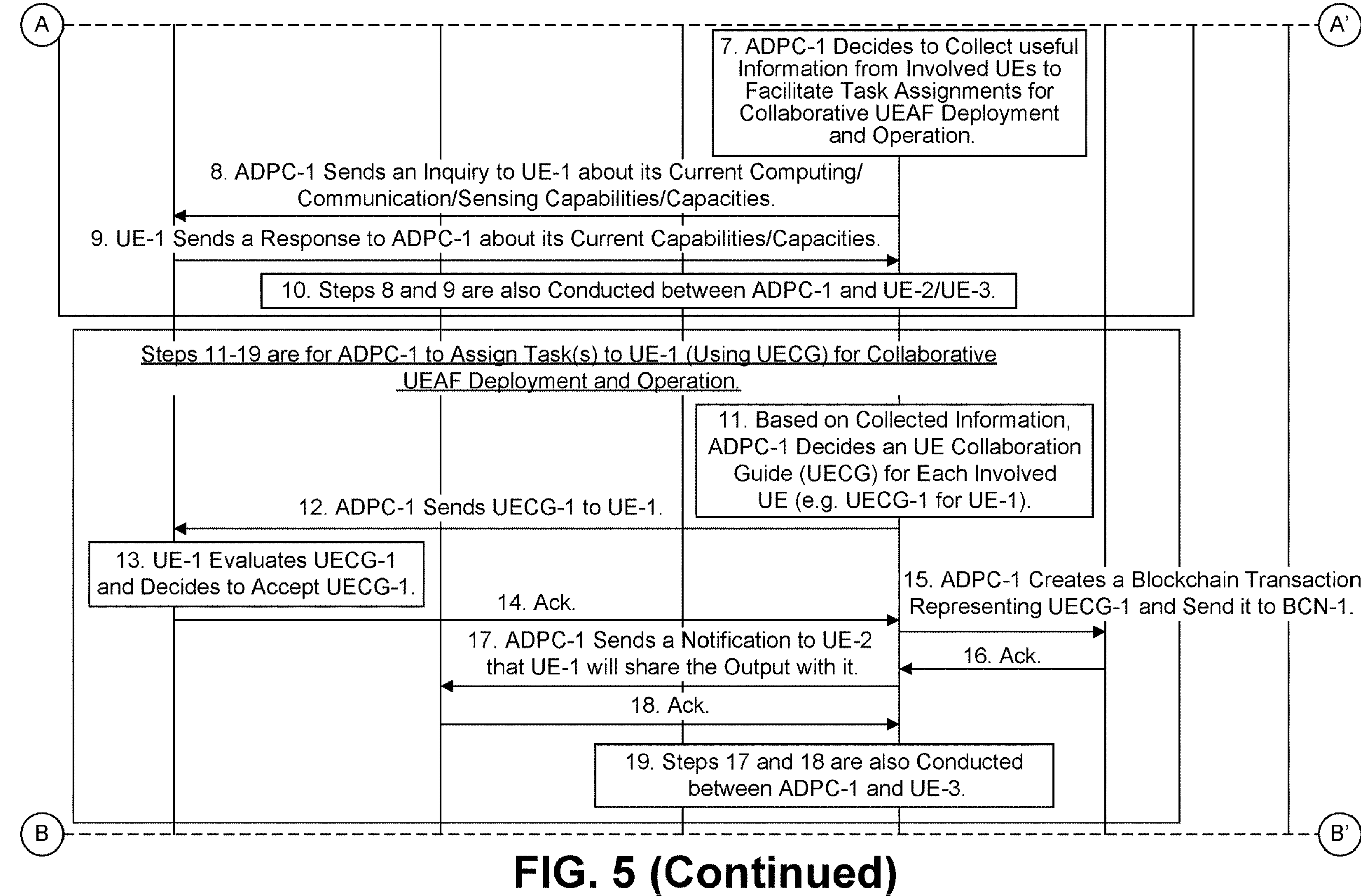
Figure 5:
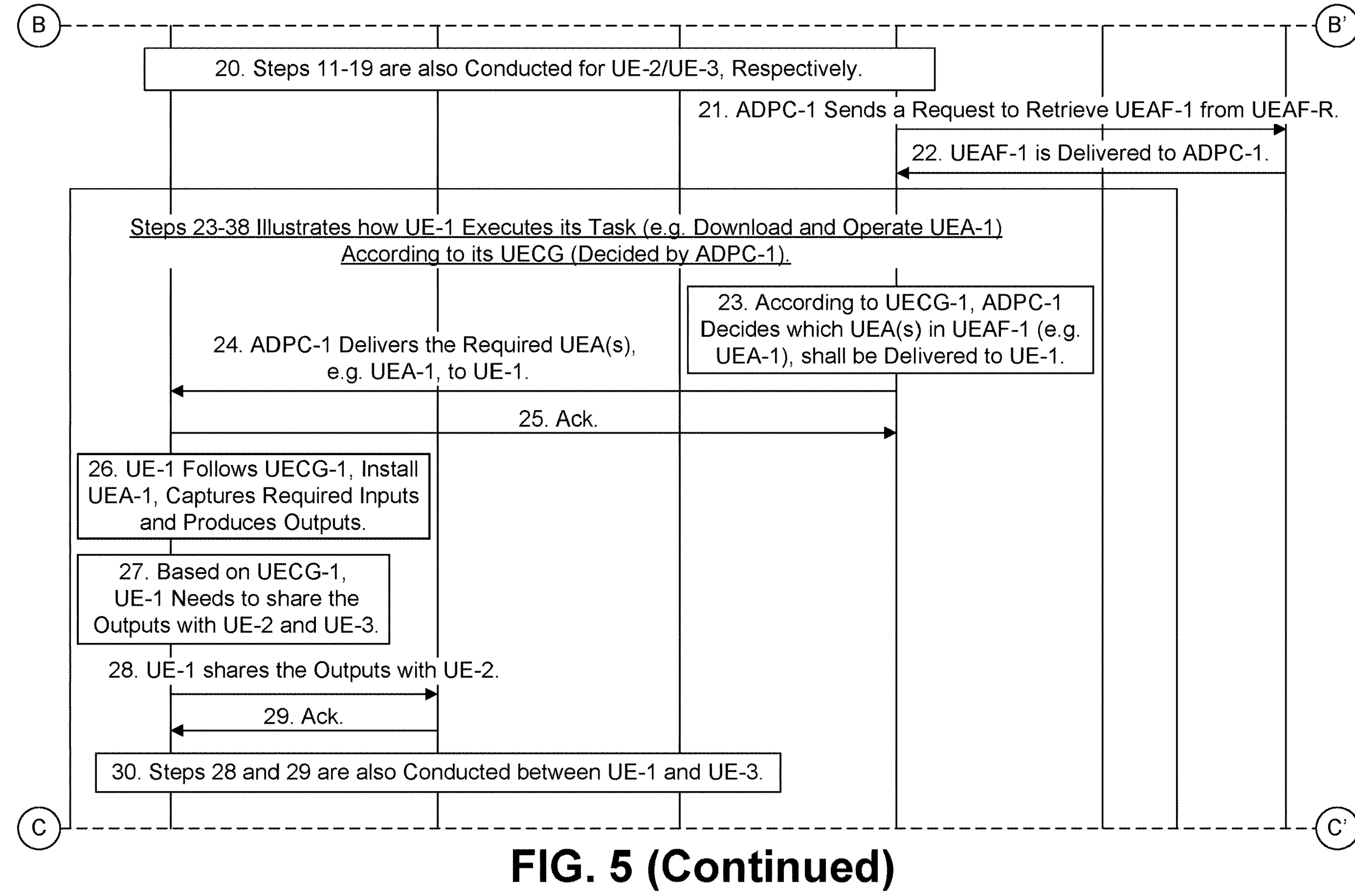
Figure 5:
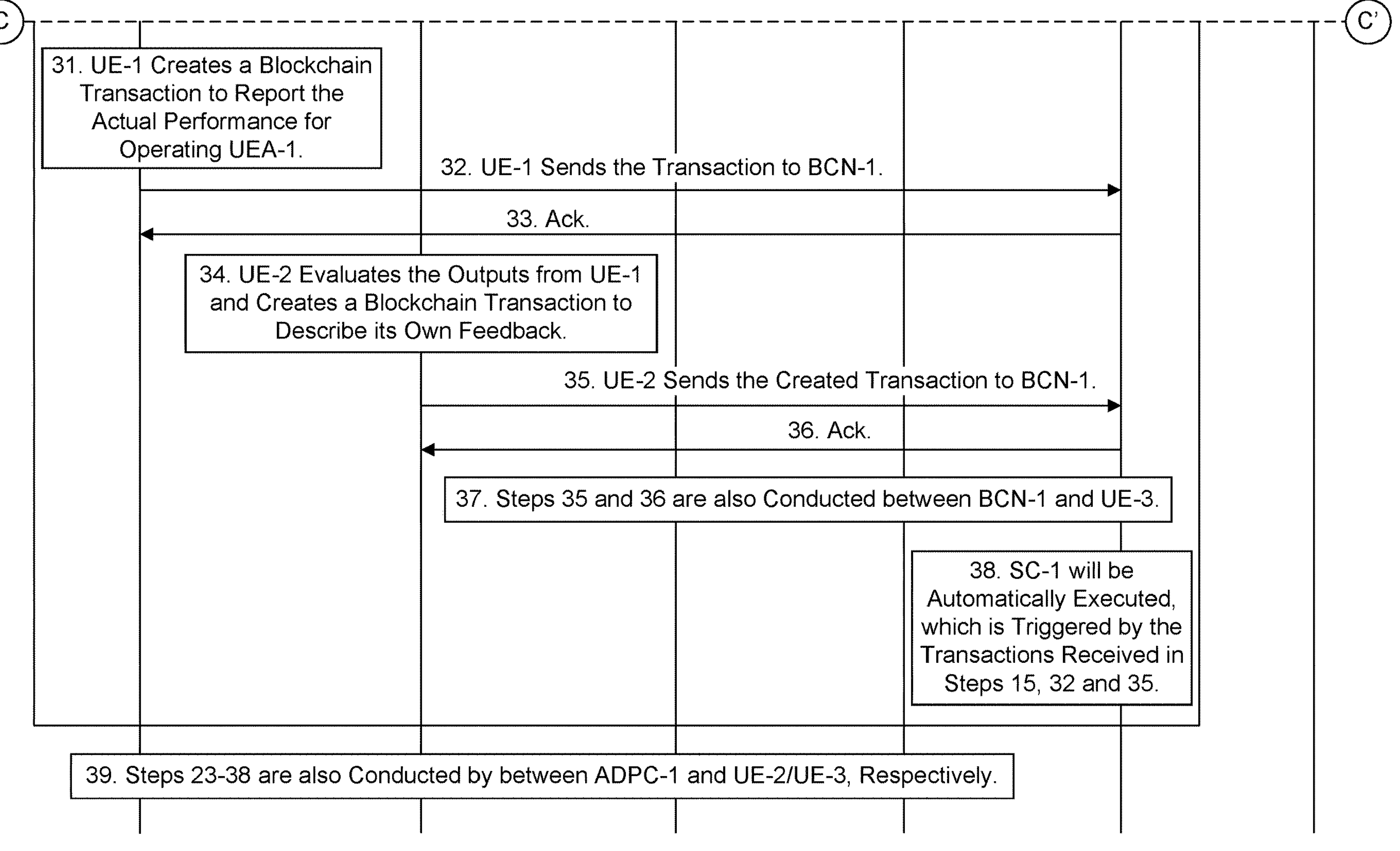

The detailed procedure of collaborative UEAF deployment and processing is proposed in FIG. 5. For illustration purpose, here it is assumed that UEAF-1 has three UEAs (e.g., UEA-1, UEA-2, UEA-3). The following scenario (which is similar to Use Case-1 and Use Case-2) is used as an example when illustrating the details: UE-1, UE-2, UE-3 are three UEs that are attending the same activity and have joined the UE collaboration infrastructure. Each of those UEs has needs to download/operate one or more UEA(s) when attending the activity. However, it is worth noting that the procedure proposed in this section can also be applicable to the scenarios that is similar to Use Case-3.

Precondition. UE-1, UE-2, and UE-3 (acting as participant UEs in a GE) have discovered ADPC-1 and a UE collaboration infrastructure was formed using the example procedure discussed in FIG. 4.

Steps 1-10 are for ADPC-1 to evaluate whether collaborative UEAF deployment/operation is beneficial/feasible for the current activity.

Step 1. UE-1 proactively reports its location presence to ADPC-1 when arriving a given location/area (where an activity happens). The following parameters may be indicated in this step:

UE-1's identifier; and/or

AT identifier. This is to indicate which activity UE-1 is currently about to attend. In the Step 4 of FIG. 4, UE-1 has already indicated a list of activities to be attended and each activity is described as an AT. An AT describes where UE-1 attends a planned activity and what UEAF is to be used. When UE-1 reports its location presence to ADPC-1, ADPC-1 could make sure UE-1 is present at a desired location to attend the planned activity (as described by the "activity location information" in an AT) since it is possible that UE-1 may have other emergencies and decide to not to attend a planned activity.

Step 2. ADPC-1 sends an acknowledgement to UE-1 for its location presence reporting.

Step 3. Steps 1 and 2 are also conducted between ADPC-1 and UE-2/UE-3.

Step 4. ADPC-1 receives multiple location presence reporting (from UE-1/UE-2/UE-3) and decides whether multiple UEs are attending the same activity. For example, ADPC-1 may check contents of involved ATs as indicated by different UEs. Assuming that UE-1 indicated AT-1, UE-2 indicated AT-2 and UE-3 indicated AT-3. Then, ADPC-1 may analyze AT-1/AT-2/AT-3 and find that UE-1/UE-2/UE-3 are attending the same activity and need to use the same UEAF-1. For example, there are two approaches for ADPC-1 to deduce whether multiple UEs are attending the same activity:

Based on AT identifier. In the Step 1 of FIG. 4, each UE may create a list of ATs describing what activities it plans to attend. When creating an AT, UE may assign it with a globally-unique identifier, e.g., by scanning a barcode on an information sign or on a flyer of this activity. In this case, multiple UEs attending the same activity will create their own ATs in Step 1 of FIG. 4 by using the same globally-unique identifier. If that is the case, in this step, ADPC-1 just needs to make sure multiple UEs indicated the same AT identifier in Step 1. If so, it means that those UEs are attending the same activity, i.e., this activity is a GA.

Based on activity location information and UEAF identifier. In the Step 1 of FIG. 4, each UE may create a list of ATs describing what activities it plans to attend. When creating an AT, UE may just assign it with a whatever locally-unique identifier. For example, assuming that UE-1 indicated AT-1, UE-2 indicated AT-2 and UE-3 indicated AT-3, and those ATs have the Following contents:

$$\text{Activity Triple}-1(AT-1) = \{AT-ID-23244, \text{ a park name/entrance, } UEAF-1, [UEA-1, UEA-3]\}$$

$$AT-2 = \{AT-ID-36785, \text{ a geographical area, } UEAF-1, [UEA-2, UEA-3]\}$$

$$AT-3 = \{AT-ID-14657, \text{ a } GPS \text{ address of park entrance, } UEAF-1, [UEA-1, UEA-2]\}$$

In this case, ADPC-1 cannot leverage AT identifier to decide whether multiple UEs are attending the same activity since the AT identifiers (e.g., AT-ID-23244, AT-ID-36875, etc.) in different ATs may not have any relevance. Instead, ADPC-1 will leverage the activity location information and the UEAF identifier as included in an AT. In particular, although different UEs may specify a different "activity location information" in their own ATs, ADPC-1 may deduce that they are describing the same area/location. For example, a geographical area as indicated by AT-2 (created by UE-2) may correspond to a park name as indicated in AT-1 (created by UE-1). Also, both AT-1 and AT-2 are associated with the same UEAF-1 (meaning UE-1 and UE-2 intend to use the same UEAF). Based on those two pieces of information, ADPC-1 may deduce that UE-1 and UE-2 are currently attending the same activity (i.e., as a GA)

Step 5. If ADPC-1 finds that multiple UEs are attending the same activity (as decided by Step 4), ADPC-1 may further decide whether collaborative UEAF deployment and operation is beneficial or feasible. For example, if multiple UEs are requiring to using the same UEAF, and in particular, their desired UEAs overlaps (UEs intend to use the same UEAs), it implies collaborative UEAF deployment and operation may be beneficial or feasible. In the above examples shown in Step 4, AT-1/AT-2/AT-3 (created by UE-1/UE-2/UE-3) are associated with the same UEAF-1. More than that, different UEs desire to use the overlapped UEAs in the UEAF-1. For example, as described in AT-1, UE-1 would like to download and operate UEA-1 and UEA-3 in the UEAF-1 while UE-2 would like to download and operate UEA-3 and UEA-5 in the UEAF-3. In this case, both UE-1 and UE-3 have the common needs for downloading and operating UEA-3, meaning that collaborative UEAF deployment and operation may be beneficial.

Step 6. If ADPC-1 decides that collaborative UEAF deployment and operation is not beneficial or not feasible at this time (e.g. in case where the best solution is to ask UEs to download/operate their desired UEAs independently, i.e. no collaboration), ADPC-1 may send a broadcast to inform all involved UEs so that those UEs would better to download and operate the desired UEAs by themselves and all remaining steps are not needed. Alternatively, it is possible that all the involved UEs may subscribe to ADPC-1 during Step 1 so that if collaborative UEAF deployment and operation is not feasible, each of those UEs may obtain a notification from ADPC-1. If so, ADPC-1 may send notifications to all the involved UE so that those UEs will download and operate the desired UEAs by themselves at this time.

Step 7. If ADPC-1 decides that collaborative UEAF deployment and operation is beneficial or feasible (as decided in Step 5), ADPC-1 may decide to collect useful information from involved UEs to facilitate task assignments for realizing collaborative UEAF deployment and operation.

Step 8. ADPC-1 sends an inquiry to UE-1 about its current computing/communication/sensing capabilities/capacities. For example, the inquiry may ask UE-1 to report the following information:

- Current computing capability/capacities, such as available CPU resources, etc.
- Current communication capability/capacities, such as currently available communication interface (e.g., cellular, Wi-Fi or both), current cellular uplink/downlink bandwidth, current cellular channel quality or signal strength, etc.
- Current sensing capabilities/capacities, such as available sensors, cameras, radars, etc.

Step 9. UE-1 sends a response to ADPC-1, which includes the useful information as requested in Step 8. Alternatively, UE-1 may also proactively report the useful information as included in Step 8 during Step 1. If that is the case, Steps 8 and 9 will not needed.

Step 10. Steps 8 and 9 are also conducted between ADPC-1 and UE-2/UE-3, respectively.

Steps 11-19 are for ADPC-1 to assign task(s) to UE-1 (using UECG) for collaborative UEAF deployment and operation.

Step 11. Based on the information collected from multiple participant UEs, ADPC-1 needs to decide how to do the task assignment among different UE participants, i.e., which UE shall download and run which UEAs. In particular, ADPC-1 creates a UE Collaboration Guide (UECG) for each UE (e.g., UECG-1 is a device specific collaboration guide for UE-1). The UECGs are to be delivered to each of the participant UEs so that collaborative UEAF deployment/processing can be realized. A given UECG-1 designed for UE-1 specifies one or more UEA downloading/processing task(s) to be assigned to UE-1 and the detailed work instructions regarding how UE-1 shall complete those assigned task(s), which may include the following information:

UEA Processing Task assignment(s): In this disclosure, downloading/running one particular UEA is deemed as one task. For easy illustration, here it is assumed that ADPC-1 decides to assign Task-1 to UE-1 and Task-1 asks UE-1 to download, install and run/operate/execute UEA-1. ADPC-1 may assign one or more tasks to UE-1. With the UE collaboration enabled by ADPC, UE-1 may only need to run a subset of UEAs in the UEAF-1.

For a particular Task-1 (i.e., UE-1 needs to download/run UEA-1), the following instructions are also decided by ADPC-1 (note that, if ADPC-1 assigns multiple tasks to UE-1, the same set of information as listed below will also be included for each task):

UEA Acquisition Instruction. This is to indicate how UE-1 shall obtain UEA-1. There could be several approaches: 1) ADPC-1 may be responsible for retrieving the whole UEAF-1 software package from the remote UEAF-R and then only deliver UEA-1 to UE-1 (as illustrated in Step 11); 2) Alternatively, ADPC-1 may suggest UEA-1 to directly download UEA-1 from UEAF-R if UE-1 has the sufficient communication resources (e.g. cellular bandwidth) for downloading UEA-1 directly.

UEA Input Capture Instruction. The input capture instruction provides information to UE-1 how to capture inputs for UEA-1 for processing. Depending on different use cases and application scenarios, the UEA input capture instruction may have various versions. Some examples are provided to specifically focus on different types of applications and use cases, and different forms of UEA input capture instructions will be illustrated in those sections, respectively.

A first example mainly focus on the applications or scenarios where participant UEs may intend to use the same set of UEAs and those participant UEs may capture the same/similar inputs for UEAs. As a result, the same/similar outputs of those UEAs will be delivered to all the participant UEs.

A second example mainly focus on the applications or scenarios where each of participant UEs may intend to use the same UEAF, however, they may have different preferences to use a different subset of UEAs. Besides that, even if two UEs intends to use the same subset of UEAs in the same UEAF, those two UEs may capture different inputs to be sent to the same UEA for processing, meaning that those two UEs may obtain different outputs from the same UEA.

A third example mainly focus on how different UEs may collaborate to deploy a next-generation MoE (as a UEAF), which is often in a huge size.

UEA Output Sharing Instruction. For a given UEA-1 assigned to UE-1, ADPC-1 needs to advise UE-1 how to share the outputs of UEA-1, i.e., if the output shall be sent to which other UEs (a list of identifiers of output recipients may be included, such as UE-2 and UE-3). Similarly, UE-2 and UE-3 may also be advised by ADPC-1 that UE-1 will share its output with them as input in their respective UEA Input Capture Instructions. In an advanced scenario, when UE-1 is sharing its output, it can also indicate a summary regarding e.g., what inputs was used for generating the output, when the next piece of output may be available, whether UE-2 can further share such an output with others, etc.

When UE-1 needs to share the output with UE-2, the instruction may include the following useful information:

The identifier of the output sender, i.e., UE-1

The identifier of UEA that generates the output, e.g., UEA-1

The identifier(s) of the output receiver(s), i.e., UE-2, or other UEs.

The identifier(s) of the output consumer (the output consumer could be a software installed on the output receiver). For example, although UE-2 is the output receiver, the ultimate consumer may be a software application (identified by a software/App ID) hosted on UE-2 that consumes the output.

The contact addresses of the output receiver(s), e.g., IP address, port, URI, etc.

The output delivery mode: push-based or pull-based approaches can be used.

The output delivery approaches. For example, UE-1 may use 3GPP ProSe direct communication to deliver the output (s) to UE-2.

Maximum output size allowed in one delivery. For example, each time UE-1 may at most deliver 10 MB output data to UE-2.

Output sharing frequency. For example, UE-1 may share the output with UE-2 every three minutes.

Security or access credentials needed for communication.

Quality/Performance Requirements. ADPC-1 may pose some performance requirements to UE-1 for performing Task-1. ADPC-1 may also propose certain quality requirements for the outputs. The quality or performance requirements (defined as Parameter Set-1 in Step 5 of FIG. 4) shall be generated by ADPC-1 and ADPC-1 needs to convey those quality/performance requirements to UE-1. After ADPC-1 generates the Parameter Set-1, it will be not only indicated to UE-1 but also sent to the smart contract established between ADPC-1 and UE-1 so that it can be as the first piece of inputs for the general reward calculation module included in the smart contract as defined in Step 5 of FIG. 4.

Potential Reward. ADPC-1 may indicate UE-1 how many rewards can be earned by UE-1 if it meets all of the quality/performance requirements. Once such a potential reward is decided, it will be sent to the smart contract signed between ADPC-1 and UE-1. Such a potential reward (say X) decided by ADPC-1 is another input for the general reward calculation module. However, if UE-1 can only partially meet the quality/performance requirements, UE-1 may only obtain a partial of potential reward X (Y %), which is calculated/decided by the general reward calculation module in the smart contract established between ADPC-1 and UE-1. Overall, the more rewards UE-1 can obtain, the higher chance UE-1 can participate in further collaborative UEA deployment and operation tasks. For example, the obtained rewards can be regarded as a credit/reputation of a UE. Accordingly, when ADPC-1 is assigning tasks in the future, ADPC may prefer to assign a task to a UE having a high reputation since this UE is more likely to meet the quality/performance requirements.

Performance Reporting Instructions. UECG-1 also indicates what kinds of actual performance/quality numbers shall be reported by UE-1, i.e., the detailed information describing the actual performance/quality numbers is defined as Parameter Set-2, which is listed in Step 5 of FIG. 4. In other words, UE-1 needs to generate Parameter Set-2, which will be sent to the smart contract established between ADPC-1 and UE-1 so that it can be as the second pieces of inputs for the general reward calculation module included in the smart contract as defined in Step 5 of FIG. 4.

Step 12. ADPC-1 sends the UECG-1 to UE-1.

Step 13. UE-1 evaluates UECG-1 based on its current status (e.g., runtime capabilities/capacities) and whether UE-1 agrees with the proposed quality/performance requirement and the rewards/penalty proposal as indicated in UECG-1. Optionally, certain negotiations may happen between UE-1 and ADPC-1 if needed. For now, it is assumed that UE-1 decides to accept UECG-1. However, if UE-1 is consistently not satisfied with the UECG(s) assigned to it, UE-1 may decide to quit from the collaboration infrastructure. For example, UE-1 may choose to send a request to ADPC-1 by indicating it would like to quit from the collaboration infrastructure.

Step 14. UE-1 sends an acknowledgement to ADPC-1 indicating that it has accepted UECG-1.

Step 15. ADPC-1 creates a blockchain transaction representing UECG-1 and sends it to BCN-1 for recording in the blockchain system. This transaction (as the first trigger) will trigger the smart contract established between ADPC-1 and UE-1 when UE-1 joined the collaboration infrastructure as discussed herein, e.g., the SC-1 as illustrated in FIG. 4.

In this transaction, the following information may be included: the identifier of UECG, e.g., UECG-1; the involved UE, e.g. UE-1. In other words, UECG-1 is designed for UE-1; the creator of this transaction, i.e. ADPC-1; the receiver address of this transaction, which could be the address of the smart contract established between ADPC-1 and UE-1, e.g., SC-1 was created when UE-1 joined the collaboration infrastructure as discussed herein; and/or all the detailed information included in UECG-1 (as shown in Step 11).

Step 16. BCN-1 sends an acknowledgement to ADPC-1 indicating the transaction representing UECG-1 is successfully recorded in the blockchain.

Step 17. ADPC-1 sends a notification to UE-2 (as the output recipients of UEA-1) so that UE-2 could know that UE-1 will share its output with it. ADPC-1 may also advise UE-2 that it needs to report its feedback on the quality of the outputs shared by UE-1 and other performance numbers regarding the output delivery. In other words, ADPC-1 may indicate UE-2 that it needs to report Parameter Set-3 defined in Step 5 of FIG. 4 as its feedback. Accordingly, at a later step (Step 35), e.g., after UE-2 receives the outputs from UE-1, it will measure the quality and performance and create Parameter Set-3, which will be sent to the smart contract established between ADPC-1 and UE-1. Parameter Set-3 can be as the third pieces of inputs for the general reward calculation module included in the smart contract as defined in Step 5 of FIG. 4.

Step 18. UE-2 sends an acknowledgement to ADPC-1 for the information conveyed in Step 17.

Step 19. Steps 17 and 18 are also conducted between ADPC-1 and UE-3.

Step 20. Steps 11-19 are also conducted for UE-2/UE-3, respectively. Alternatively, another approach is to conduct task assignments to different participant UEs at the same time. For example, ADPC-1 may create a specific UECG for each UE (as did in Step 11), and each UECG may be encrypted using the public key of its potential recipient (e.g., UE-1). Then, all the UECGs will be put into a single local broadcast message. ADPC-1 may leverage local broadcasting capabilities provided by underlying wireless system, such as 3GPP ProSe Group Communications, to deliver the broadcast message to multiple UEs. Different UEs (e.g. UE-1) may extract its corresponding UECG (e.g., UECG-1) and decrypt it using (or based on) its private key. If UE-1 agrees with UECG-1, it will send a response to ADPC-1 as did in Step 14. Similarly, ADPC-1 may also create blockchain transactions to include multiple UECGs (agreed by different UEs), then those transactions can be submitted by ADPC-1 to the blockchain system using a single message (as dis in Step 15). In addition, ADPC-1 may also use a group communication message to notify the output recipients of different UEAs (as did in Step 17).

Now, each UE has assigned with one or more tasks. For illustration, still using the three ATs as discussed in Step 4 as an example (assuming that UE-1 indicated AT-1, UE-2 indicated AT-2 and UE-3 indicated AT-3):

$$\text{Activity Triple}-1(AT-1) = \{AT-ID-23244, \text{ a park name, } UEAF-1, [UEA-1, UEA-3]\}$$

$$AT-2 = \{AT-ID-36785, \text{ a geographical area, } UEAF-1, [UEA-2, UEA-3]\}$$

$$AT-3 = \{AT-ID-14657, \text{ a } GPS \text{ address of park entrance, } UEAF-1, [UEA-1, UEA-2]\}$$

With collaborative UEAF deployment and operation (as enabled by ADPC-1), now UE-1 needs to download/run UEA-1 and share the corresponding output with UE-2 and UE-3 (as described in UECG-1, which is decided by ADPC-1); UE-2 needs to download/run UEA-3 and share the corresponding output with UE-1 and UE-3 (as described in UECG-2, which is decided by ADPC-1); UE-3 needs to download UEA-2 and share the output with UE-1 and UE-2 (as described in UECG-3, which is decided by ADPC-1). In this way, different UEs do not have to repetitively download and run the same UEAs, which eliminates UEAF downloading and processing redundancies (observed in the Use Case-1 and Use Case-2), e.g., the first key issue as identified above.

However, it is worth noting that the proposed procedure can also be used to support other scenarios, such as Use Case-3, in which a huge-size UEAF cannot be deployed and operated by a single UE. Instead, by using the procedure proposed in this section, the huge-size UEAF can be deployed across different UEs. In particular, those UEs may collaborate together to guarantee the smooth operation of the huge-size UEAF. This also addresses the second key issue as identified above.

Step 21. At this time point, all the task assignments are done, and the next phase is the practical collaborative UEAF operation. For example, UEAF-1 has not been downloaded yet. In this procedure, it is assumed that ADPC-1 is responsible for downloading the entire UEAF-1 from UEAF-R and then delivering needed UEAs to participant UEs (based on their respective UECGs). Accordingly, ADPC-1 sends a UEAF downloading request to UEAF-R in order to download UEAF-1.

Step 22. UEAF-R delivers UEAF-1 to ADPC-1. The software package of UEAF-1 may include multiple UEAs (e.g. UEA-1, UEA-2, UEA-3).

Steps 23-38 illustrates how UE-1 executes its task assigned by ADPC-1 (e.g., download and operate UEA-1) according to its UECG (decided by ADPC-1).

Step 23. According to UECG-1, ADPC-1 decides which UEA(s) in the UEAF-1 shall be delivered to UE-1. For example, it is assumed that based on UECG-1, UE-1 only needs to install and run UEA-1.

Step 24. ADPC-1 delivers the required UEA-1 to UE-1.

Step 25. UE-1 sends an acknowledgement to ADPC-1 and starts to install UEA-1 based on the instructions described in UECG-1. After that, a software instance of UEA-1 is now running on UE-1.

Step 26. UE-1 operates UEA-1 and captures the desired inputs for UEA-1 based on the input capture instructions described in UECG-1 (Here, the term "operate" may also be replaced by run/execute/start/etc.). Accordingly, UEA-1 may produce the corresponding outputs.

Step 27. Based on output sharing instructions as indicated in UECG-1, UE-1 finds that it needs to share the outputs with the other two UE participants, e.g., UE-2 and UE-3.

Step 28. UE-1 delivers the outputs to UE-2 based on the output sharing instructions as described in UECG-1. When UE-1 sends the output to UE-2, the following parameters may be included:

- The identifier of the output sender, e.g., UE-1.
- The identifier of UEA that generates the output, e.g., UEA-1.
- The identifier(s) of the output receiver(s), e.g., UE-2, or other UEs.
- The identifier(s) of the output consumer (the output consumer could be a software installed on the output receiver), e.g., an ID of a software hosted on UE-2 that consumes the output.

Alternatively, UE-1 may notify UE-2 that new outputs of UEA-1 are available so that UE-2 may retrieve outputs by itself. Alternatively, in case UE-1 needs to deliver its outputs to multiple UEs, it may use local broadcast or group communication to deliver its outputs. Alternatively, UE-1 may send its outputs to ADPC and ask ADPC to use local broadcast or group communication for delivering its outputs.

Step 29. UE-2 sends an acknowledgement for the output reception.

Step 30. Steps 28 and 29 are also conducted between UE-1 and UE-3.

Step 31. During the execution of Task-1 (e.g., if UE-1 needs to operate UEA-1 for a long time) or after Tasks-1 is completed (in case Task-1 is just a one-time task), UE-1 creates a blockchain transaction to report its actual performance for running UEA-1 and its subjective evaluation about the quality of its outputs. The detailed parameters to be reported by UE-1 is the Parameter Set-2 defined in the Step 5 of FIG. 4.

Step 32. UE-1 sends the blockchain transaction created in Step 31 to BCN-1 for recording in the blockchain system. This transaction (as the second trigger) will trigger the smart contract established between ADPC-1 and UE-1 when UE-1 joined the collaboration infrastructure as discussed herein, i.e., the SC-1 as illustrated in FIG. 4. If needed (e.g., required by SC-1), BCN-1 may also send a notification to ADPC-1 about the new transaction for its awareness.

Step 33. BCN-1 sends UE-1 an acknowledgement indicating that the blockchain transaction was successfully recorded in the blockchain system.

Step 34. UE-2 receives the output from UE-1 and may evaluate the output, such as its quality and performance. Then, UE-2 may create a blockchain transaction to report its feedback. The detailed parameters to be reported by UE-2 is the Parameter Set-3 defined in Step 5 of FIG. 4.

Step 35. UE-2 sends a blockchain transaction created in Step 34 to BCN-1 for recording in the blockchain system. This transaction (as the third trigger) will trigger the smart contract established between ADPC-1 and UE-1 when UE-1 joined the collaboration infrastructure as discussed herein, i.e., the SC-1 as illustrated in FIG. 4. BCN-1 may also send a notification to ADPC-1 about the new transaction for its awareness.

Step 36. BCN-1 sends UE-2 an acknowledgement indicating that the blockchain transaction was successfully recorded in the blockchain system.

Step 37. Steps 35 and 36 are also conducted between BCN-1 and UE-3.

Step 38. The general reward/penalty calculation module of SC-1 will be triggered by the transactions received in Steps 15, 32 and 35 (as three triggers) so that it can calculate how much practical reward UE-1 should receive. After that, notifications may be sent to UE-1/UE-2/UE-3/ADPC-1 for their awareness about the SC-1's execution.

Step 39. Steps 23-38 are also conducted between ADPC-1 and UE-2/UE-3, respectively. For example, UE-2 will download and run UEA-3 in UEAF-1 and share the output with UE-1/UE-3. UE-3 will download and run UEA-2 and share the output with UE-1/UE-2.

Representative Procedure for Collaborative UEAF Deployment and Processing for Enabling Uniform User Experience This section shows how the general procedure discussed above can be used in applications or scenarios where participant UEs may intend to use the same set of UEAs and those participant UEs may often capture the same/similar inputs for UEAs. As a result, the same outputs of those UEAs will be delivered to all the participant UEs. The applicable use cases and scenarios may include:

Human-involved 6G applications with uniform user experience. One of the examples is the natural history park use case, in which the tourist group members may have the same/similar characteristics and behaviors, such as location, orientation, watching focus/target, line of sight, movement, etc. Also, they may be sitting in the same bus, listening to the tour guide's introduction, and following the tour guide's instructions (in terms of where to move, what to look, etc.).

6G industrial robot crew control. In this type of industrial applications, the participant UEs may be a group of robots/vehicles/drones and intend to use the same set of UEAs. In particular, the controller (as ADPC) may send real-time instructions to those robots so that those robots have aligned/same behaviors/actions/movements/operations. To enable collaborative UEAF deployment and operation, the controller may ask each robot to install and run one or more particular UEAs. As a result, each robot may capture inputs for the installed UEAs installed on it and produces outputs. The outputs will be shared with all other robots.

In an example, the general procedure proposed in FIG. 5 needs to have the following customized modifications:

Step 1 of FIG. 5. UE-1 proactively reports its location presence to ADPC-1 when arriving a given location/area (where an activity happens). In this step, UE-1 may indicate an AT identifier, such as AT-1. AT-1 describes the activity location information about the activity that UE-1 intends to attend and what UEAF is to be used, e.g., UEAF-1. The customized modification is that AT-1 does not indicate any further information regarding what specific UEAs in UEAF-1 that UE-1 intends to use. Instead, UE-1 may include a new indication to ADPC-1 in this step, implying that UE-1 would like ADPC-1 to fully determine which UEAs shall be used. In other words, ADPC-1 will decide/select one or more UEAs for all the UE participants. Then, those selected UEAs will be collaboratively deployed on different UEs but the outputs of each of UEAs will be presented/delivered to all the participant UEs, leading to uniform user experience across different participants.

Step 5 and Step 6 of FIG. 5 are not needed.

Step 11 of FIG. 5. The modification to this step is that based on the useful information collected from multiple participant UEs, ADPC-1 needs to decide how many UEAs in the UEAF-1 shall be used/deployed to deliver the uniform user experience to all the participant UEs. For example, a naïve approach is that all of the UEAs in UEAF-1 shall be utilized, i.e., all the UEAs in UEAF-1 will be deployed and each UE intends to consume the output produced by every UEA in UEAF-1. Alternatively, ADPC-1 may decide given the current situation/context/environment, only a subset of UEAs in the UEAF-1 shall be deployed/operated, but still, every UE will consume the output produced by each UEA in this selected subset.

After that, ADPC-1 decides how to do the task assignment among different UE participants, i.e., which UE shall download and run which UEAs. Accordingly, ADPC-1 decides a UECG for each UE (e.g., UECG-1 is a device specific collaboration guide for UE-1). A UECG defined in Step 11 of FIG. 5 may have the following customized modifications:

UEA Processing Task assignment(s): For a particular Task-1 (e.g., UE-1 needs to download/run UEA-1), the following instructions are decided by ADPC-1:

UEA Acquisition Instruction. No modification.

UEA Input Capture Instruction.

Application scenario: Human-involved 6G applications with uniform user experience:

In this application scenario, ADPC-1 needs to instruct UE-1 on how to capture the inputs for UEA-1 since the output of UEA-1 may not just be used by UE-1 but also may be shared with other UEs (e.g., UE-2 and UE-3). In other words, when the same output (e.g., produced by UEA-1 installed on UE-1) are presented to all the involved UEs, the same output may bring uniform user experience to all the UEs.

The approaches regarding how to deliver uniform user experience are various depending on whether UE collaboration is enabled or not. When no collaboration is enabled across UEs, delivering uniform user experience to multiple participant UEs is often realized by the following naïve way: 1) each participant UE installs the same set of UEAs as decided by ADPC-1; 2) each participant UE captures the same/similar inputs for each UEA. This means each participant UE will produce the same outputs. When those outputs are presented to their respective human users, different users may perceive uniform user experience. However, when collaborative UEAF deployment and processing is enabled, one particular UEA-1 may only be deployed on one UE (e.g., UE-1), and the output of UEA-1 needs to be shared with other UEs (UE-2/UE-3). In particular, whether the outputs of UEA-1 produced by UE-1 is useful or not for other two UEs largely depends on whether all the involved UEs (UE-1/UE-2/UE-3) have aligned characteristics/behaviors.

As such, ADPC-1 may indicate to UE-1 how to capture the input for UEA-1 (Similarly, in Step 17, ADPC-1 may also advise other involved UEs, such as UE-2 and UE-3, how to align their behaviors/characteristics with UE-1 so that the output shared by UE-1 can be useful to them). To align behaviors/characteristics of multiple UEs (so that the output produced by UE-1 can also be useful to other UEs), the following approaches can be used:

The user of UE-1 and other participant UEs may follow real-time commands or instructions from ADPC-1. For example, in the natural history park use case, the tourist guide can tell tourist members to align their behavior at runtime, regarding where to stand, where to move and what to look, etc. It is possible that in certain cases some users may not be cooperative, e.g., they do not follow ADPC-1's instructions. If that this the case, ADPC-1 may regulate user's behaviors using following approaches:

Since participants may have already signed the smart contract with ADPC-1, certain penalty may be incurred if they are not cooperative in most of time.

ADPC-1 may use certain mandatory control mechanism to regulate participants' behavior. For example, in the natural park use case, the tourist guide (hosting an ADPC-1) may lead a group of people for visiting a showcase field in the dark night. The tourist guide may use her high-beam flashlight to focus on a target physical object in order to instruct group members regarding where to see (e.g., asking members to look at tiger in the showcase field). In that case, human users may not look around since everywhere is in dark. Therefore, if UEA-1 installed on UE-1 may detect targeted animals/plants in UE-1's viewport, such a detection results can also be useful to UE-2 and UE-3 since those target objects may also appear in their viewports. Therefore, if the same detection results are presented to the human users of all the three UEs, it means that those human users are having the uniform experience.

Application Scenario: 6G Industrial Robot Crew Control:

In this type of application scenario, humans may not be involved. For example, all participant UEs may be robots or Internet-of-Things-based devices equipped with sensing/computing/communication capabilities. In this case, ADPC-1 may send the real-time operation commands to each to robot align or coordinate their behavior/movement/actions/operations/etc. For example, those commands may be sent using existing application protocols, such as Constrained Application Protocol (CoAP). Those commands may also be sent using device management protocols, etc. In addition, those commands may also be delivered using group communications based on 3GPP ProSe. Since all the robots have the same/aligned behavior/movements/actions/operations, the output of an UEA installed on a robot may also be useful and shared to all other robots in the crew.

UEA Output Sharing Instruction. No modification.

Quality/Performance Requirements. No modification.

Potential Reward. No modification.

Performance Reporting Instructions. No modification.

Step 17 of FIG. 5. In addition to all the details illustrated in Step 17 of FIG. 5, another addition is that in order to make sure all the participant UEs to have aligned characteristics/behaviors (so that the output produced by UE-1 can be useful to them), ADPC-1 may also advise UE-2 (as an output receiver) regarding how to align its characteristics/behaviors with UE-1. For example, in the natural history park use case, the tourist guide may tell a group member that it is better to follow tourist guide's real-time commands or instructions regarding where to stand where to move, and what to look, etc.

Although procedure proposed in FIG. 5 aims to eliminate UEAF deployment and operation redundancies, in certain cases it is not necessary to fully eliminate redundancies. In other words, allowing certain UEAF deployment redundancies may be helpful especially for human-involved 6G applications. For example, in the natural park use case, if a tourist member and his UE-1 (assuming ADPC-1 assigned UE-1 to install UEA-1) does not always follow tourist guide's instruction and likes to look around, the input of UEA-1 (e.g. the current viewport of this member) may not be desired by other members, therefore the output of UEA-1 may not be useful at all to other members. In this case, ADPC-1 may decide to deploy another UEA-1 instance on a different UE (assuming this UE may well follow tourist guide's instruction). In this example, it can be seen that certain UEA deployment redundancies may still be needed for certain scenarios.

Representative Procedure for Collaborative UEAF Deployment and Processing for Enabling Differentiated User Experience This section shows how the general procedure discussed herein can be used in applications or scenarios where participant UEs may want to use the same UEAF (e.g., UEAF-1) when attending an activity. However, different participant UEs may want to use UEAF-1 in a different way, leading to differentiated user experience. For example, this section aims to cover the following situations:

Different participant UEs may have variant computing/communication capabilities or capabilities. Therefore, some of high-end UEs may intend to use all or most of the UEAs in the UEAF-1 for best user experience while some of medium/low-end UEs may intend to use a subset of UEAs in the UEAF-1 for a basic user experience.

Even if two participant UEs intend to use the same UEA-1, the users of those two UEs may have different characteristics/behaviors. Therefore, different UEs may capture different inputs (such as viewports) to be sent to UEA-1 for processing and the corresponding outputs will also be different. When those outputs are presented to different users, they may bring differentiated user experiences. One of the examples is the golf match use case, in which audiences have the freedom to decide what to look. Therefore, audiences may have different viewports and the AR effects to be produced by UEAF-1 may also be different (leading to a differentiated AR experience).

In an example, the general procedure proposed in FIG. 5 needs to have the following customized modifications:

Step 1 of FIG. 5. UE-1 proactively reports its location presence to ADPC-1 when arriving a given location/area (where an activity happens). In this step, UE-1 may indicate an AT identifier, such as AT-1 (e.g., AT-1 describes that UE-1 intends to attend an activity at a location and needs to use UEAF-1). The customized modification is that AT-1 has to indicate what specific UEAs in UEAF-1 that UE-1 intends to use, i.e., UE-1 needs to specify its specific preferences/needs (which largely decides what kinds of unique/personalized user experience is desired by UE-1). There could be two alternative ways to specify which UEAs in UEAF-1 that UE-1 intends to use:

UE-1 may indicate such information in AT-1 when UE-1 created AT-1 and sent AT-1 to ADPC-1 for joining the UE collaboration infrastructure (i.e., Step 1 of FIG. 4).

It is possible that UE-1 may not include detailed information about which specific UEAs it would like to use when created AT-1 in Step 1 of FIG. 4. If that is the case, in Step 1 of FIG. 5, UE-1 may not only indicate an AT identifier, but also append additional update to AT-1 to indicate such information about which specific UEAs in UEAF-1 it would like to use.

In addition to that, the following new parameters may also be included in Step 1 of FIG. 5:

The inputs proposals for involved UEAs: For each of UEAs that UE-1 intends to use, (e.g., UEA-1), UE-1 may also indicate how it would like to capture the desired inputs for those UEA(s) in order to realize personalized user experience. In the meantime, due to collaborative UEAF deployment and operation, it is possible that although UE-1 may want to use UEA-1, ADPC-1 decided to let another UE-2 to download and operate UEA-1. If that is the case, UE-1 may use this parameter to indicate how to capture inputs for UEA-1, which are specifically desired by UE-1. Two approaches may be adopted:

Approach-1: UE-1 captures the desired inputs for UEA-1 by itself and then sends data inputs to UEA-1 (which may be hosted on another UE-2) for processing. Note that, at this time point, where UEA-1 will be deployed is still not decided yet. In other words, in this step, for illustration purpose, it is assumed that UEA-1 is deployed on UE-2. However, at Step 11 of FIG. 5, ADPC-1 may finally decide to deploy UEA-1 on UE-1, or on another UE-2.

Approach-2: UE-1 may rely on another UE to capture desired inputs for UEA-1. For example, assuming at Step 11 of FIG. 5, ADPC-1 may decide to deploy UEA-1 to UE-2. Then, UE-2 may be responsible for capturing desired inputs for UE-1. In this case, UE-1 may indicate some of the hints regarding to how UE-2 should capture inputs desired by UE-1. For example, if the input for UEA-1 is a viewport, UE-1 may indicate a target physical object. On UE-2 side, based on the hints provided by UE-1, UE-2 may adjust its own camera pose/orientation so that the target physical object(s) could appear in its viewport. Then, UE-2 may capture desired inputs on behalf of UE-1. In particular, UE-2 may need to have a capability to capture different inputs desired by different UEs at the same time. This may require UE-2 to have sophisticated input capture hardware so that multiple inputs can be captured in parallel. In fact, there is already a smart camera product available on the market, which can fulfill this purpose. For example, one smart camera could conduct multi-people framings in a meeting room, i.e., each framing is focusing on one particular meeting participant in the room.

The indication of need for user experience upgrade. For example, UE-1 may be a low-end UE, originally it may just plan to use e.g., two UEAs in the UEAF-1 since UE-1 may not have sufficient communication/computing resources to run too many UEAs. Those two UEAs may only produce a limited/basic user experience. However, through collaborative UEAF deployment/processing, UE-1 may indicate whether it would like to leverage more additional UEAs in UEAF-1, that it cannot execute itself, for an upgraded user experience. For example, although UE-1 may not be able to run a computing-intensive UEA (e.g., UEA-7). However, UEA-7 may be deployed on another high-end UE-2 and UE-2 could share the outputs of UEA-7 to UE-1. As a result, the user of UE-1 may have an upgraded user experience.

Step 11 of FIG. 5. ADPC-1 decides how to do the task assignment among different UE participants, i.e., which UE shall download and run which UEAs. Accordingly, ADPC-1 decides a UECG for each UE (e.g., UECG-1 is a device specific collaboration guide for UE-1). A UECG defined in Step 11 of FIG. 5 may have the following customized modifications:

UEA Processing Task assignment(s): For a particular Task-1 (e.g., UE-1 needs to download/run UEA-1), the following instructions are decided by ADPC-1:

UEA Acquisition Instruction. No modification.

UEA Input Capture Instruction. For a given UEA-1 to be deployed on UE-1, ADPC-1 may instruct UE-1 how to collect different inputs (desired by different UEs). This is based on the inputs proposals submitted by different UEs during Step 1. For example, ADPC-1 may indicate to UE-1 that another UE-2 also wants to use UEA-1, and UE-2's input proposal for UEA-1 indicated that UE-2 will capture its desired input by itself and send inputs to UE-1 for processing. Another example, ADPC-1 may indicate to UE-1 that another UE-3 also wants to use UEA-1, but UE-3's input proposal for UEA-1 indicated that UE-3 would rely on UE-1 to capture desired input for it.

UEA Output Sharing Instructions: In addition to existing contents shown in Step 11 of FIG. 5, this step may also cover the case where another UE-2 may have indicated in Step 1 that it needs a user experience upgrade. For example, originally UE-2 may not plan to run UEA-1, which is computing-intensive. However, if UE-1 installs and runs UEA-1, the outputs of UEA-1 can be shared with UE-2 so that the user of UE-2 may have an upgraded user experience.

Quality/Performance Requirements. No modification.

Potential Reward. No modification.

Performance Reporting Instructions. No modification.

Representative Procedure for Collaborative Deployment and Operation of MoE-like UEAF This section shows how the general procedure discussed herein can be used in applications or scenarios where UEAF may refer to a MoE and an UEA is an individual module in the MoE. A MoE could do multiple types of jobs and could receive multiple types of multimodal input. Each job will process the inputs using a pipeline of modules and produce an output (See FIG. 3 for illustration). A MoE is often in a large size (many individual UEAs for each expert module with high resource requirements) and needs to be deployed over multiple nodes/entities.

In an example, the general procedure proposed in FIG. 5 needs to have the following customized modifications:

Step 11 of FIG. 5. A UECG defined in Step 11 of FIG. 5 may have the following customized modifications:

UEA Processing Task assignment(s): For a particular Task-1 (e.g., UE-1 needs to download/run UEA-1), the following instructions are decided by ADPC-1:

UEA Acquisition Instruction. No modification.

UEA Input Capture Instruction. No modification.

UEA Output Sharing Instructions: In this section, UEA-1 may be a module (e.g., Module-X) in a MoE and UEA-1 may belong to the process pipelines of multiple jobs. Therefore, when UE-1 needs to share the outputs of UEA-1 to another UE-2, UE-1 needs to also indicate the corresponding job identifier of this output, i.e., this output is related to which job. Accordingly, once UE-2 receives the output, it could know the received output should be processed by which UEA (e.g., Module-Y) hosted on UE-2 (i.e. Module-Y is the downstream module of Module-X in the corresponding job processing pipeline).

Quality/Performance Requirements. No modification.

Potential Reward. No modification.

Performance Reporting Instructions. No modification.

In addition, when ADPC-1 decides the collaborative plan for deploying a MoE-like UEAF, it may consider the following aspects for potential optimization:

Since different job pipelines (i.e., multiple simultaneous paths within the MoE doing separate inference) may share one or more modules (as UEAs), those modules may be the potential performance bottleneck due to more workload to be processed. In the meantime, the expected input volume/size of each job is also another aspect to be considered. Overall, a UE hosting a shared module may need to allocate sufficient computing resources to the module to handle a high workload.

A processing pipeline of a given job may include multiple modules and those modules may be hosted on different UEs, meaning that those UEs may allocate sufficient communication resources for supporting data communication between modules. ADPC-1 may also consider the potential communication overhead due to interactions of modules deployed on different UEs. For example:

If the intermediate data exchanged between UEA-1 and UEA-2 is large, it may make sense to deploy those two modules on the same UE-1 (assuming UE-1 has sufficient computing resources) so that data exchanges are internal UE communication.

If UEA-3 hosted on UE-2 needs to send data to another UEA-4 on a remote UE-3, it may make sense to for ADPC-1 to deploy another instance of UEA-4 on a near-by UE which is much closer to UE-3. In other words, certain deployment redundancies may be beneficial for saving communication overhead, which depends on the practical implementation considerations.

Figure 6:
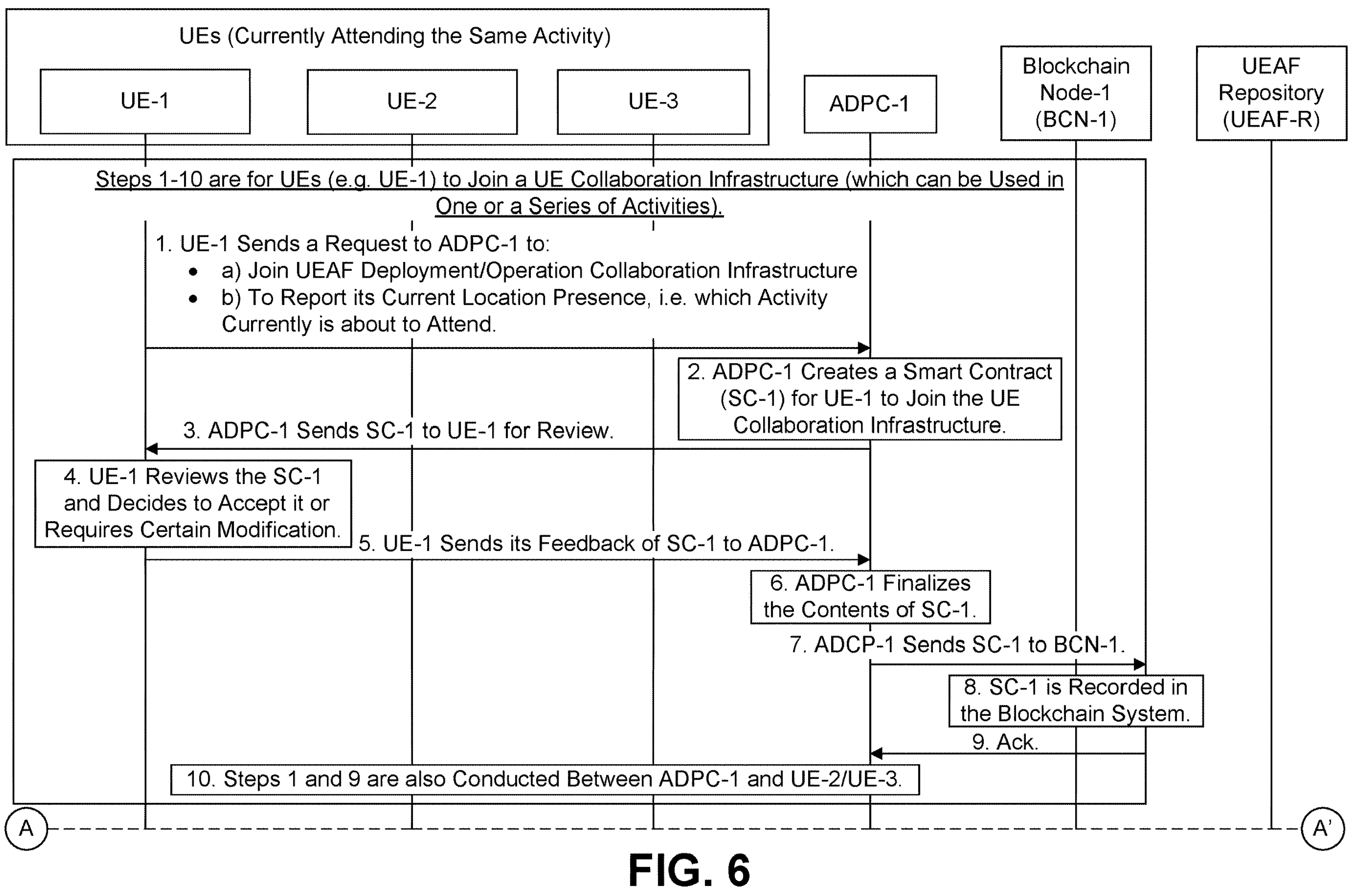
FIG. 6 is a flow diagram illustrating an example of an integrated procedure of collaborative UEAF deployment and operation, according to one or more embodiments.
Figure 6:
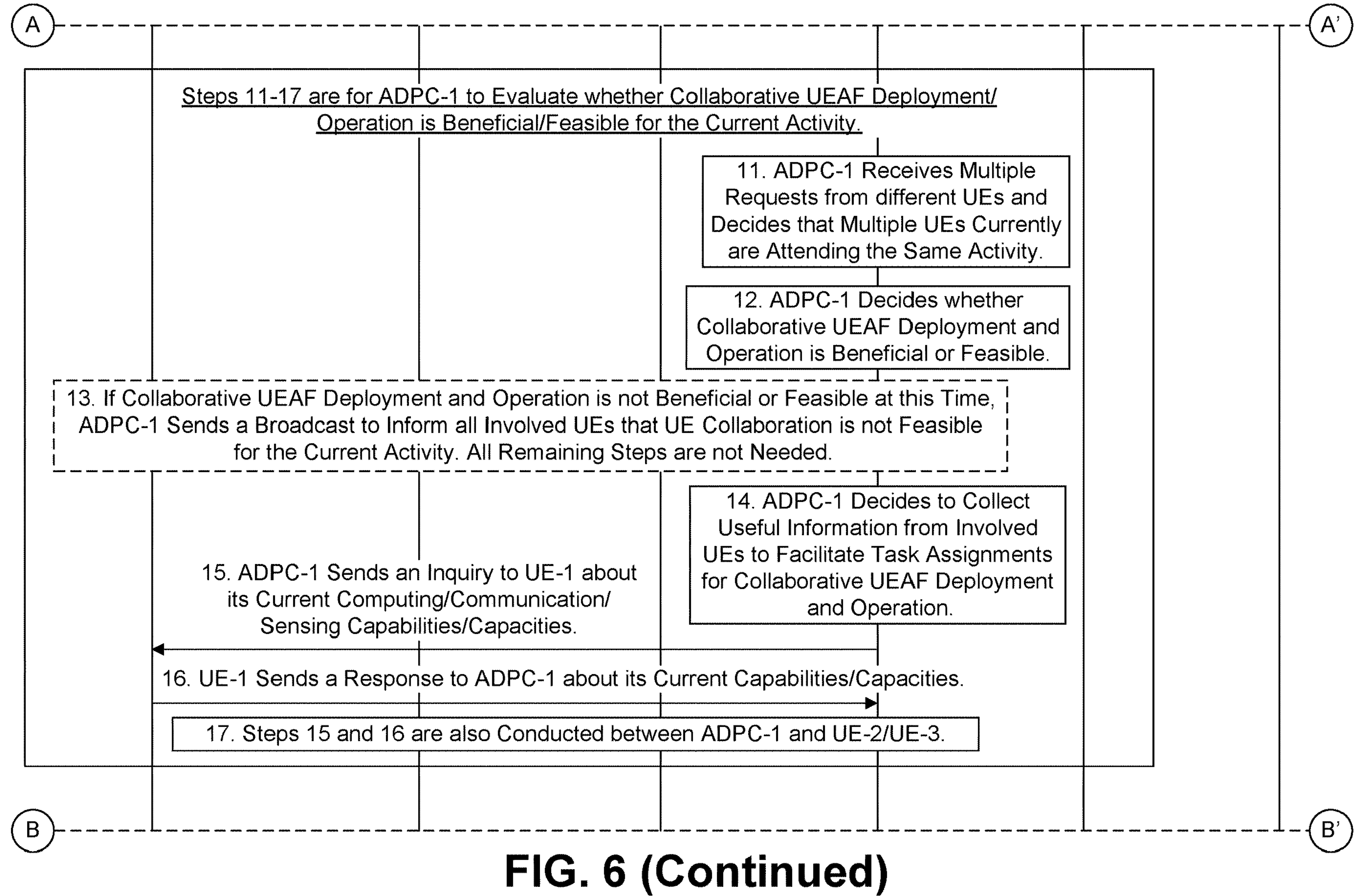
Figure 6:
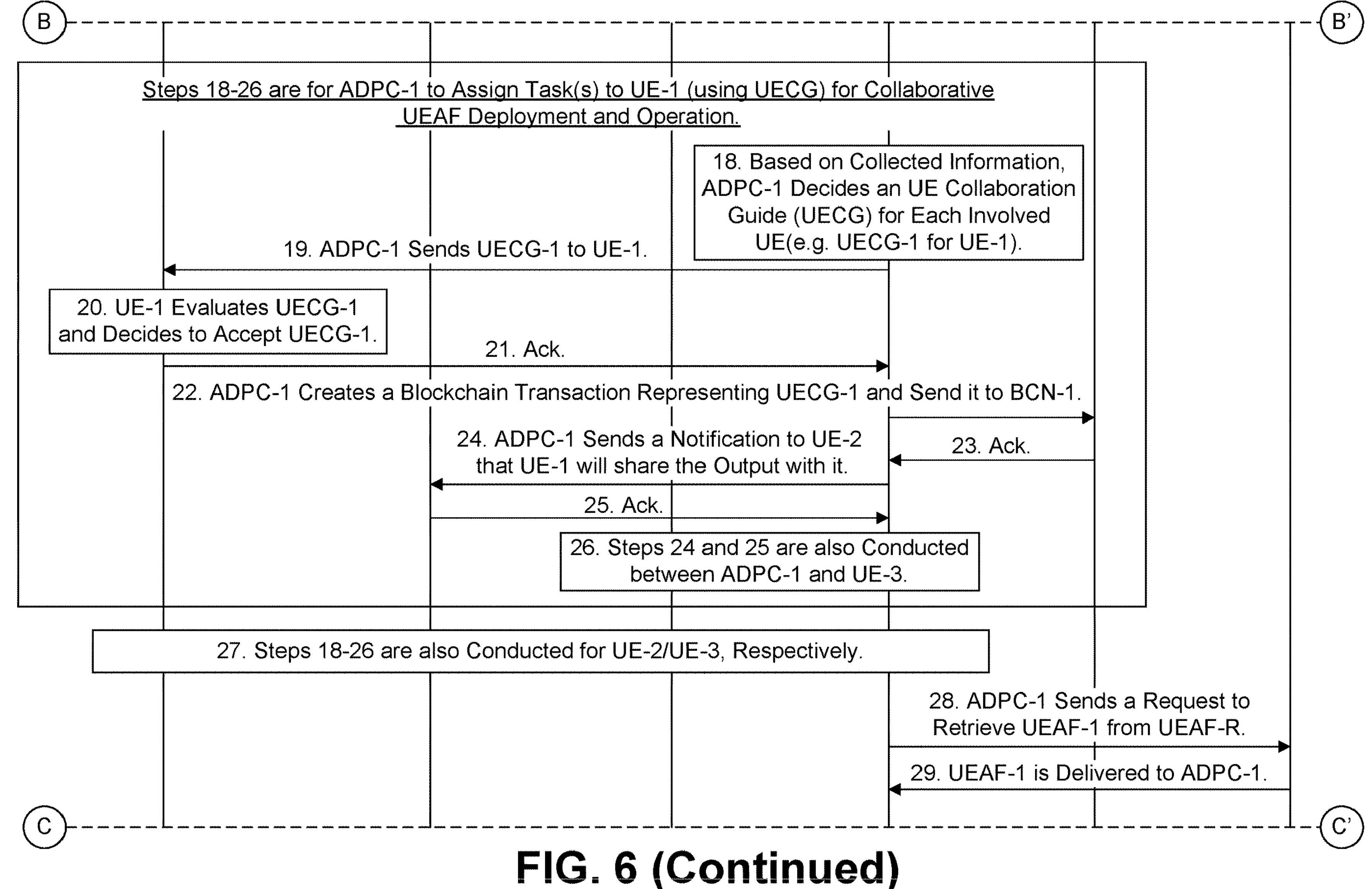
Figure 6:
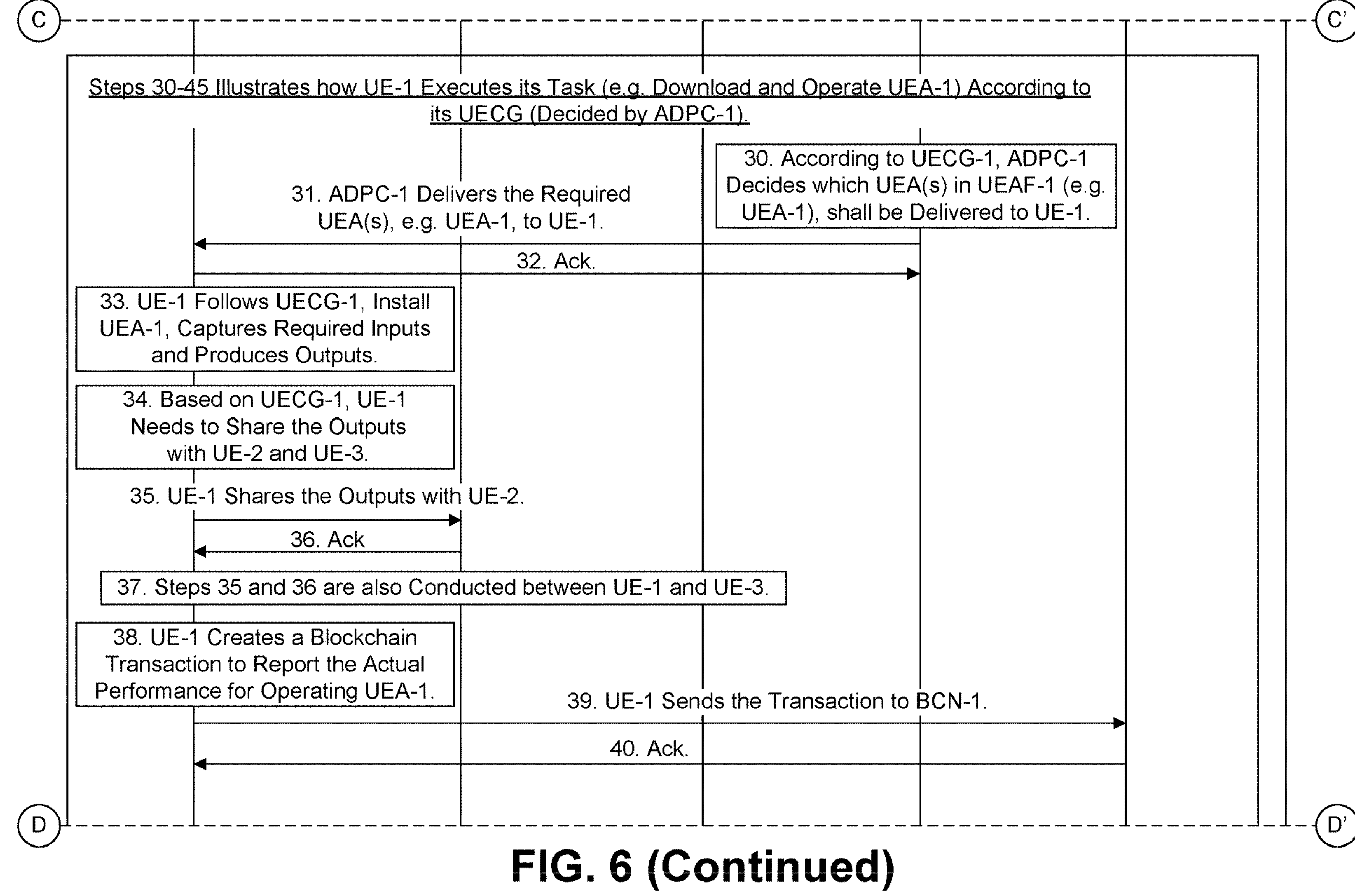
Figure 6:
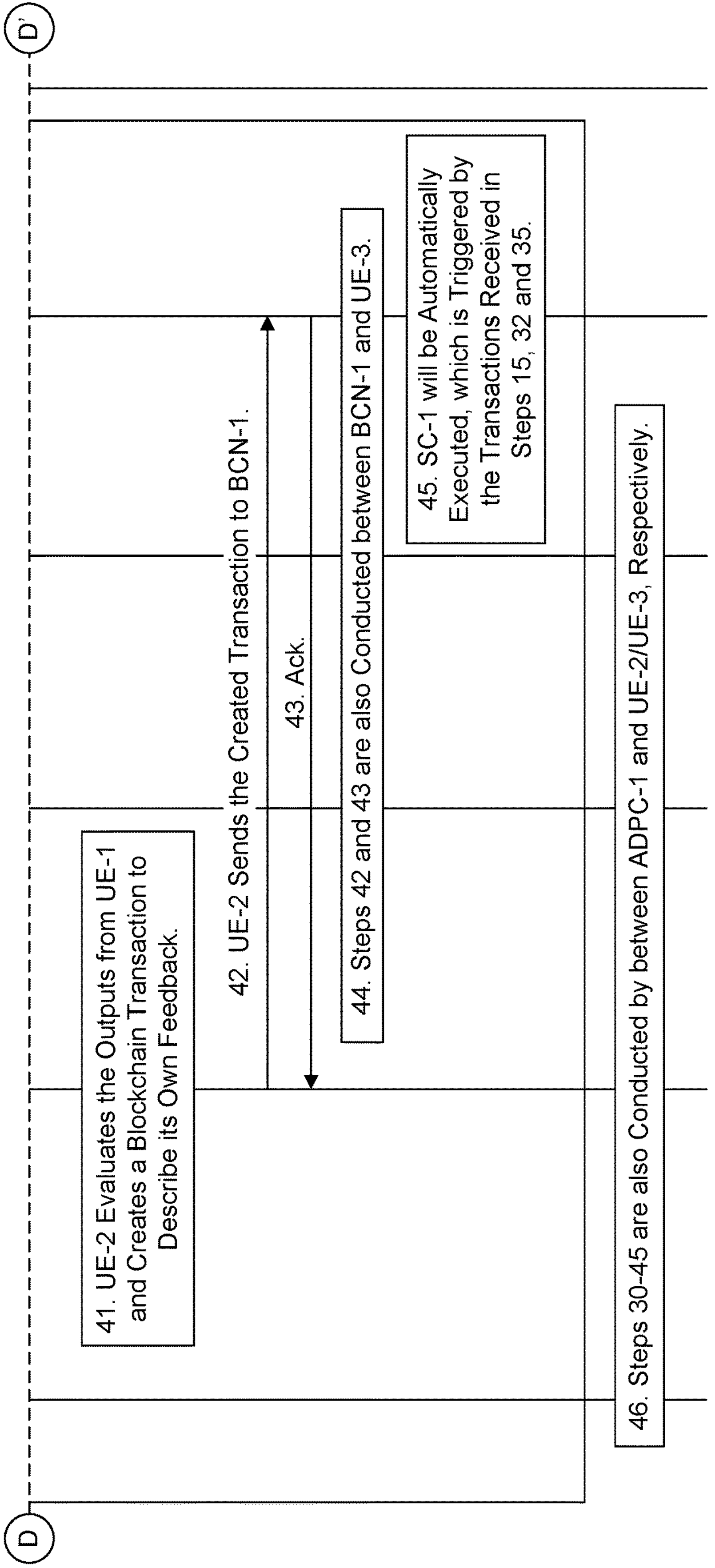

Representative Procedure for an Integrated Method of Collaborative UEAF Deployment and Operation To enable UE collaboration for UEAF deployment and processing, ADPC-1 may first establish a UE collaboration infrastructure among different UEs. After that, ADPC-1 may conduct collaborative UEAF deployment and operation during different GAs. In other words, the collaboration infrastructure establishment and task assignment for enabling collaborative UEAF deployment and operation are decoupled. This section proposes an integrated solution in which the collaboration infrastructure establishment and task assignment for enabling collaborative UEAF deployment and operation are integrated in one procedure. For example, this procedure proposed in this section can be used when a UE is attending the "first" activity. Accordingly, when a UE contacts ADPC for the first time, it may not only ask for joining the UE collaboration infrastructure, but also ask ADPC for task assignment related to collaborative UEAF downloading/operation for the first activity. For any subsequent activities, since UE collaboration infrastructure has already been established, the UE may still use the procedure discussed herein for collaborative UEAF downloading/operation. The detailed procedure of an integrated solution to UEAF deployment and processing is proposed in FIG. 6.

Precondition. It is assumed that UE-1 has already identified ADPC-1. UE-1 plans to attend a series of activities and currently it is about to about to attend the "first" activity.

Steps 1-10 are for UEs (e.g., UE-1) to join a UE collaboration infrastructure (which can be used in one or a series of activities).

Step 1. UE-1 sends a request to ADPC-1. In particular, this request has two purposes:

Purpose-1 is to join UEAF deployment/operation collaboration infrastructure. In particular, once UE-1 becomes a member of UE collaboration infrastructure, it can benefit from collaborative UEAF deployment/operation for subsequent activities.

Purpose-2 is to report its current location presence, i.e., which activity currently is about to attend. For example, UE-1 may send its first request to ADPC-1 when attending the first activity.

For Purpose-1, all the parameters included in Step 1 of FIG. 4 will also be included in this step. For example, UE-1 may indicate a list of ATs, which describes a series of activities that UE-1 plans to attend.

For Purpose-2, all the parameters included in Step 1 of FIG. 5 will also be included in this step, which describes which specific activity that UE-1 is currently about to attend (e.g., the first activity included in the list of ATs).

Step 2. ADPC-1 creates a Smart Contract (SC-1) for UE-1 to join the UE collaboration infrastructure. This step is same as Step of FIG. 4.

Step 3. ADPC-1 sends SC-1 to UE-1 for review. This step is same as Step 6 of FIG. 4.

Step 4. UE-1 reviews the SC-1 and decides to accept it or requires certain modification.

Step 5. UE-1 sends its feedback of SC-1 to ADPC-1.

Step 6. ADPC-1 finalizes the contents of SC-1. Steps 4-7 are same as Step 7 of FIG. 4.

Steps 7-9 are same as Steps 8-10 of FIG. 4.

Step 10. Steps 1 and 9 are also conducted between ADPC-1 and UE-2/UE-3.

Steps 11-46 are same as the Steps 4-39 of FIG. 5.

Figure 7:
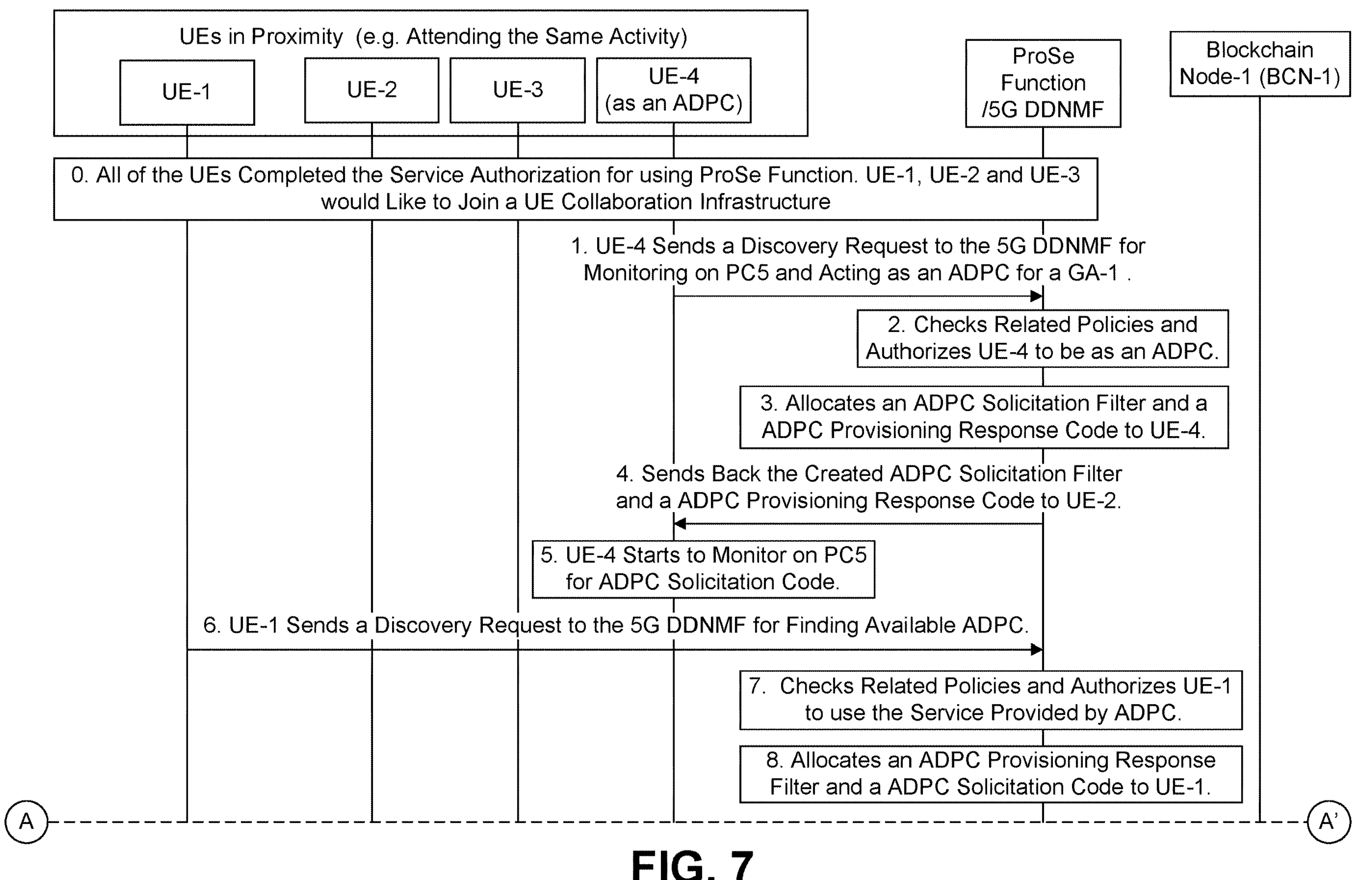
FIG. 7 is a flow diagram illustrating an example of a 3GPP embodiment for enabling UE collaboration infrastructure using 3GPP D2D discovery, according to one or more embodiments.
Figure 7:
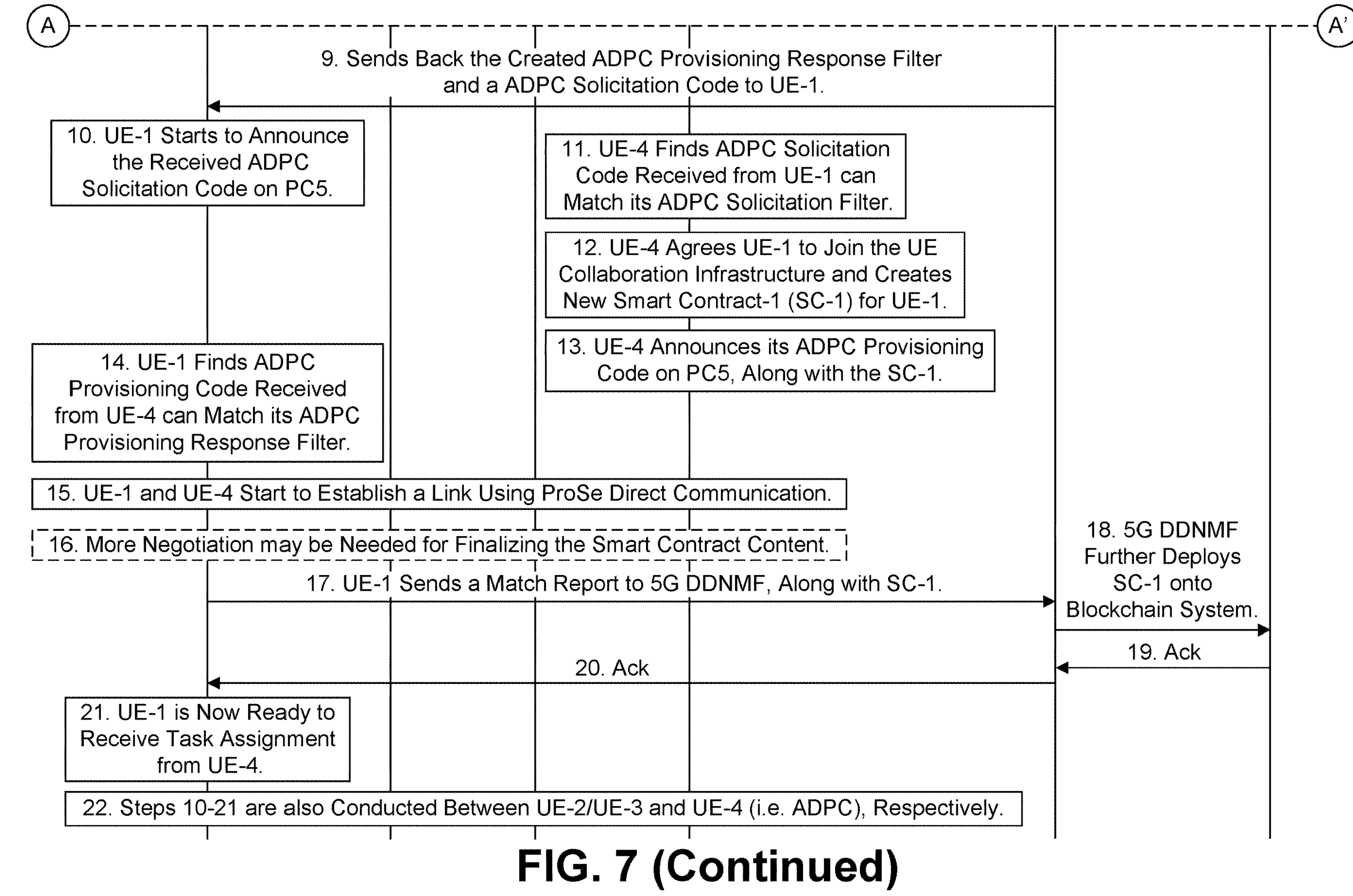

3GPP SA2 Embodiment for Enabling UE Collaboration Infrastructure using ProSe Service FIG. 7 shows a 3GPP SA2 embodiment of FIG. 4 for enabling a UE collaboration infrastructure using the 3GPP D2D Discovery approach. In this embodiment, the ProSe function in 4G or the 5G Direct Discovery Name Management Function (DDNMF) is leveraged to enable interaction between Participant UEs and the ADPC. There are two models for D2D direct discovery defined by 3GPP and the one shown in FIG. 7 follows Model B direct discovery.

In order to enable mutual discovery between a UE acting as an ADPC and a UE acting as a potential UE collaboration participant, two pairs of new solicitation filter and response code are proposed:

ADPC solicitation code (allocated to a UE acting as a UE collaboration participant) and ADPC solicitation filter (allocated to UE acting as ADPC)

ADPC provisioning response code (allocated to UE acting as ADPC) and ADPC provisioning response filter (allocated to a UE acting as a UE collaboration participant).

Precondition. All of the UEs complete the service authorization for using the ProSe function. For example, this step can use the existing ProSe service authorization and provisioning procedure. UE-1. UE-2 and UE-3 would like to join a UE collaboration infrastructure and UE-4 is acting as an ADPC.

Step 1. UE-4 sends a 3GPP D2D direct discovery request to the 5G DDNMF for monitoring on PC5. In particular, a new indicator can be included in this request in order to indicate that UE-4 intends to act as an ADPC.

Step 2. 5G DDNMF checks related policies and authorizes UE-4 to be as an ADPC. For example, 5G DDNMF may further check with an application server or PCF for the related policies. Also, the 5G DDNMF may host a UEAF-R or may interact with a cloud-based UEAF-R.

Step 3. 5G DDNMF allocates an ADPC solicitation filter and an ADPC provisioning response code to UE-4.

Step 4. 5G DDNMF sends a response to UE-2, which includes the created ADPC solicitation filter and an ADPC provisioning response code.

Step 5. UE-4 starts to monitor on PC5 for the ADPC solicitation code.

Step 6. UE-1 sends a 3GPP D2D direct discovery request to the 5G DDNMF for discovering an ADPC.

Step 7. 5G DDNMF checks related policies and authorizes UE-1 to use service provided by an ADPC. For example, 5G DDNMF may further check with the application server or PCF for the related policies.

Step 8. 5G DDNMF allocates an ADPC provisioning response filter and an ADPC solicitation code to UE-1.

Step 9. 5G DDNMF sends a response to UE-1, which includes the created ADPC provisioning response filter and an ADPC solicitation code.

Steps 6-9 can also be conducted by UE-2/UE-3, respectively.

Step 10. UE-1 starts to announce the received ADPC solicitation code on PC5. This step is same as the Step 4 in FIG. 4.

Step 11. UE-4 finds the ADPC solicitation code received from UE-1 can match its ADPC solicitation filter.

Step 12. UE-4 (as ADPC) agrees that UE-1 may join the UE collaboration infrastructure and creates a new Smart Contract-1 (SC-1) proposal for UE-1. This step is same as the Step 5 in FIG. 4.

Step 13. UE-4 announces its ADPC provisioning code on PC5, along with the SC-1. This step is same as the Step 6 in FIG. 4.

Step 14. UE-1 finds ADPC provisioning code received from UE-4 can match its ADPC provisioning response filter (assigned in Step 9).

Step 15. UE-1 and UE-4 start to establish a link using ProSe direct communication.

Step 16. Optionally more negotiation may be needed for finalizing the smart contract content. This step is same as the Step 7 in FIG. 4.

Step 17. UE-1 sends a match report to 5G DDNMF, along with SC-1. Here, it is assumed that SC-1 is submitted to the blockchain system by 5G DDNMF. For example, if there is a blockchain NF in the 3GPP Core Network, the 5G DDNMF could send the SC-1 to the blockchain NF so that the blockchain NF can further write SC-1 into the blockchain system. Alternatively, UE-1 or UE-4 may also directly submit the SC-1 to a blockchain system (this case is shown as Steps 8-10 in FIG. 4).

Step 18. 5G DDNMF further deploys SC-1 into the blockchain system.

Step 19. The BCN-1 sends an acknowledgement to 5G DDNMF indicating that SC-1 is deployed on the blockchain.

Step 20. 5G DDNMF sends an acknowledgment to UE-1 for the match between UE-1 and UE-4.

Step 21. UE-1 is now ready to receive UEAF downloading and processing task assignments from ADPC-1.

Step 22. Steps 10-21 are also conducted between UE-2/UE-3 and UE-4 (i.e., ADPC), respectively.

Once ADPC (i.e., UE-4) and UE-1 in FIG. 7 have discovered each other, the interactions between UE-1 and ADPC as illustrated in FIG. 5 can be realized using unicast mode of ProSe Direct communication over PC5 reference point. For example, based on D2D direct discovery, UE-1/UE-2/UE-3/UE-4 could determine their respective destination Layer-2 IDs for signaling reception for PC5 unicast link establishment. UE-1 could send a Direct Communication Request message to UE-4 (as ADPC) in order to initiate the unicast layer-2 link establishment procedure. During this step, all the parameters included in Step 1 of FIG. 5 can be included. After that, ProSe data is transmitted over the established unicast link. Note that, PC5 unicast link is bi-directional, therefore the communication peer UE of UE-1 (i.e., UE-4) can also send data to UE-1 over the unicast link with UE-1. In other words, all the messaging/interactions between UE-1 and ADPC (i.e., UE-4) as described in FIG. 5 can be embodied as unicast traffic over the established unicast link.

Figure 8:
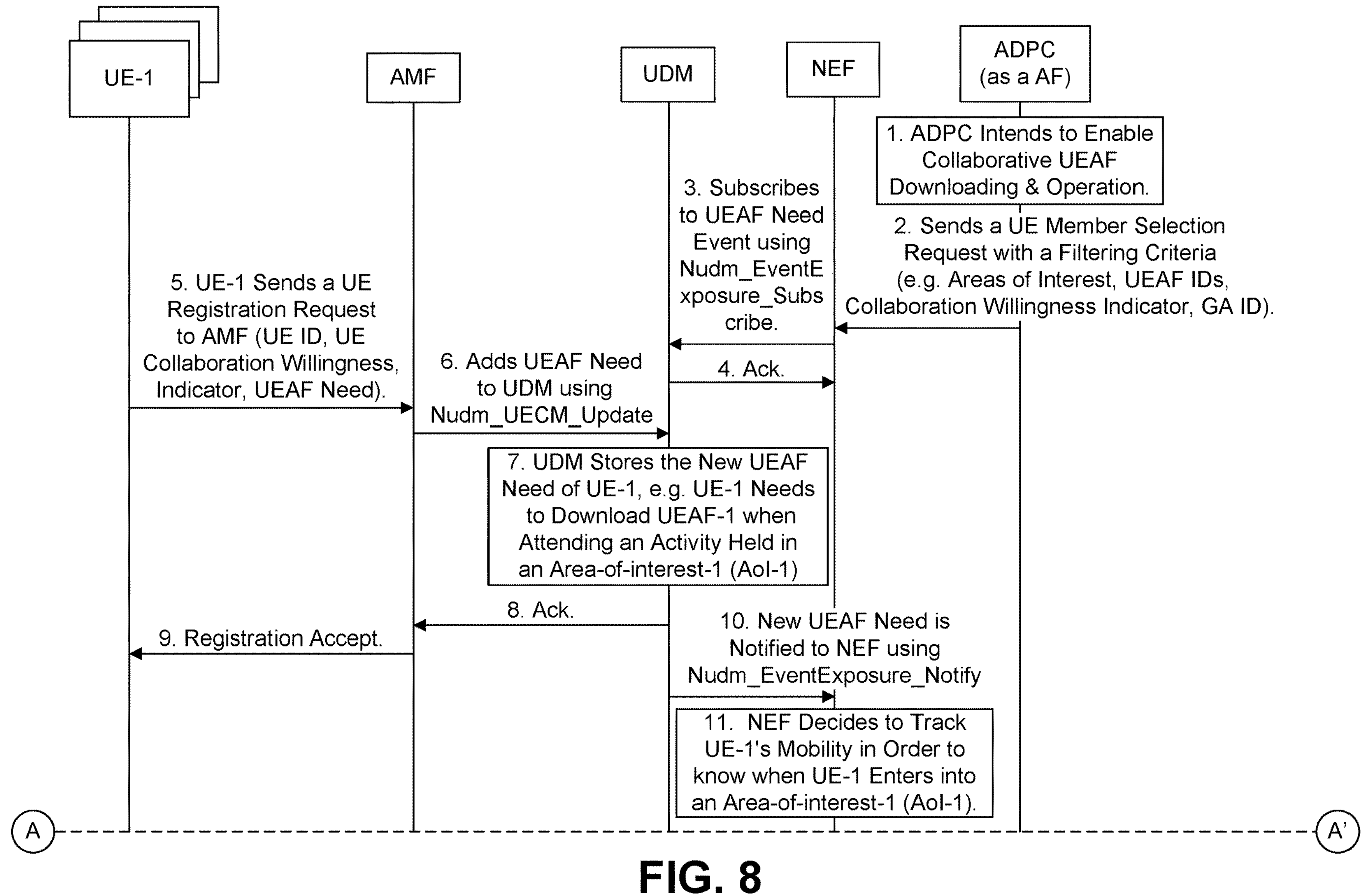
FIG. 8 is a flow diagram illustrating an example of a 3GPP SA2 embodiment for collaborative UEAF deployment and operation using 3GPP-assisted UE member selection mechanism, according to one or more embodiments.
Figure 8:
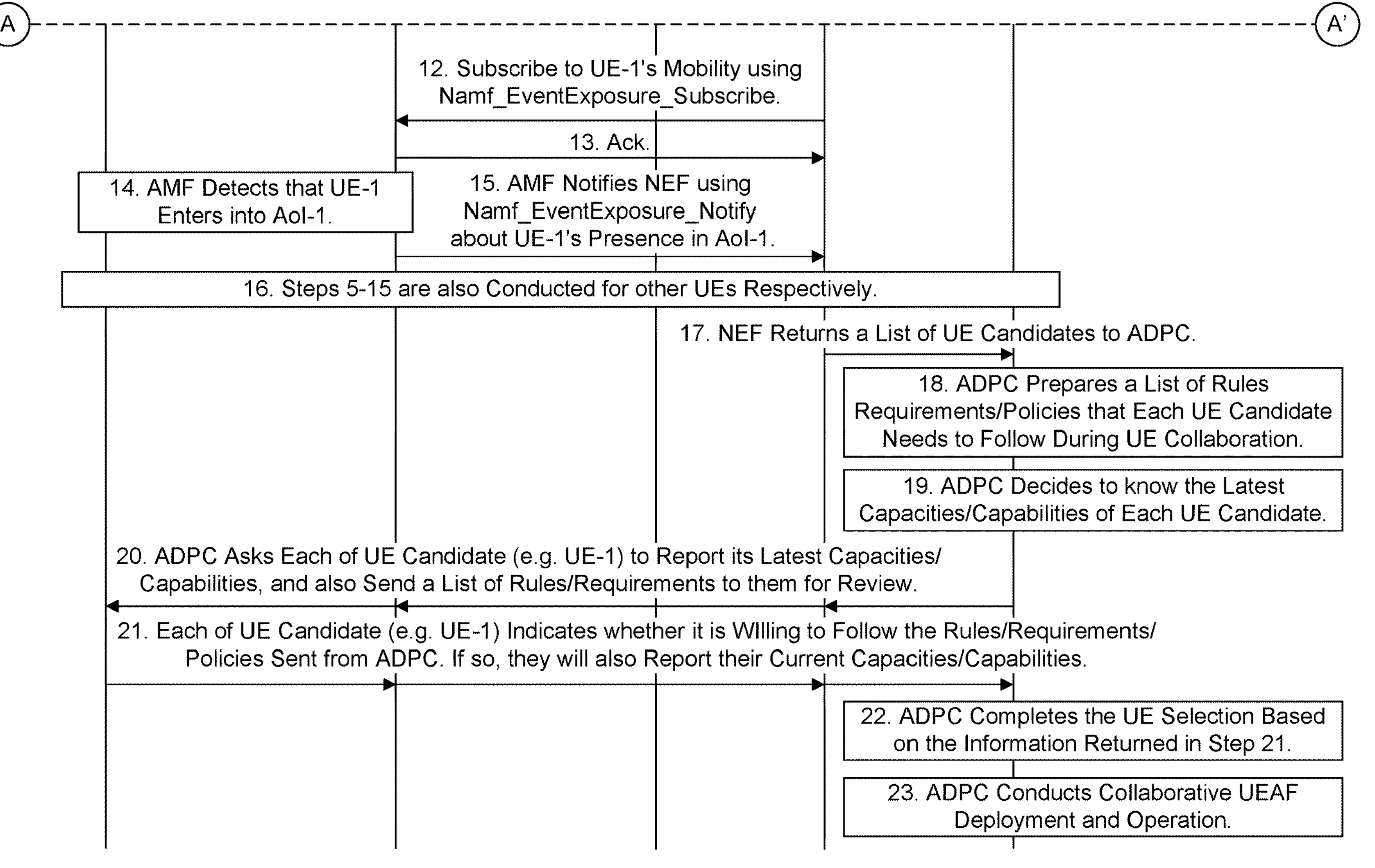

3GPP SA2 Embodiment for Collaborative UEAF Deployment and Operation Using 3GPP-Assisted UE Member Selection Mechanism FIG. 8 shows another 3GPP SA2 embodiment for enabling collaborative UEAF deployment and operation using 3GPP-assisted UE member selection mechanism. In this embodiment, ADPC is realized as an AF. It needs to rely on other NFs in the 3GPP networks in order to find a list of UEs, among which collaborative UEAF deployment and operation is to be realized.

Step 1. ADPC intends to enable collaborative UEAF downloading & operation. It is assumed that ADPC intends to enable collaborative UEAF downloading & operation for a list of group activities. A group activity may be held in a specific location (defined as an Area-of-Interest, or AoI). When attending a specific group activity, multiple UEs may need to download and operate the same UEAF (e.g., UEAF-1 is to be used in the first activity, which is held in the Area-of-Interest-1). However, currently ADPC does not know which UEs shall be involved for collaborative UEAF downloading and operation in those activities and plans to rely on 3GPP network to conduct member selection.

Step 2. ADPC sends a UE member selection request to NEF. In this request, a UE member filtering criteria is proposed, which members shall be selected for collaborative UEAF downloading and operation. In this example, it is assumed that ADPC may only want to support collaborative UEAF downloading & operation for one activity (in a more general case, multiple activities may be included in this filter):

```
Activity-1 = {
    Activity location: Area-of-Interest-1 (AoI-1)
    UEAF-to-be-used: UEAF-1
    Activity ID: 24644
  }
```

Accordingly, a UE member filter criteria may include the following information: 1) a UE shall intend to attend an activity in AoT-1; 2) a UE shall be in the area of AoT-1; 3) a UE needs to download and operate UEAF-1 when attending the activity; and/or 4) a UE shall indicate its willingness to participate UE collaboration.

Step 3. In this disclosure, it is proposed that UE will report its planned activity and its UEAF need during the UE registration process and such information will be further stored in UDM (See Steps 5-6). A new type of event ID is defined as "new UEAF need" for UDM. Accordingly, NEF subscribes to NEF for the new event ID (i.e., new UEAF need event) using Nudm_EventExposure_Subscribe.

Step 4. UDM sends an acknowledgement to NEF by indicating that the data subscription on new UEAF need is successful.

Step 5. UE-1 sends a 3GPP UE registration request to AMF, in which the following parameters may be included, such as: UE ID, an indicator that UE-1 would like to participate in collaborative UEAF downloading, an UEAF need that UE-1 plans to attend an activity in AoI-1 and needs to download and operate UEAF-1 when attending the activity. Overall, the parameters included in Step 1 and Step 4 of FIG. 4 can be included in this step.

Step 6. In addition to the regular processing steps for UE registration, AMF further adds the UEAF need information about UE-1 into UDM (e.g., the parameters received in Step 5) using Nudm_UECM_Update. In addition, in case blockchain technology is leveraged, AMF may also create a smart contract for UE-1 and ADPC.

Step 7. UDM stores the UEAF need of UE-1, which is regarded as a new event. An event notification is to be sent to NEF and the notification may indicate that UE-1 needs to download UEAF-1 when attending an activity held in an AoI-1.

Step 8. UDM sends an acknowledgement to AMF by indicating that the UEAF need of UE-1 was stored in UDM successfully.

Step 9. AMF sends a registration accept response to UE-1.

Step 10. Since a new UEAF need was added into UDM during Step 7, an event notification is sent to NEF using Nudm_EventExposure_Notify, based on the even subscription made during Step 3.

Step 11. The notification received in Step 10 can match the UE member filtering criteria defined in Step 2. In other words, NEF now knows that UE-1 is a candidate UE to be involved in collaborative UEAF deployment and operation for UEAF-1. As a result, NEF further decides to track UE-1's mobility.

Step 12. NEF subscribes to UE-1's mobility using Namf_EventExposure_Subscribe and the event ID is "UE moving in/out of area of interest" and the area of interest refers to AoI-1.

Step 13. AMF sends an acknowledgement to NEF for the successful event subscription made during Step 12.

Step 14. AMF detects that UE-1 enters into AoI-1, i.e. UE-1 is now present in AoI-1.

Step 15. AMF notifies NEF using Namf_EventExposure_Notify about the presence of UE-1 in AoI-1. Accordingly, NEF now will add UE-1 to a list.

Step 16. Steps 5-15 are also conducted for other UEs respectively. As a result, NEF may have identified multiple UEs, which are attending the same activity in AoI-1 and need to download and operate the same UEAF-1. Those UEs will be involved in collaborative UEAF downloading and operation to be enabled by ADPC.

Step 17. NEF returns a list of identified UE candidates to ADPC. Then, ADPC may start to select which UEs shall be the members of the UE collaboration group.

Step 18. ADPC prepares a list of rules/requirements/polices that each UE candidate needs to follow during UE collaboration. For example, various rules/requirements/polices as discussed in the Step 5 of FIG. 4 can be re-used here. In addition, in case blockchain technology can be leveraged, the ADPC may include the rules/requirements/polices in a smart contract and send it to a UE candidate for review during Step 20.

Step 19. In order for ADPC to better conduct task assignment among different UE participants, ADPC decides to collect the latest capacities/capabilities of each UE candidate.

Step 20. ADPC send a request to each of UE candidate (e.g. UE-1) to ask them to report their latest capacities/capabilities, and also includes a list of rules/requirements to them for review.

Step 21. Each of UE candidate (e.g. UE-1) indicates whether it is willing to follow the rules/requirements/policies sent from ADPC. If so, they will also report their current capacities/capabilities.

Step 22. ADPC completes the UE selection based on the information returned in Step 21. For example, if UE-1 agrees to the rules/requirements/policies sent from ADPC, UE-1 will be as a formal member in the UE collaboration group.

Step 23. ADPC conducts collaborative UEAF deployment and operation. Step 5 to Step 39 of FIG. 5 will be re-used in this step. For example, ADPC may decide a specific UECG for each of member UE and send it to UE for execution. Each UE member will follow the UECG and complete certain assigned tasks, therefore collaborative UEAF downloading, and operation can be achieved.

3GPP SA6 Embodiment for Collaborative UEAF Deployment and Operation

Figure 9:
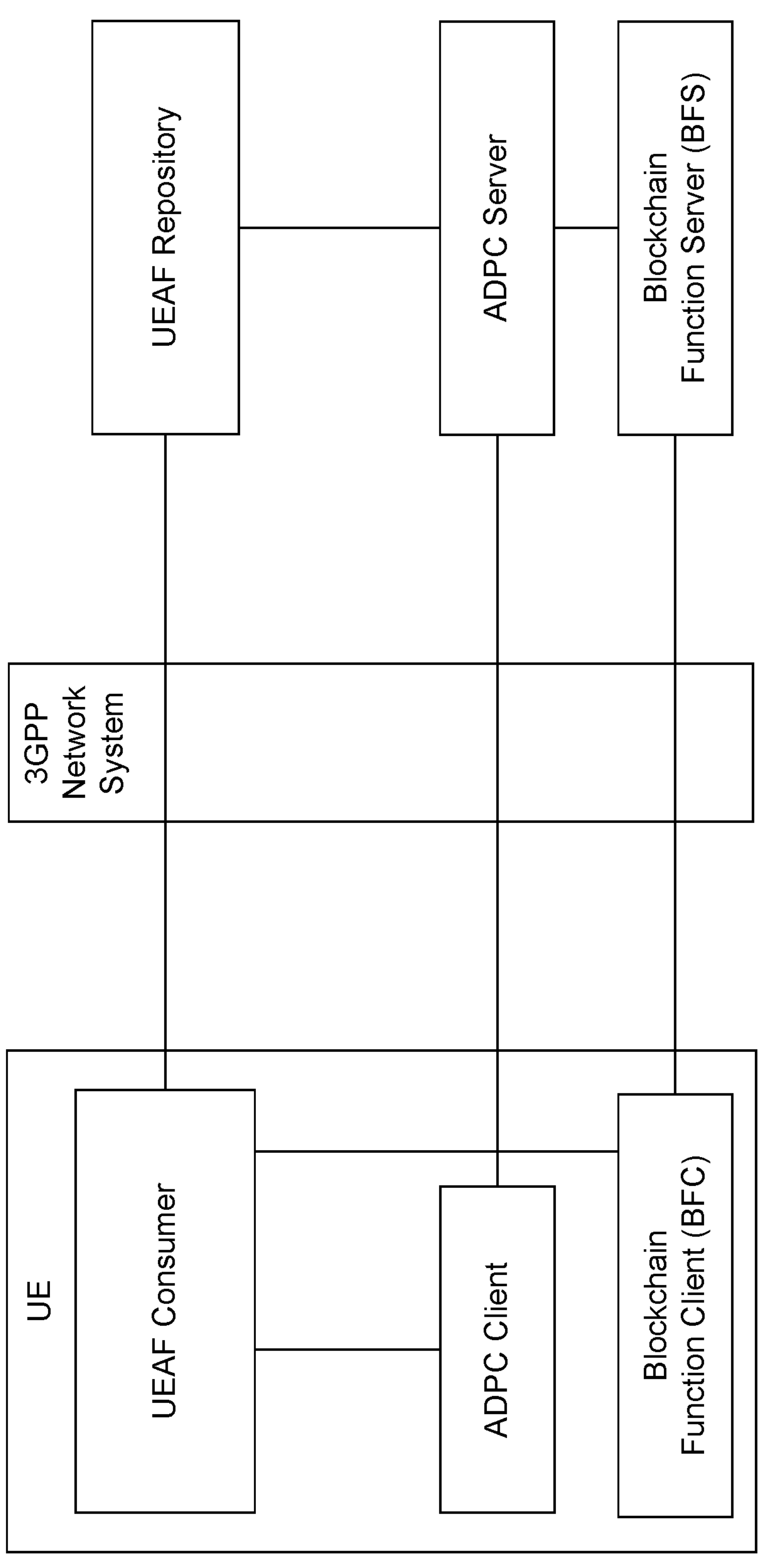
FIG. 9 is a flow diagram illustrating a first example of a 3GPP SA6 embodiment for enabling collaborative UEAF deployment and operation, according to one or more embodiments.

FIG. 9 shows a 3GPP SA6 embodiment for the proposed ADPC. Overall, the ADPC can be realized as an ADPC server and an ADPC client. The ADPC server can be hosted on the network side, while a UE may be equipped with a corresponding ADPC client. The ADPC server and ADPC client could provide a common service for enabling collaborative UEAF deployment and operation for any upper-layer UEAF consumers (e.g. in the vertical application layer, or VAL). For example, in the VAL, a UE may be equipped with a UEAF Consumer, which may have needs to download and operate various UEAF(s), depending on what kinds of application logic to be supported. On the network side, there is a UEAF Repository (UEAF-R) such that a UEAF Consumer hosted on a UE may need to download a specific UEAF from UEAF-R. With the help of ADPC, a UEAF consumer could send its UEAF downloading and operation request to its ADPC client, which will further forward the request to ADPC server. When ADPC server receives multiple UEAF downloading and operation requests from different UEs, the ADPC server could realize collaborate UEAF downloading and operation by creating a UECG for each of involved UE or UEAF consumer. The UECG will be delivered from ADPC server to an ADPC client hosted on a UE. In addition, the blockchain capability can also be realized using a Client/Server architecture. For example, each UE could be equipped with a Blockchain Function Client (BFC) while there is another Blockchain Function Server (BFS) on the network side, which could interact with underlying blockchain systems. When a UEAF Consumer needs to interact with blockchain system, it can send its request to its BFC, which will further forward the request to the BFS.

Figure 10:
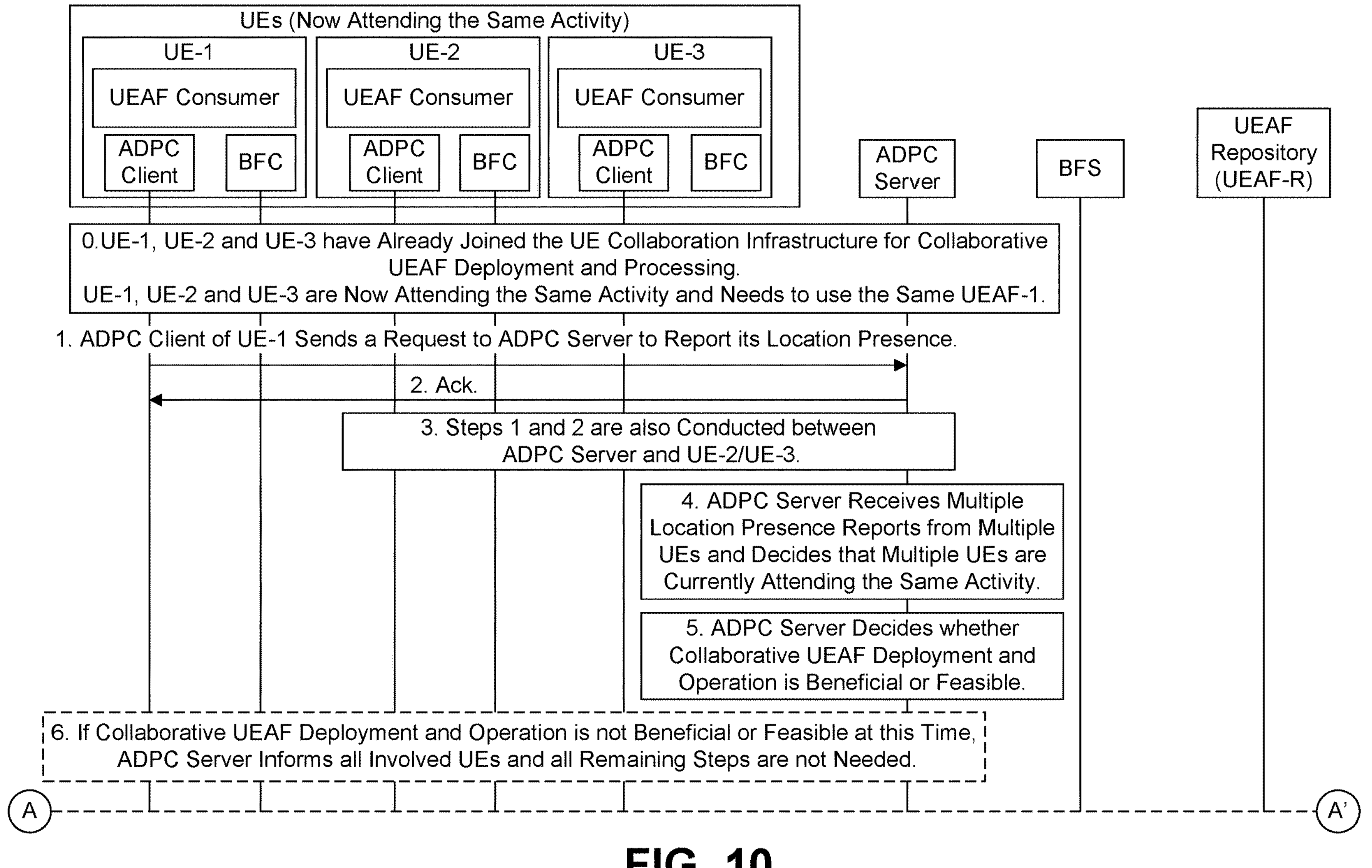
FIG. 10 a flow diagram illustrating a second example of a 3GPP SA6 embodiment for enabling collaborative UEAF deployment and operation, according to one or more embodiments.
Figure 10:
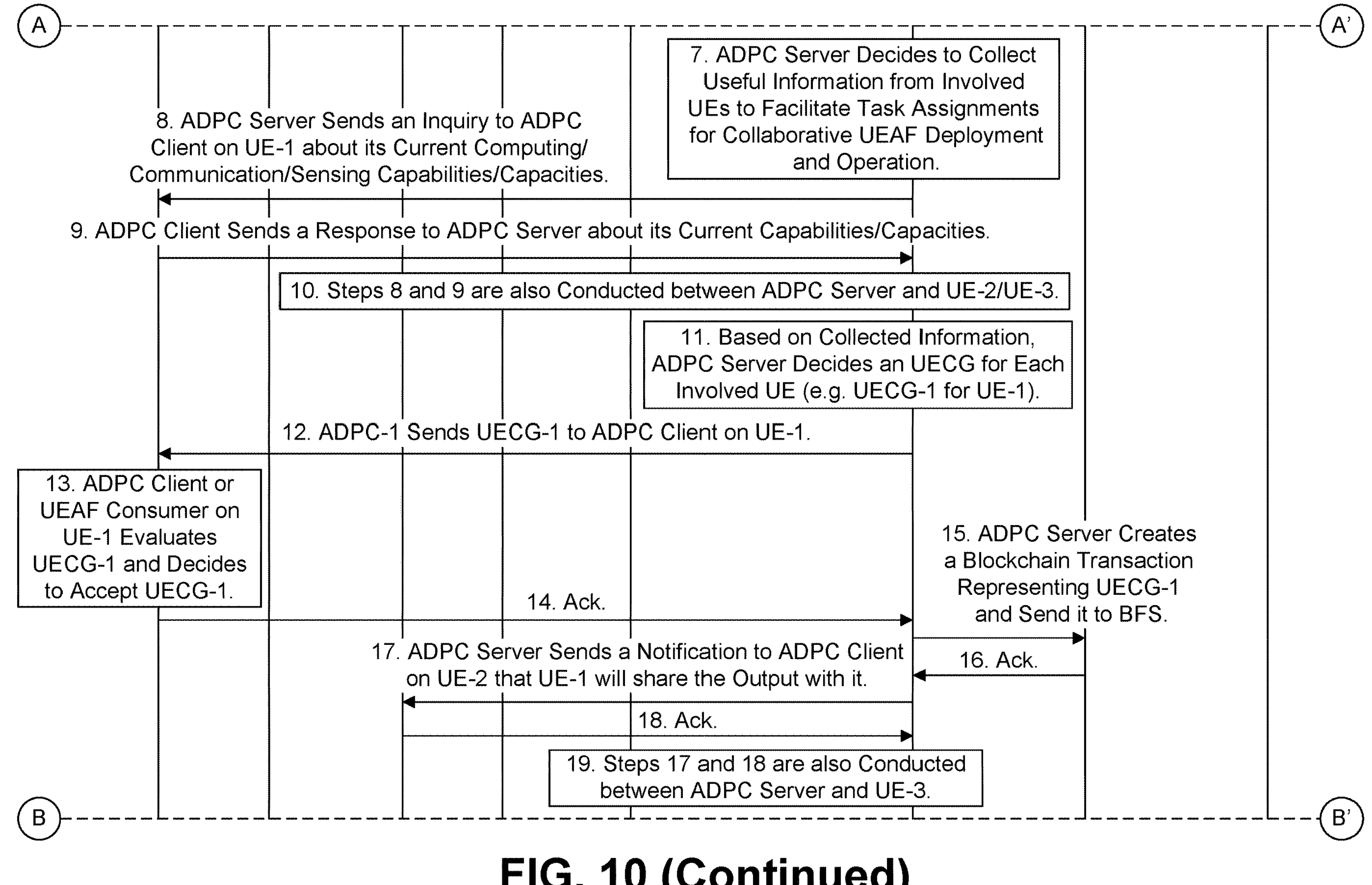
Figure 10:
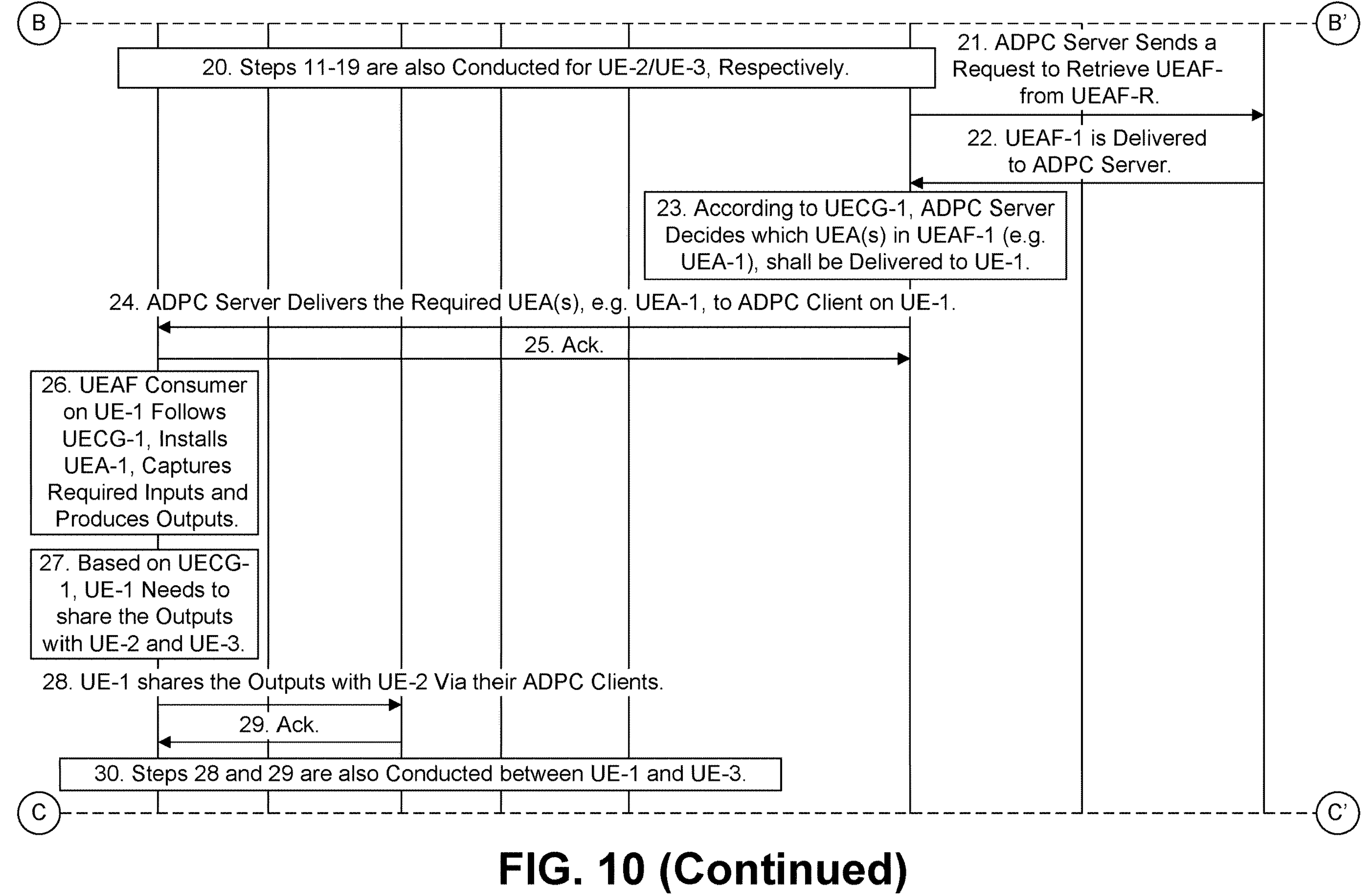
Figure 10:
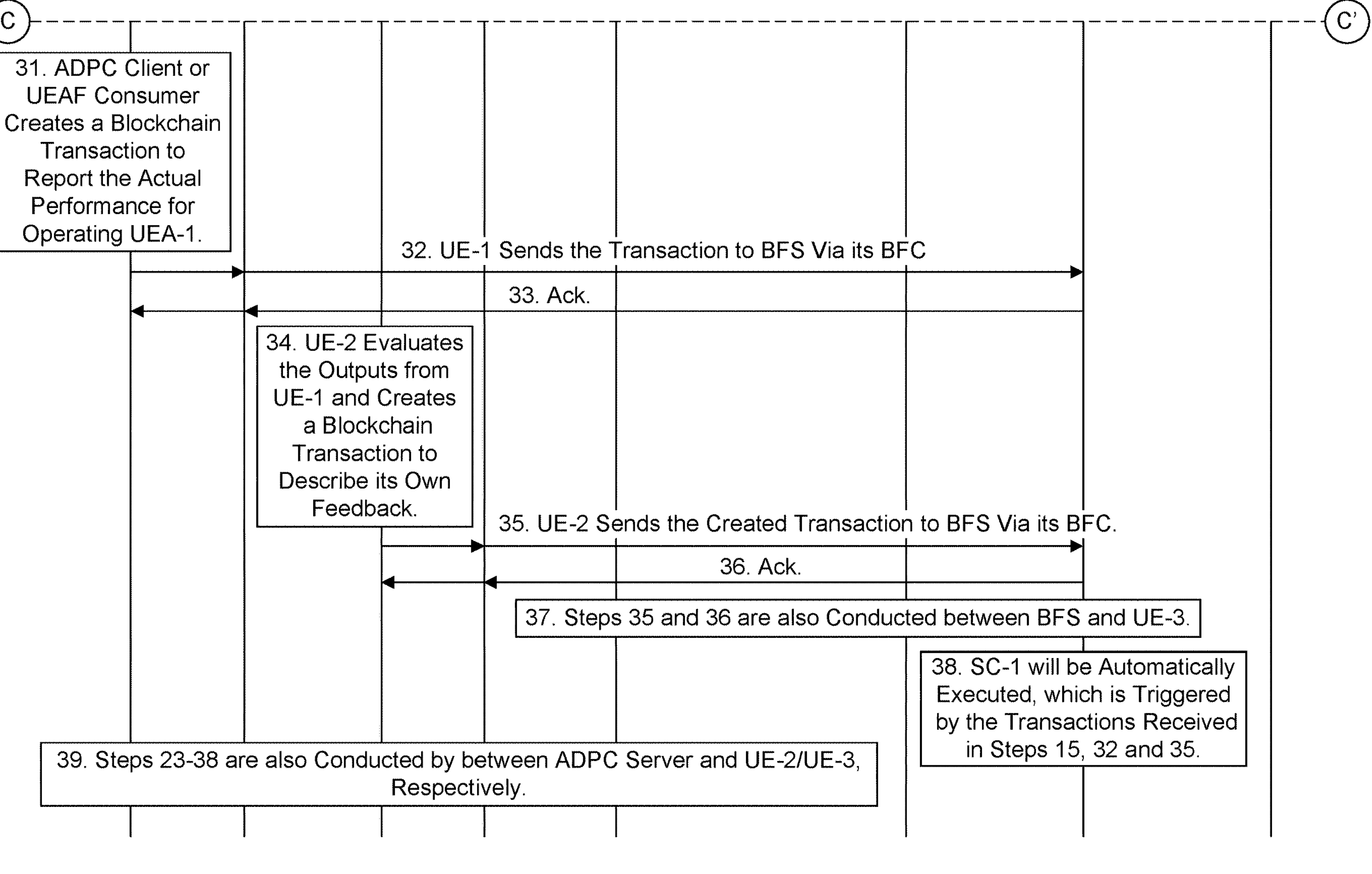

A 3GPP SA6 embodiment of FIG. 5 is shown in FIG. 10. All the steps in FIG. 10 exactly corresponds to the Steps in FIG. 5 and all the step descriptions in FIG. 5 can be re-used. In this embodiment, ADPC Server handles all the responsibilities for enabling collaborative UEAF deployments and operations.

Figure 11:
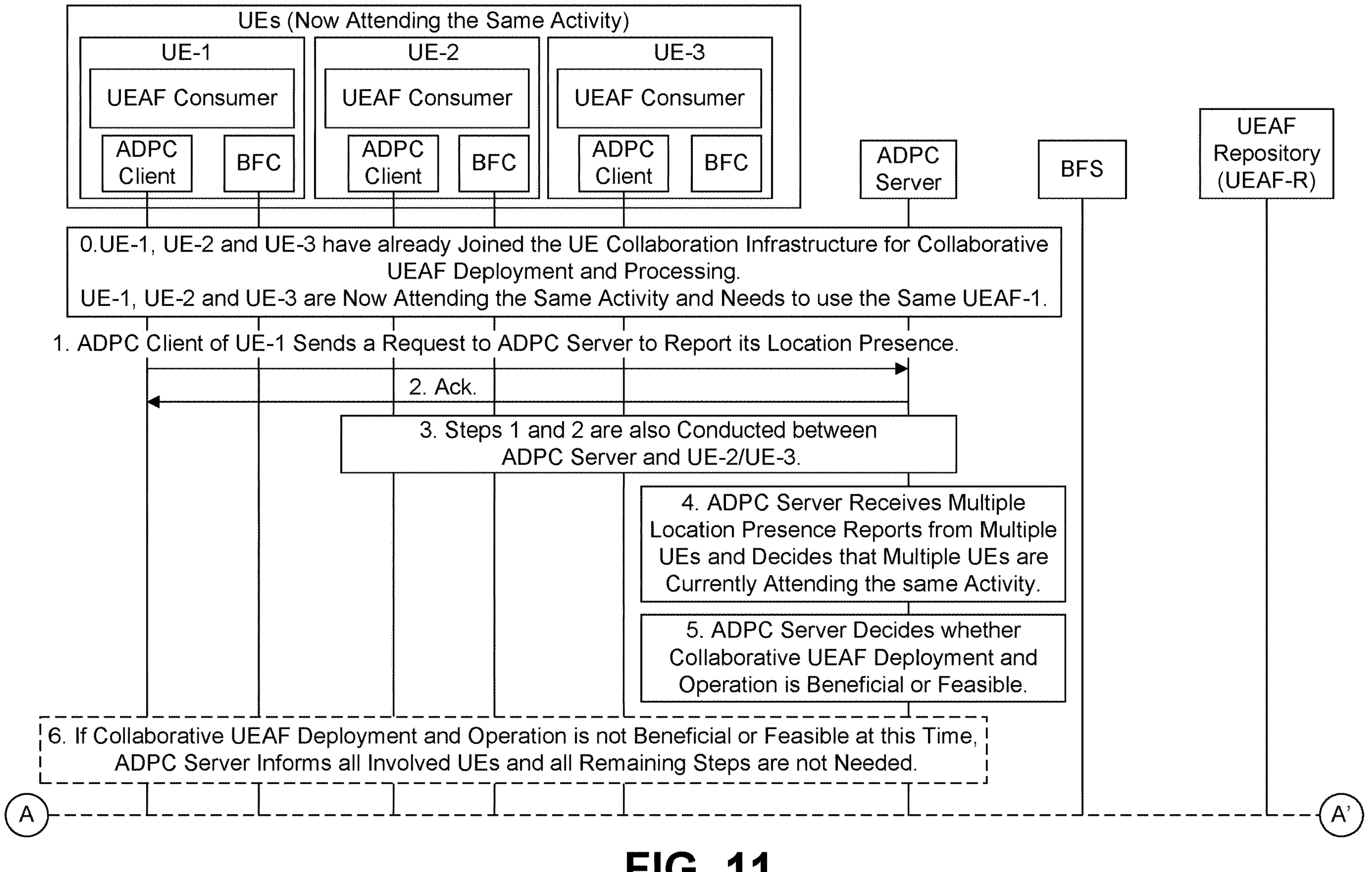
FIG. 11 a flow diagram illustrating a third example of a 3GPP SA6 embodiment for enabling collaborative UEAF deployment and operation, according to one or more embodiments.
Figure 11:
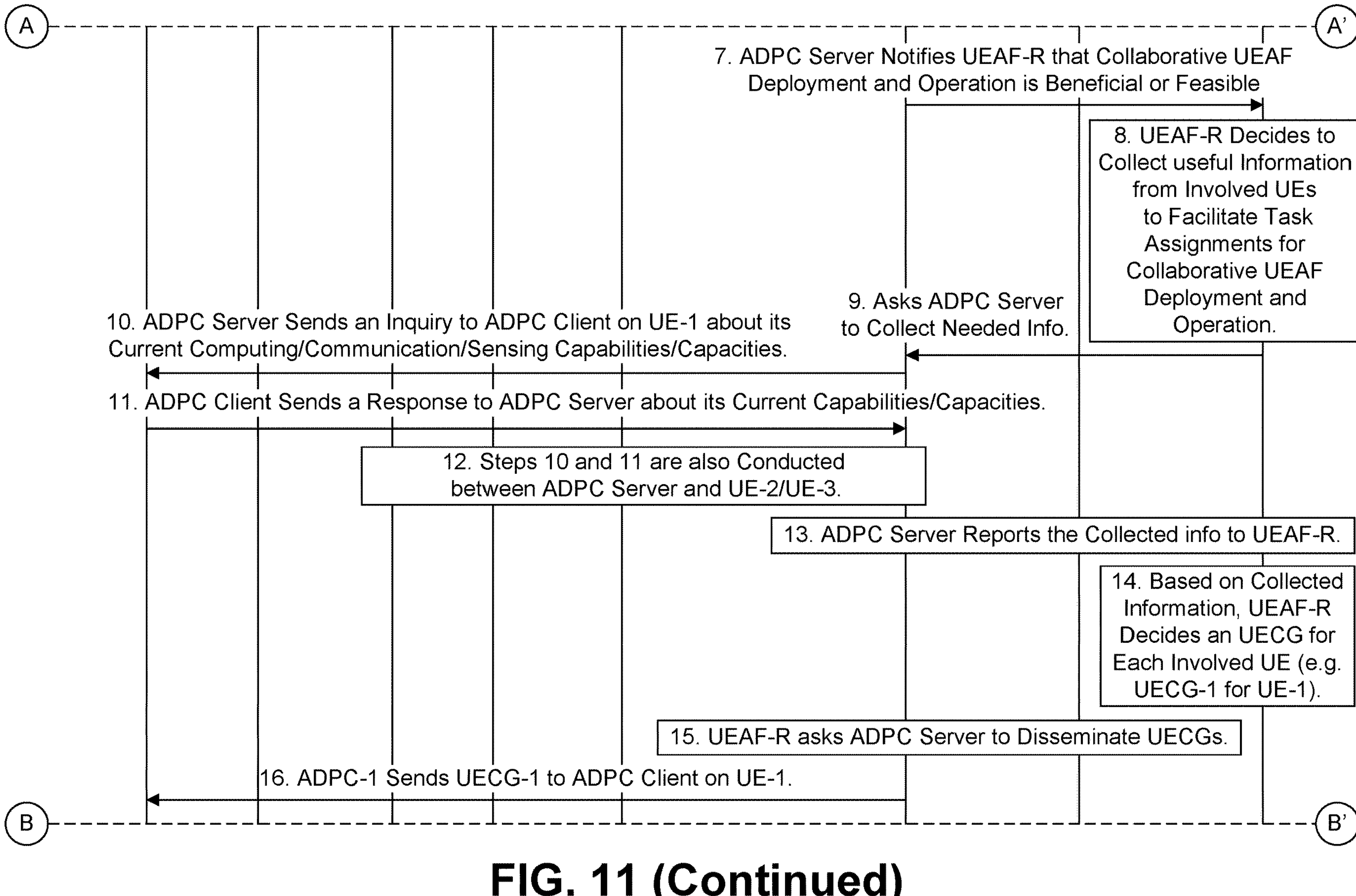
Figure 11:
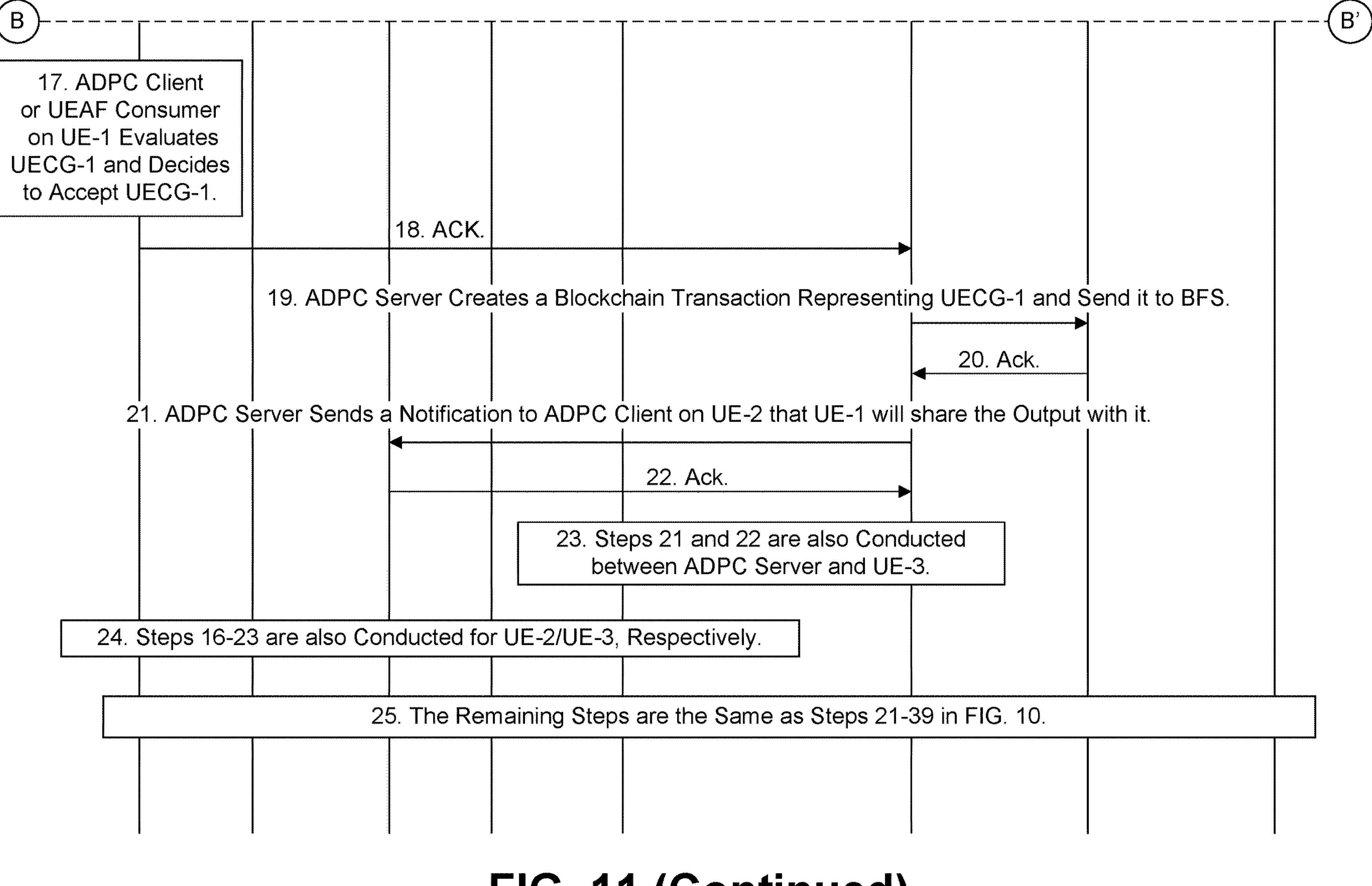

A 3GPP SA6 embodiment of FIG. 5 is shown in FIG. 11. Different from the embodiment shown in FIG. 10, ADPC Server in FIG. 11 only works as an enabler. In the meantime, the major decisions of collaborative UEAF deployments and operations are handled by UEAF-R. For example, as an enabler, the ADPC Server only provides help in identifying the potential UE collaboration opportunities and notifying the UEAF-R, collecting runtime/useful information from targeted UEs, disseminating UECGs (decided by UEAF-R) to targeted UEs. In comparison, UEAF will be responsible for all the major business logic, such as determining UECGs for all the involved UEs, etc.

The procedure steps in FIG. 11 are almost the same as steps in FIG. 10, and the major difference is that some of the steps will now be handled by UEAF-R.

Steps 1-6 are the same as Steps 1-6 in FIG. 10.

Step 7. ADPC Server notifies UEAF-R that collaborative UEAF deployment and operation is beneficial or feasible.

Step 8. UEAF-R decides to collect useful information from involved UEs to facilitate task assignments for collaborative UEAF deployment and operation. This step is same as the Step 7 in FIG. 10, but now UEAF-R will be responsible for conducting this step.

Step 9. UEAF-R asks ADPC Server to collect needed information.

Steps 10-12 are the same as Steps 8-10 in FIG. 10.

Step 13. ADPC Server reports the collected information to UEAF-R.

Step 14. Based on collected information, UEAF-R decides an UECG for each involved UE (e.g. UECG-1 for UE-1). This step is same as the Step 11 in FIG. 10, but now UEAF-R will be responsible for conducting this step.

Step 15. UEAF-R asks ADPC Server to disseminate UECGs.

The remaining steps are the same as Steps 12-39 in FIG. 10.

ETSI PDL Embodiment

ETSI Industry Specification Group (ISG) on Permissioned Distributed Ledger (PDL) specifies standards related to PDL architecture, PDL services, and PDL for vertical domains such as telecom. ETSI GR PDL-0024 proposes a few new functions, which can be used in the 3GPP networks for provisioning PDL service. First, the Ledger Anchor Function (LAF) mainly handles the control plane-related processing. For example, the LAF could receive a request from a 3GPP entity (such as a UE or an NF, which can be regarded as PDL service consumer) for PDL service provisioning. In order to serve the service provisioning request, LAF may identify or instantiate a BC Enabler Function (BCEF) on a network node. A Blockchain Repository Function (BCRF) is also defined in this architecture. The BCRF stores all the needed software/code/toolkit/libraries that may be needed for instantiating a BCEF. For example, when LAF decides to instantiate a BCEF on a given network node, LAF may suggest the node to download necessary software from the BCRF. BCEF can be regarded as a data plane function. On one hand, BCEF receives and executes commands from LAF and interfaces with PDL service consumers. On the other hand, BCEF acts as a member node of an underlying DLT network. For example, BCEF may composite ledger/blockchain transactions/blocks and send them to other peer nodes in the DLT network. BCEF may also operate a consensus protocol to participate consensus process. LAF may monitor the status of deployed PDL services and conduct lifecycle management or maintenance on BCEFs when needed.

The proposed entities (such as participant UEs, or entity acting as an ADPC) may contact LAF to find an available BCEF. If no BCEF is available, then a new BCEF can be instantiated. For example, a BCEF can be instantiated on a particular BCN, such as BCN-1. Alternatively, participant UEs and entity acting as an ADPC could also be BCEF by themselves so that they could directly send blockchain transactions to full-node in the blockchain system. In various embodiments, for any step describing that a message is sent to a BCN can be embodied as that a message is sent to a BECF in the ETSI PDL system (such as Step 8 of FIG. 4, and Steps 15, 32, 35 of FIG. 5, etc.) and the BCEF may further interact with the underlying blockchain system, e.g. to record transactions onto the blockchain or to deploy a smart contract.

Representative Procedures for Blockchain-Enabled Collaborative Application Deployment and Operation In one embodiment, an example procedure is performed by an entity such as an ADPC (e.g., an ADPC associated with a WTRU or UE) to enable UE collaboration infrastructure for UEAF deployment and operation. For example, an ADPC may receive a request from a first UE to join a UE collaboration infrastructure for collaborative UEAF deployment/operation. The ADPC may create a first smart contract proposal for a first UE. The ADPC may send a response to the first UE by indicating the first smart contract proposal. The ADPC may receive feedback from the first UE about the first smart contract proposal and finalize the first smart contract. The ADPC may send the first smart contract to a first blockchain node. The ADPC may receive a confirmation from the first blockchain node that smart contract has been deployed and taken into effect. The ADPC may send a download request for a desired UEAF to a UEAF-R (e.g., using a UEAF ID). The ADPC may create a record for the first UE and include it as a member of UE collaboration infrastructure. The ADPC may send a notification to the first UE by indicating that it is a member of the UE collaboration infrastructure.

In one embodiment, an example procedure is performed by an entity such as an ADPC (e.g., an ADPC associated with a WTRU or UE) for collaborative UEAF deployment and/or operation. For example, an ADPC may receive location presence reports from multiple UEs, including a UE ID, Activity Triple (AT) ID, UE's current capacities (e.g., computing, communications, or sensing). The ADPC may decide to enable collaborative UEAF deployment/operation. The ADPC may create a UECG for each UE (e.g., UECG-1 for UE-1). The ADPC may send UECGs to multiple UEs for task assignments. The ADPC may receive confirmations from multiple UEs for task assignment acceptances. The ADPC may send UECGs to a blockchain node for recording. The ADPC may receive acknowledgement from the blockchain node indicating a successful UECG recording. The ADPC may send a download request for a desired UEAF from a UEAF-R (e.g., via a UEAF ID). The ADPC may receive the desired UEAF from a UEAF-R. The ADPC may prepare UEA delivery solutions for different UEs, based on their UECGs. The ADPC may deliver UEAs to different UEs for deployment (e.g., UEAs, UECGIDs). The ADPC may receive confirmations from multiple UEs for successful UEA installation and operation.

In one embodiment, an example procedure is performed by an entity such as an ADPC (e.g., an ADPC associated with a WTRU or UE) for collaborative UEAF deployment and/or operation. For example, the procedure includes receiving a set of location presence reports from a set of WTRUs; determining, based on the set of location presence reports, enabling a set of collaborative applications for deployment and operation; generating a set of collaboration guides, wherein each collaboration guide of the set of collaboration guides is for a respective task assignment for a respective WTRU of the set of WTRUs; transmitting the set of collaboration guides to set of WTRUs for task assignments; receiving, from at least one WTRU of the set of WTRUs, information indicating an acceptance for the respective task assignment associated with the at least one WTRU; transmitting one or more collaboration guides of the set of collaboration guides to a blockchain node for recording; and receiving, from the blockchain node, an acknowledgement indicating a successful recording of the one or more collaboration guides.

In an example, the procedure may also include transmitting a download request for at least a subset of the set of collaborative applications; receiving the subset of the set of collaborative applications; transmitting, based on a respective collaboration guide, one or more applications to the at least one WTRU for deployment; and receiving, from the at least one WTRU, confirmation information indicating a successful installation and operation of the one or more applications.

In one embodiment, an example procedure is performed by a WTRU (or a UE). The WTRU comprises circuitry, including a transmitter, receiver, a processor and memory. The WTRU is configured to: transmit a request to join a collaboration group associated with a set of collaborative applications; receive, based on the request, a response including information indicating a proposal of a smart contract; transmit feedback based on the proposal of the smart contract; and receive an acknowledgement notification indicating 1) status information of the smart contract and 2) that the WTRU has joined the collaboration group. In an example, the request indicates any of: an identification of the WTRU, an activity triple (AT) identifier, an activity triple (AT), one or more current capacities of the WTRU, activity location information, an identifier associated with the collaboration group, one or more identifiers associated with the set of collaborative applications.

In an example, the acknowledgement notification indicates that a blockchain transaction associated with the smart contract was successfully recorded in a blockchain system.

In an example, the WTRU is further configured to transmit a report indicating a location presence. The report may indicate any of: an identification of the WTRU, an activity triple (AT) identifier, an activity triple (AT), one or more current capacities of the WTRU, activity location information, an identifier associated with the collaboration group, one or more identifiers associated with the set of collaborative applications.

In an example, the WTRU is further configured to receive information indicating a collaboration guide for a task assignment for the WTRU.

In an example, the WTRU is further configured to transmit information indicating an acceptance for the task assignment.

In an example, the WTRU is further configured to receive, based on the collaboration guide, one or more applications of the set of collaborative applications for deployment at the WTRU.

In an example, the WTRU is further configured to transmit information indicating successful installation and operation of the one or more applications.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.) and/or "permissive" terms (e.g., the term "is" and/or the term "are" may be interpreted as "may" and/or "might", the terms "refer(s)" may be interpreted as "may refer" and/or "might refer", the terms "receive(s)" may be interpreted as "may receive" and/or "might receive", the terms "support(s)" may be interpreted as "may support" and/or "might support", the terms "interface(s)" may be interpreted as "may interface" and/or "might interface", the terms "transmit(s)" may be interpreted as "may interface" and/or "might interface", "may transmit" and/or "might transmit", the terms "send(s)" may be interpreted as "may send" and/or "might send", the terms "does not refer" (and/or the like) may be interpreted as "may not refer" and/or "might not refer", the terms "does not receive" (and/or the like) may be interpreted as "may not receive" and/or "might not receive", the terms "does not support" (and/or the like) may be interpreted as "may not support" and/or "might not support", the terms "does not interface" (and/or the like) may be interpreted as "may not interface" and/or "might not interface", the terms "does not transmit" (and/or the like) may be interpreted as "may not transmit" and/or "might not transmit", the terms "does not send" (and/or the like) may be interpreted as "may not send" and/or "might not send", etc.) . . . . It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶ 6 or means-plus-function claim format, and any claim without the terms "means for" is not so intended.

What is claimed is:

1. A method implemented in a wireless transmit/receive unit (WTRU) for wireless communications, the method comprising:

transmitting, to a network element, a request to join a collaboration infrastructure associated with one or more activities;

receiving, from the network element, a request response comprising information indicating a proposal of a smart contract that comprises rules and policies for joining the collaboration infrastructure, and information indicating one or more activities to which the smart contract is applicable;

transmitting, to the network element, feedback on the smart contract;

receiving, from the network element, a WTRU collaboration guide indicating one or more tasks assigned to the WTRU;

evaluating the one or more tasks assigned to the WTRU; and transmitting, to the network element, an acknowledgement of the one or more tasks assigned to the WTRU.

2. The method of claim 1, wherein the feedback on the smart contract comprises an acceptance of the smart contract or a proposed modification of the smart contract.

3. The method of claim 1, wherein the WTRU collaboration guide indicates at least one of: WTRU application acquisition instruction, WTRU application input capture instructions, WTRU application output sharing instructions, quality and performance requirements, or performance reporting instruction.

4. The method of claim 1, further comprising transmitting a report indicating a location presence.

5. The method of claim 3, wherein evaluating the one or more tasks assigned to the WTRU comprises determining to accept the one or more tasks assigned to the WTRU.

6. The method of claim 5, further comprising:

installing, based on the WTRU collaboration guide, one or more WTRU applications corresponding to the more tasks assigned to the WTRU, capturing one or more inputs and providing one or more outputs corresponding the one or more WTRU applications to one or more second WTRUs; and receiving an acknowledgment from the one or more second WTRUs.

7. The method of claim 6, further comprising:

creating a blockchain transaction to report an actual performance of the installed one or more WTRU applications;

sending the blockchain transaction to a blockchain node to trigger an execution of the smart contract; and receiving an acknowledgment of the blockchain transaction from the blockchain node.

8. The method of claim 6, wherein the request to join the collaboration infrastructure comprises at least one of: an identification of the WTRU, an activity triple (AT) identifier, an activity triple (AT), one or more current capacities of the WTRU, activity location information, an identifier associated with the collaboration infrastructure, or one or more identifiers associated with a set of the one or more WTRU applications corresponding the one or more tasks assigned to the WTRU.

9. The method of claim 1, further comprising:

receiving, from the network element, an acknowledgement notification indicating a status the smart contract and a query of capabilities and capacity of the WTRU; and transmitting, to the network element, a response to the query identifying the capabilities and the capacity of the WTRU.

10. A wireless transmit/receive unit (WTRU) comprising circuitry, including a transmitter, receiver, a processor and memory, the WTRU configured to:

transmit, to a network element, a request to join a collaboration infrastructure associated with one or more activities;

receive, from the network element, a request response comprising information indicating a proposal of a smart contract that comprises rules and policies for joining the collaboration infrastructure, and information indicating one or more activities to which the smart contract is applicable;

transmit, to the network element, feedback on the smart contract;

receive, from the network element, a WTRU collaboration guide indicating one or more tasks assigned to the WTRU;

evaluate the one or more tasks assigned to the WTRU; and transmit, to the network element, an acknowledgement of the one or more tasks assigned to the WTRU.

11. The WTRU of claim 10, wherein the feedback on the smart contract comprises an acceptance of the smart contract or a proposed modification of the smart contract.

12. The WTRU of claim 10, wherein the WTRU collaboration guide indicates at least one of: WTRU application acquisition instruction, WTRU application input capture instructions, WTRU application output sharing instructions, quality and performance requirements, or performance reporting instruction.

13. The WTRU of claim 10, wherein the WTRU is further configured to:

transmit a report indicating a location presence.

14. The WTRU of claim 12, wherein the WTRU is further configured to determine to accept the one or more tasks assigned to the WTRU based on the one or more tasks assigned to the WTRU evaluated.

15. The WTRU of claim 14, wherein the WTRU is further configured to:

install, based on the WTRU collaboration guide, one or more WTRU applications corresponding to the one or more tasks assigned to the WTRU, capture one or more inputs and provide one or more outputs corresponding the one or more WTRU applications to one or more second WTRUs; and receive an acknowledgment from the one or more second WTRUs.

16. The WTRU of claim 15, wherein the WTRU is further configured to:

create a blockchain transaction to report an actual performance of the installed one or more WTRU applications;

send the blockchain transaction to a blockchain node to trigger an execution of the smart contract; and receive an acknowledgment of the blockchain transaction from the blockchain node.

17. The WTRU of claim 15, wherein the request to join the collaboration infrastructure comprises at least one of: an identification of the WTRU, an activity triple (AT) identifier, an activity triple (AT), one or more current capacities of the WTRU, activity location information, an identifier associated with the collaboration infrastructure, or one or more identifiers associated with a set of the one or more WTRU applications corresponding the one or more tasks assigned to the WTRU.

18. The WTRU of claim 17, wherein the WTRU is further configured to:

receive, from the network element, an acknowledgement notification indicating a status the smart contract and a query of capabilities and capacity of the WTRU; and transmit, to the network element, a response to the query identifying the capabilities and the capacity of the WTRU.

* * * * *